United States Patent
Nakano et al.

(10) Patent No.: US 11,261,505 B2
(45) Date of Patent: *Mar. 1, 2022

(54) HIGH STRENGTH STEEL SHEET

(71) Applicant: NIPPON STEEL CORPORATION, Tokyo (JP)

(72) Inventors: Katsuya Nakano, Tokyo (JP); Yuya Suzuki, Tokyo (JP); Genki Abukawa, Tokyo (JP); Kunio Hayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 309 days.

This patent is subject to a terminal disclaimer.

(21) Appl. No.: 16/487,030

(22) PCT Filed: Feb. 20, 2018

(86) PCT No.: PCT/JP2018/006084
§ 371 (c)(1),
(2) Date: Aug. 19, 2019

(87) PCT Pub. No.: WO2018/151331
PCT Pub. Date: Aug. 23, 2018

(65) Prior Publication Data
US 2020/0232060 A1 Jul. 23, 2020

(30) Foreign Application Priority Data

Feb. 20, 2017 (JP) .............................. JP2017-029327
Feb. 20, 2017 (JP) .............................. JP2017-029329

(51) Int. Cl.
*B32B 15/01* (2006.01)
*C23C 2/06* (2006.01)
(Continued)

(52) U.S. Cl.
CPC ................ *C21D 9/46* (2013.01); *B32B 15/01* (2013.01); *B32B 15/011* (2013.01);
(Continued)

(58) Field of Classification Search
CPC .......... C21D 9/46; C21D 6/001; C21D 6/002; C21D 6/005; C21D 6/008; C21D 8/0205;
(Continued)

(56) References Cited

U.S. PATENT DOCUMENTS

2013/0048151 A1* 2/2013 Kawamura .......... C21D 8/0257
148/330
2014/0242415 A1 8/2014 Azuma et al.
(Continued)

FOREIGN PATENT DOCUMENTS

EP 2995698 A1 3/2016
JP 10-130782 A 5/1998
(Continued)

OTHER PUBLICATIONS

International Preliminary Report on Patentability and Written Opinion of the International Searching Authority(Forms PCT/IB/326, PCT/IB/373 and PCT/ISA/237), dated Aug. 29, 2019, for International Application No. PCT/JP2018/006084, with an English Translation.

(Continued)

*Primary Examiner* — Michael E. La Villa
(74) *Attorney, Agent, or Firm* — Birch, Stewart, Kolasch & Birch, LLP

(57) ABSTRACT

High strength steel sheet having a tensile strength of 800 MPa or more comprising a middle part in sheet thickness and a soft surface layer arranged at one side or both sides of the middle part in sheet thickness, wherein each soft surface layer has a thickness of more than 10 μm and 30% or less of the sheet thickness, the soft surface layer has an average (Continued)

Vickers hardness of 0.60 time or less the average Vickers hardness of the sheet thickness ½ position, and the soft surface layer has a nano-hardness standard deviation of 0.8 or less is provided.

20 Claims, 2 Drawing Sheets

(51) Int. Cl.

| | |
|---|---|
| C23C 2/40 | (2006.01) |
| C23C 2/28 | (2006.01) |
| C22C 38/38 | (2006.01) |
| C22C 38/32 | (2006.01) |
| C22C 38/22 | (2006.01) |
| C22C 38/16 | (2006.01) |
| C22C 38/14 | (2006.01) |
| C22C 38/12 | (2006.01) |
| C22C 38/08 | (2006.01) |
| C22C 38/06 | (2006.01) |
| C22C 38/04 | (2006.01) |
| C22C 38/02 | (2006.01) |
| C22C 38/00 | (2006.01) |
| C21D 6/00 | (2006.01) |
| C21D 8/02 | (2006.01) |
| C21D 9/46 | (2006.01) |
| C22C 38/60 | (2006.01) |
| C22C 38/34 | (2006.01) |
| B32B 15/04 | (2006.01) |
| C22C 38/42 | (2006.01) |
| C22C 38/18 | (2006.01) |
| C22C 38/26 | (2006.01) |
| C22C 38/40 | (2006.01) |
| B32B 15/18 | (2006.01) |
| C22C 38/46 | (2006.01) |
| C22C 38/24 | (2006.01) |
| C22C 38/44 | (2006.01) |
| C22C 38/20 | (2006.01) |
| C22C 38/48 | (2006.01) |
| C22C 38/28 | (2006.01) |
| C22C 38/58 | (2006.01) |
| C22C 38/50 | (2006.01) |
| C25D 3/22 | (2006.01) |
| C23C 30/00 | (2006.01) |

(52) U.S. Cl.
CPC ............ *B32B 15/013* (2013.01); *B32B 15/04* (2013.01); *B32B 15/043* (2013.01); *B32B 15/18* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/58* (2013.01); *C22C 38/60* (2013.01); *C23C 2/06* (2013.01); *C23C 2/28* (2013.01); *C23C 2/285* (2013.01); *C23C 2/40* (2013.01); *C23C 30/00* (2013.01); *C23C 30/005* (2013.01); *C25D 3/22* (2013.01); *C21D 2211/001* (2013.01); *Y10T 428/12458* (2015.01); *Y10T 428/12799* (2015.01); *Y10T 428/12951* (2015.01); *Y10T 428/12958* (2015.01); *Y10T 428/12965* (2015.01); *Y10T 428/12972* (2015.01); *Y10T 428/12979* (2015.01); *Y10T 428/12986* (2015.01)

(58) Field of Classification Search
CPC .. C21D 8/0226; C21D 8/0236; C21D 8/0263; C21D 2211/001; C22C 38/00; C22C 38/60; C22C 38/001; C22C 38/002; C22C 38/02; C22C 38/04; C22C 38/06; C22C 38/08; C22C 38/12; C22C 38/14; C22C 38/16; C22C 38/22; C22C 38/32; C22C 38/38; C22C 38/18; C22C 38/20; C22C 38/24; C22C 38/26; C22C 38/28; C22C 38/34; C22C 38/40; C22C 38/42; C22C 38/44; C22C 38/46; C22C 38/48; C22C 38/50; C22C 38/58; B32B 15/013; B32B 15/01; B32B 15/011; B32B 15/04; B32B 15/043; B32B 15/18; C23C 2/06; C23C 2/028; C23C 2/40; C23C 2/285; C23C 30/00; C23C 30/005; C25D 3/22; Y10T 428/12799; Y10T 428/12951; Y10T 428/12958; Y10T 428/12965; Y10T 428/12972; Y10T 428/12979; Y10T 428/12986; Y10T 428/12458

See application file for complete search history.

(56) References Cited

U.S. PATENT DOCUMENTS

| | | |
|---|---|---|
| 2016/0017473 A1 | 1/2016 | Takagi et al. |
| 2016/0160335 A1 | 6/2016 | Ikeda |
| 2017/0037488 A1 | 2/2017 | Hasegawa et al. |
| 2017/0211164 A1 | 7/2017 | Kimura et al. |
| 2017/0369965 A1 | 12/2017 | Ikeda et al. |
| 2018/0002799 A1 | 1/2018 | Futamura et al. |
| 2018/0010207 A1 | 1/2018 | Futamura et al. |
| 2018/0010226 A1 | 1/2018 | Ikeda et al. |
| 2018/0010227 A1 | 1/2018 | Ikeda et al. |
| 2018/0298462 A1 | 10/2018 | Sano et al. |
| 2020/0010919 A1* | 1/2020 | Suzuki .................... C21D 9/46 |

FOREIGN PATENT DOCUMENTS

| | | |
|---|---|---|
| JP | 2005-273002 A | 10/2005 |
| JP | 2015-34334 A | 2/2015 |
| JP | 2015-117403 A | 6/2015 |
| JP | 2017-2384 A | 1/2017 |
| TW | 201207125 A1 | 2/2012 |
| WO | WO 2011/152017 A1 | 12/2011 |
| WO | WO 2013/047819 A1 | 4/2013 |
| WO | WO 2014/181728 A1 | 11/2014 |
| WO | WO 2016/013145 A1 | 1/2016 |
| WO | WO 2016/111271 A1 | 7/2016 |
| WO | WO 2016/111272 A1 | 7/2016 |
| WO | WO 2016/111273 A1 | 7/2016 |
| WO | WO 2016/111274 A1 | 7/2016 |
| WO | WO 2016/111275 A1 | 7/2016 |
| WO | WO 2016-199922 A1 | 12/2016 |

OTHER PUBLICATIONS

International Search Report, dated May 22, 2018, for International Application No. PCT/JP2018/006084, with an English translation.

(56) References Cited

OTHER PUBLICATIONS

Taiwanese Office Action and Search Report, dated Aug. 29, 2018, for corresponding Taiwanese Application No. 107105778.

* cited by examiner

HIGH STRENGTH STEEL SHEET

FIELD

The present invention relates to high strength steel sheet, more particularly high strength steel sheet with a tensile strength of 800 MPa or more, preferably 1100 MPa or more.

BACKGROUND

In recent years, from the viewpoint of improvement of fuel efficiency for the end purpose of environmental protection, higher strength of the steel sheet for automotive use has been strongly sought. In general, in ultra high strength cold rolled steel sheet, the methods of formation applied in soft steel sheet such as drawing and stretch forming, cannot be applied. As the method of formation, bending has become principal. Therefore, if using ultra high strength cold rolled steel sheet as a structural part of an automobile, excellent bendability becomes an important criteria for selection.

In this regard, in bending steel sheet, a large tensile stress acts in the circumferential direction of the surface layer part at the outer circumference of the bend. On the other hand, a large compressive stress acts on the surface layer part at the inner circumference of the bend. Therefore, the state of the surface layer part has a large effect on the bendability of ultra high strength cold rolled steel sheet. Accordingly, it is known that by providing a soft layer at the surface layer, the tensile stress and compressive stress occurring at the surface of the steel sheet at the time of bending are eased and the bendability is improved. Regarding high strength steel sheet having a soft layer at the surface layer in this way, PTLs 1 to 3 disclose the following such steel sheet and methods of producing the same.

First, PTL 1 describes high strength plated steel sheet characterized by having, in order from the interface of the steel sheet and plating layer toward the steel sheet side, an inner oxide layer containing an oxide of Si and/or Mn, a soft layer containing that inner oxide layer, and a hard layer comprised of structures of mainly martensite and bainite and having an average depth T of the soft layer of 20 μm or more and an average depth "t" of the inner oxide layer of 4 μm to less than T and a method of producing the same.

Next, PTL 2 describes high strength hot dip galvanized steel sheet characterized by having a value (ΔHv) of a Vickers hardness of a position 100 μm from the steel sheet surface minus a Vickers hardness of a position of 20 μm depth from the steel sheet surface of 30 or more and a method of producing the same.

Next, PTL 3 describes high strength hot dip galvanized steel sheet characterized by having a Vickers hardness at a position of 5 μm from the surface layer to the sheet thickness direction of 80% or less of the hardness at a ½ position in the sheet thickness direction and by having a hardness at a position of 15 μm from the surface layer to the sheet thickness direction of 90% or more of the Vickers hardness at a ½ position in the sheet thickness direction and a method of producing the same.

However, in each of PTLs 1 to 3, the variation of hardness of the soft layer is not sufficiently studied. For example, PTL 1 describes that the soft layer has an inner oxide layer, but, in this case, it is guessed that variation arises in hardness between the oxides and other structures inside the soft layer. If the hardness of the soft layer varies, sometimes sufficient bendability cannot be achieved in steel sheet having such a soft layer. Further, in each of PTLs 1 to 3 as well, control of the gradient of hardness at the transition zone between the soft layer of the surface layer and the hard layer of the inside is not alluded to at all.

CITATION LIST

Patent Literature

[PTL 1] JP 2015-34334
[PTL 2] JP 2015-117403
[PTL 3] WO 2016/013145

SUMMARY

Technical Problem

The present invention advantageously solves the problems harbored by the above-mentioned prior art, and an object of the present invention is to provide high strength steel sheet having bendability suitable as a material for auto parts.

Solution to Problem

The inventors engaged in intensive studies to solve the problems relating to the bendability of ultra high strength steel sheet. First, the present inventors referred to conventional knowledge to produce steel sheets having a soft layer at the surface layer and investigate their bendability. Each steel sheet having a soft layer at its surface layer showed improvement in bendability. At this time, it was learned that lowering the average hardness of the soft layer more and making the thickness of the soft layer greater generally acted in a direction where the bending was improved. However, the inventors continued to investigate this in more detail and as a result noticed that if using numerous types of methods to soften the surface layer, if just adjusting the average hardness of the soft layer of the surface layer and the thickness of the soft layer, the bendability of the steel sheet is not sufficiently improved.

Therefore, the inventors engaged in more detailed studies. As a result, they learned that double-layer steel sheet obtained by welding steel sheet having certain characteristics to one side or both sides of a matrix material and hot rolling or annealing them under specific conditions can improve the bendability the most. Further, they clarified that the biggest reason why the bendability is improved by the above method is the suppression of variation of micro hardness at the soft layer. This effect is extremely remarkable. Compared with when the variation of hardness of the soft layer is large, even if the average hardness of the soft layer is high and, further, even if the thickness of the soft layer is small, a sufficient improvement in bendability was obtained. Due to this, it became possible to minimize the deterioration of the tensile strength due to the soft layer and achieve both a tensile strength never obtained in the past, specifically a tensile strength of 800 MPa or more, preferably 1100 MPa or more, and bendability. The mechanism of this effect is not completely clear, but is believed to be as follows. If there is a variation of hardness at the soft layer, inside the soft layer, there will often be a plurality of structures (ferrite, pearlite, bainite, martensite, retained austenite) and/or oxides. The second phases (or second structures) with different mechanical characteristics become causes of concentration of strain and stress at the time of bending and can form voids becoming starting points of fracture. For this reason, it is believed that by suppressing variation of hardness of the soft layer, it was possible to improve the bendability. Further, the present inventors discovered that by not only suppressing variation in micro hardness at the soft layer of the surface layer but also reducing the gradient of the hardness in the sheet thickness direction at the region of transition from the soft layer of the surface layer to the hard layer at the inside (below, referred to as the "transition zone") simultaneously, the bendability is further improved. When the gradient of the hardness of the transition zone of the soft layer and hard layer is sharp, the amounts of plastic deformation of the soft layer and hard layer greatly differ and the possibility of fracture occurring in the transition zone becomes higher. From this, it is believed that the bendability can be further improved by suppressing the variations in micro hardness at the soft layer and in addition simultaneously reducing the gradient in hardness in the sheet thickness direction at the transition zone of the soft layer and hard layer.

Variation of hardness at other than the soft surface layer (below, referred to as the "hard layer") had no effect on the bendability. From this, it is possible to use steels which conventionally had been considered disadvantageous for bendability such as DP steel and TRIP (transformation induced plasticity) steel etc., excellent in ductility for the hard layer. The point that in addition to tensile strength and bendability, further, ductility can be achieved is one of the excellent points of the present invention.

Further, members for automobile use are worked into complicated shapes, so sometimes notching is included. If there is a notch, at the time of deformation, stress concentrates at the notch part. It is known that compared with the case of no notch, fracture results with a lower stress. Further, it is known that pining formed due to corrosion of the surface of the steel sheet etc., also gives rise to a similar notching effect. Such a notching effect becomes particularly remarkable under a high strain speed such as the time of collision of an automobile and is desirably avoided in design of automobiles for safety. The inventors further discovered that the structures at the soft layer at the surface layer included in the high strength steel sheet according to the present invention can suppress the notching effect even if a notch is present. This is believed to be because due to the reduction in variation of micro hardness of the soft layer of the surface layer, even if stress concentrates at the notch part, it does not readily become the starting point for fracture or steel sheet containing such a soft layer of the surface layer is easily deformed thereby blunting the notch.

The gist of the present invention obtained in this way is as follows:

(1) High strength steel sheet having a tensile strength of 800 MPa or more comprising a middle part in sheet thickness and a soft surface layer arranged at one side or both sides of the middle part in sheet thickness, wherein each soft surface layer has a thickness of more than 10 µm and 30% or less of the sheet thickness, the soft surface layer has an average Vickers hardness of 0.60 time or less the average Vickers hardness of the sheet thickness ½ position, and the soft surface layer has a nano-hardness standard deviation of 0.8 or less.

(2) The high strength steel sheet according to (1), wherein the high strength steel sheet further comprises a hardness transition zone formed between the middle part in sheet thickness and each soft surface layer while adjoining them, wherein the hardness transition zone has an average hardness change in the sheet thickness direction of 5000 (ΔHv/mm) or less.

(3) The high strength steel sheet according to (1) or (2), wherein the middle part in sheet thickness comprises, by area percent, 10% or more of retained austenite.

(4) The high strength steel sheet according to any one of (1) to (3), wherein the middle part in sheet thickness comprises, by mass %,
C: 0.05 to 0.8%,
Si: 0.01 to 2.50%,
Mn: 0.010 to 8.0%,
P: 0.1% or less,
S: 0.05% or less,
Al: 0 to 3%, and
N: 0.01% or less, and
a balance of Fe and unavoidable impurities.

(5) The high strength steel sheet according to (4), wherein the middle part in sheet thickness further comprises, by mass %, at least one element selected from the group consisting of:
Cr: 0.01 to 3%,
Mo: 0.01 to 1%, and
B: 0.0001% to 0.01%.

(6) The high strength steel sheet according to (4) or (5), wherein the middle part in sheet thickness further comprises, by mass %, at least one element selected from the group consisting of:
Ti: 0.01 to 0.2%,
Nb: 0.01 to 0.2%, and
V: 0.01 to 0.2%.

(7) The high strength steel sheet according to any one of (4) to (6), wherein the middle part in sheet thickness further comprises, by mass %, at least one element selected from the group consisting of:
Cu: 0.01 to 1%, and
Ni: 0.01 to 1%.

(8) The high strength steel sheet according to any one of (4) to (7), wherein the C content of the soft surface layer is 0.9 time or less the C content of the middle part in sheet thickness.

(9) The high strength steel sheet according to any one of (5) to (8), wherein the total of the Mn content, Cr content, and Mo content of the soft surface layer is 0.9 time or less the total of the Mn content, Cr content, and Mo content of the middle part in sheet thickness.

(10) The high strength steel sheet according to any one of (5) to (9), wherein the B content of the soft surface layer is 0.9 time or less the B content of the middle part in sheet thickness.

(11) The high strength steel sheet according to any one of (7) to (10), wherein the total of the Cu content and Ni content of the soft surface layer is 0.9 time or less the total of the Cu content and Ni content of the middle part in sheet thickness.

(12) The high strength steel sheet according to any one of (1) to (11), further comprising a hot dip galvanized layer, hot dip galvannealed layer, or electrogalvanized layer at the surface of the soft surface layer.

Advantageous Effects of Invention

The high strength steel sheet of the present invention has excellent bendability making it suitable as a material for auto part use. Therefore, the high strength steel sheet of the present invention can be suitably used as a material for auto part use. In addition, if the middle part in sheet thickness and the soft surface layer of the high strength steel sheet include between them a hardness transition zone with an average hardness change in the sheet thickness direction of 5000 (ΔHv/mm) or less, it is possible to further improve the bendability. Further, if the middle part in sheet thickness comprises, by area percent, 10% or more of retained austenite, in addition to improvement of the bendability, it is possible to improve the ductility. Furthermore, according to the high strength steel sheet of the present invention, it is possible to suppress the notching effect.

DESCRIPTION OF EMBODIMENTS

Figure 1:
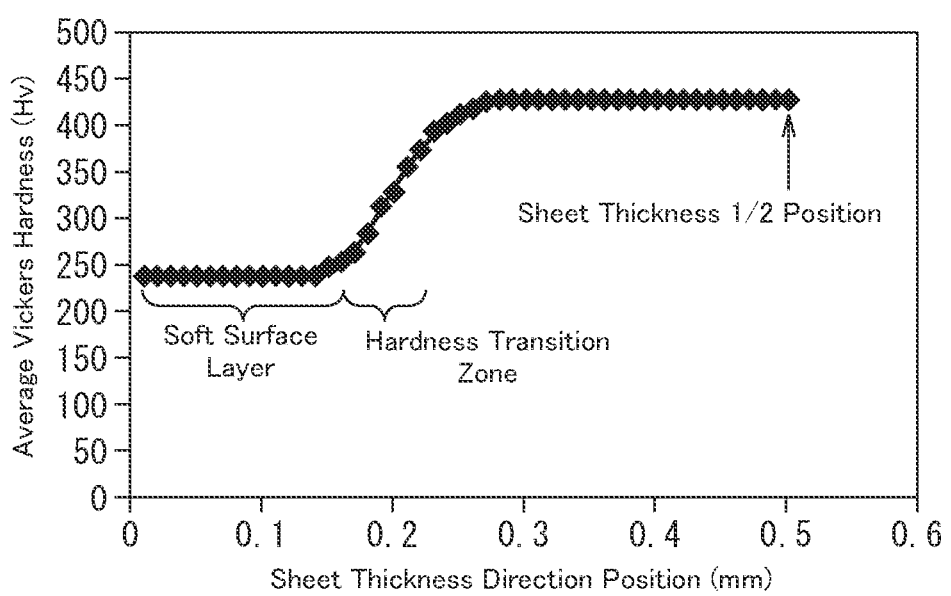
FIG. 1 shows one example of a distribution of hardness relating to high strength steel sheet according to a preferred embodiment of the present invention.

Below, embodiments of the present invention will be explained. The present invention is not limited to the following embodiments.

The steel sheet according to the present invention has to have an average Vickers hardness of the soft surface layer having a thickness of more than 10 μm and 30% or less of the sheet thickness, more specifically an average Vickers hardness of the soft surface layer as a whole, of 0.60 time or less the average Vickers hardness of the ½ position in sheet thickness. With a thickness of the soft surface layer of 10 μm or less, a sufficient improvement of the bendability is not obtained, while if greater than 30%, the tensile strength remarkably deteriorates. The thickness of the soft surface layer more preferably is 20% or less of the sheet thickness, still more preferably 10% or less.

In the present invention, "the average Vickers hardness of the soft surface layer" is determined as follows: First, at certain intervals in the sheet thickness direction from the ½ position of sheet thickness toward the surface (for example, every 5% of sheet thickness. If necessary, every 1% or 0.5%), the Vickers hardness at a certain position in the sheet thickness direction is measured by an indentation load of 100 g, then the Vickers hardnesses at a total of at least three points, for example, five points or 10 points, are measured in the same way by an indentation load of 100 g on a line from that position in the direction vertical to sheet thickness and parallel to the rolling direction. The average value of these is deemed the average Vickers hardness at that position in the sheet thickness direction. The intervals between the measurement points aligned in the sheet thickness direction and rolling direction are preferably four times or more the indents when possible. In this Description, a "distance of four times or more the indents" means the distance of four times or more the length of the diagonal line at the rectangular shaped opening of the indent formed by a diamond indenter when measuring the Vickers hardness. When the average Vickers hardness at a certain position in the sheet thickness direction becomes 0.6 time or less the similarly measured average Vickers hardness at the ½ position of sheet thickness, the surface side from that position is defined as the "soft surface layer". By randomly measuring the Vickers hardnesses at 10 points in the soft surface layer defined in this way and calculating the average value of these, the average Vickers hardness of the soft surface layer is determined. If the average Vickers hardness of the soft surface layer is 0.60 time or less the average Vickers hardness of the ½ position in sheet thickness, the bendability is improved more. More preferably, it is 0.40 time or less, still more preferably 0.30 time or less.

The nano-hardness standard deviation of the soft surface layer has to be 0.8 or less. This is because, as explained above, by suppressing variation of hardness of the soft surface layer, the bendability is remarkably improved. If the standard deviation is greater than 0.8, this effect is insufficient. From this viewpoint, the standard deviation is more preferably 0.6 or less, still more preferably 0.4 or less. The lower limit of the standard deviation is not designated, but making it 0.05 or less is technically difficult. What affects the bendability is in particular the variation in micro hardness of the soft surface layer in the direction vertical to the sheet thickness. Even if there is a moderate gradient of hardness inside the soft surface layer in the sheet thickness direction, the advantageous effect of the present invention is not impaired. Therefore, the nano-hardness standard deviation has to be measured at a certain position in the sheet thickness direction at positions vertical to the sheet thickness direction. In the present invention, "the nano-hardness standard deviation of the soft surface layer" means the standard deviation obtained by measuring the nano-hardnesses of a total of 100 locations at the ½ position of thickness of the soft surface layer defined above at 3 μm intervals on a line vertical to the sheet thickness direction and parallel to the rolling direction using a Hysitron tribo-900 under conditions of an indentation depth of 80 nm by a Berkovich shaped diamond indenter.

To further improve the bendability of the high strength steel sheet, the average hardness change in the sheet thickness direction of the hardness transition zone is preferably 5000 (ΔHv/mm) or less. In the present invention, the "hardness transition zone" is defined as follows: First, at certain intervals in the sheet thickness direction from the ½ position of sheet thickness toward the surface (for example, every 5% of sheet thickness. If necessary, every 1% or 0.5%), the Vickers hardness at a certain position in the sheet thickness direction is measured by an indentation load of 100 g, then the Vickers hardnesses at a total of at least three points, for example, five points or 10 points, are measured in the same way by an indentation load of 100 g on a line from that position in the direction vertical to sheet thickness and parallel to the rolling direction. The average value of these is deemed the average Vickers hardness at that position in the sheet thickness direction. The intervals between the measurement points aligned in the sheet thickness direction and rolling direction are preferably four times or more the indents when possible. When the average Vickers hardness at a certain position in the sheet thickness direction becomes 0.9 time or less the similarly measured average Vickers hardness at the ½ position of sheet thickness, the region from that position to the previously defined soft surface layer is defined as the hardness transition zone.

The average hardness change in the sheet thickness direction of the hardness transition zone (ΔHv/mm) is defined by the following formula:

$$\text{Average change hardness }(\Delta Hv/mm) = (\text{Maximum average hardness in Vickers hardnesses of hardness transition zone}) - (\text{Minimum average hardness in Vickers hardnesses of hardness transition zone})/\text{Thickness of hardness transition zone}$$

Here, the "maximum average hardness of the Vickers hardness of the hardness transition zone" is the largest value among the average Vickers hardnesses at different positions in the sheet thickness direction in the hardness transition zone, while the "minimum average hardness of the Vickers hardness of the hardness transition zone" is the smallest value among the average Vickers hardnesses at different positions in the sheet thickness direction in the hardness transition zone.

If the average hardness change in the sheet thickness direction of the hardness transition zone is larger than 5000 (ΔHv/mm), sometimes the bendability will fall. Preferably, it is 4000 (ΔHv/mm) or less, more preferably 3000 (ΔHv/mm) or less, most preferably 2000 (ΔHv/mm) or less. The thickness of the hardness transition zone is not prescribed. However, if the ratio of the hardness transition zone in the sheet thickness is large, since the tensile strength will fall, the hardness transition zone is preferably 20% or less of the sheet thickness at one surface. More preferably, it is 10% or less.

FIG. 1 shows one example of the distribution of hardness for high strength steel sheet according to a preferred embodiment of the present invention. It shows the distribution of hardness of a thickness 1 mm steel sheet from the surface to ½ position of sheet thickness. The abscissa shows the position in the sheet thickness direction (mm). The surface is 0 mm, while the ½ position of sheet thickness is 0.5 mm. The ordinate shows the average of five points of the Vickers hardness at different positions in the sheet thickness direction. The Vickers hardness of the ½ position of sheet thickness is 430 Hv. The surface side from the point where it becomes 0.6 time or less is the soft surface layer, while the range between the point where it becomes 0.9 time or less and the soft surface layer becomes the hardness transition zone.

To improve the ductility of the high strength steel sheet, the middle part in sheet thickness preferably includes, by area percent, 10% or more of retained austenite. This is so that the ductility is improved by the transformation induced plasticity of the retained austenite. With an area percent of retained austenite of 10% or more, a 15% or more ductility is obtained. If using this effect of retained austenite, even if soft ferrite is not included, a 15% or more ductility can be secured, so the middle part in sheet thickness can be higher in strength and both high strength and high ductility can be achieved. The "ductility" referred to here indicates the total elongation obtained by obtaining a Japan Industrial Standard JIS No. 5 test piece from the steel sheet perpendicular to the rolling direction and conducting a tensile test based on JIS Z2241.

Next, the chemical composition of the middle part in sheet thickness desirable for obtaining the advantageous effect of the present invention will be explained. The "%" relating to the content of elements means "mass %" unless otherwise indicated. In the middle part in sheet thickness, near the boundary with the soft surface layer, due to the diffusion of alloy elements with the soft surface layer, sometimes the chemical composition will differ from a position sufficiently far from the boundary. For example, when the high strength steel sheet of the present invention includes the above-mentioned hardness transition zone, at the middle part in sheet thickness, sometimes the chemical composition will differ between the vicinity of the boundary with the hardness transition zone and a position sufficiently far from the boundary. In such a case, the chemical composition measured near the ½ position of sheet thickness is determined as follows:

"C: 0.05 to 0.8%"

C raises the strength of steel sheet and is added so as to raise the strength of the high strength steel sheet. However, if the C content is more than 0.8%, the toughness becomes insufficient. Further, if the C content is less than 0.05%, the strength becomes insufficient. The C content is preferably 0.6% or less in range, more preferably is 0.5% or less in range.

"Si: 0.01 to 2.50%"

Si is a ferrite stabilizing element. It increases the Ac3 transformation point, so it is possible to form a large amount of ferrite at a broad range of annealing temperature. This is added from the viewpoint of improvement of the controllability of structures. To obtain such an effect, the Si content has to be 0.01% or more. On the other hand, from the viewpoint of securing the ductility, if the Si content is less than 0.30%, a large amount of coarse iron-based carbides are formed, the percentage of retained austenite structures in the inner microstructures cannot be 10% or more, and sometimes the elongation ends up falling. From this viewpoint, the lower limit value of Si is preferably 0.30% or more, more preferably 0.50% or more. In addition, Si is an element necessary for suppressing coarsening of the iron-based carbides at the middle part in sheet thickness and raising the strength and formability. Further, as a solution strengthening element, Si has to be added to contribute to the higher strength of the steel sheet. From these viewpoints, the lower limit value of Si is preferably 1% or more, more preferably 1.2% or more. However, if the Si content is more than 2.50%, the middle part in sheet thickness becomes brittle and the ductility deteriorates, so the upper limit is 2.50%. From the viewpoint of securing ductility, the Si content is preferably 2.20% or less, more preferably 2.00% or less.

"Mn: 0.010 to 8.0%"

Mn is added to raise the strength of the high strength steel sheet. To obtain such an effect, the Mn content has to be 0.010% or more. However, if the Mn content exceeds 8.0%, the distribution of the hardness of the steel sheet surface layer caused by segregation of Mn becomes greater. From this viewpoint, the content is preferably 5.0% or less, more preferably 4.0% or less, still more preferably 3.0% or less.

"P: 0.1% or Less"

P tends to segregate at the middle part in sheet thickness of the steel sheet and causes a weld zone to become brittle. If more than 0.1%, the embrittlement of the weld zone becomes remarkable, so the suitable range was limited to 0.1% or less. The lower limit of P content is not prescribed, but making the content less than 0.001% is economically disadvantageous.

"S: 0.05% or Less"

S has a detrimental effect on the weldability and also the manufacturability at the time of casting and hot rolling. Due to this, the upper limit value is 0.05% or less. The lower limit of the S content is not prescribed, but making the content less than 0.0001% is economically disadvantageous.

"Al: 0 to 3%"

Al acts as a deoxidizer and is preferably added in the deoxidation step. To obtain such an effect, the Al content has to be 0.01% or more. On the other hand, if the Al content is more than 3%, the danger of slab cracking at the time of continuous casting rises.

"N: 0.01% or Less"

Since N forms coarse nitrides and causes the bendability to deteriorate, the addition amount has to be kept down. If N is more than 0.01%, since this tendency becomes remarkable, the range of N content is 0.01% or less. In addition, N causes the formation of blowholes at the time of welding, and so should be small in content. Even if the lower limit value of the N content is not particularly determined, the effect of the present invention is exhibited, but making the N content less than 0.0005% invites a large increase in manufacturing costs, so this is the substantive lower limit value.

"At Least One Element Selected from the Group Comprised of Cr: 0.01 to 3%, Mo: 0.01 to 1%, and B: 0.0001 to 0.01%"

Cr, Mo, and B are elements contributing to improvement of strength and can be used in place of part of Mn. Cr, Mo, and B, alone or in combinations of two or more, are preferably respectively included in 0.01% or more, 0.01% or more, and 0.0001% or more. On the other hand, if the contents of the elements are too great, the pickling ability, weldability, hot workability, etc., sometimes deteriorate, so the contents of Cr, Mo, and B are preferably respectively 3% or less, 1% or less, and 0.01% or less.

"At Least One Element Selected from the Group Comprised of Ti: 0.01 to 0.2%, Nb: 0.01 to 0.2%, and V: 0.01 to 0.2%"

Ti, Nb, and V are strengthening elements. They contribute to the rise of strength of the steel sheet by precipitation strengthening, strengthening of crystal grains by suppression of growth of ferrite crystal grains, and dislocation strengthening through suppression of recrystallization. When added for this purpose, 0.01% or more is preferably added. However, if the respective contents are more than 0.2%, the precipitation of carbonitrides increases and the formability deteriorates.

"At Least One Element Selected from the Group Comprised of Cu: 0.01 to 1% and Ni: 0.01 to 1%"

Cu and Ni are elements contributing to improvement of strength and can be used in place of part of Mn. Cu and Ni, alone or together, are preferably respectively included in 0.01% or more. On the other hand, if the contents of the elements are too great, the pickling ability, weldability, hot workability, etc., sometimes deteriorate, so the contents of Cu and Ni are preferably respectively 1.0% or less.

Further, even if unavoidably adding the following elements to the middle part in sheet thickness, the effect of the present invention is not impaired. That is, O: 0.001 to 0.02%, W: 0.001 to 0.1%, Ta: 0.001 to 0.1%, Sn: 0.001 to 0.05%, Sb: 0.001 to 0.05%, As: 0.001 to 0.05%, Mg: 0.0001 to 0.05%, Ca: 0.001 to 0.05%, Zr: 0.001 to 0.05%, and REM (rare earth metals) such as Y: 0.001 to 0.05%, La: 0.001 to 0.05% and Ce: 0.001 to 0.05%.

The steel sheet in the present invention sometimes differs in chemical composition between the soft surface layer and the middle part in sheet thickness. In such a case, the preferable chemical composition at the soft surface layer is as follows:

"C: 0.90 Time or Less the C Content of Middle Part in Sheet Thickness and 0.72% or Less"

C raises the strength of steel sheet and is added for raising the strength of the high strength steel sheet. The C content of the soft surface layer is preferably 0.9 time or less the C content of the middle part in sheet thickness. This is to lower the hardness of the soft surface layer from the hardness of the middle part in sheet thickness. If larger than 0.9 time, sometimes the average Vickers hardness of the soft surface layer will not become 0.60 time or less the average Vickers hardness of the ½ position in sheet thickness. More preferably, the C content of the soft surface layer is 0.7 time or less the C content of the middle part in sheet thickness, more preferably 0.5 time or less, most preferably 0.3 time or less. If the C content of the soft surface layer is 0.9 time the C content of the middle part in sheet thickness, since the preferable C content of the middle part in sheet thickness is 0.8% or less, the preferable C content of the soft surface layer becomes 0.72% or less. Preferably the content is 0.5% or less, more preferably 0.3% or less, most preferably 0.1% or less. The lower limit of the C content is not particularly prescribed. If using industrial grade ultralow C steel, about 0.001% is the substantive lower limit, but from the viewpoint of the solid solution C amount, the Ti, Nb, etc., may be used to completely remove the solid solution C and use the steel as "interstitial free steel".

"Si: 0.01 to 2.5%"

Si is a ferrite stabilizing element. It increases the Ac3 transformation point, so it becomes possible to form a large amount of ferrite at a broad range of annealing temperatures, so is added from the viewpoint of improving the controllability of the structures. To obtain such effects, the Si content has to be 0.01% or more. However, since addition of more than 2.5% causes deterioration of the toughness, the content is 2.5% or less.

"Mn: 0.01 to 8.0%"

Mn is added to raise the strength of the high strength steel sheet. To obtain such an effect, the Mn content has to be 0.01% or more. However, if the Mn content is more than 8.0%, the distribution of hardness of the steel sheet surface layer caused by segregation of Mn becomes greater. From this viewpoint, the content is preferably 5% or less, more preferably 3% or less.

In addition, the total of the Mn content, Cr content, and Mo content of the soft surface layer is preferably 0.9 time or less the total of the Mn content, Cr content, and Mo content of the middle part in sheet thickness. This will be explained later, but the soft surface layer reduces the variation of hardness by making the majority of the structures recrystallized ferrite, nonrecrystallized ferrite, and transformed ferrite and reducing the fraction of nonrecrystallized ferrite. If the total of the Mn content, Cr content, and Mo content for improving the hardenability is larger than 0.9 time the total of the Mn content, Cr content, and Mo content of the middle part in sheet thickness, low temperature transformed structures easily form and variation of hardness is caused. More preferably, the total is 0.7 time or less, still more preferably 0.5 time or less, most preferably 0.3 time or less. The lower limit values of these are not prescribed.

"P: 0.1% or Less"

P makes the weld zone brittle. If more than 0.1%, the embrittlement of the weld zone becomes remarkable, so the suitable range was limited to 0.1% or less. The lower limit of the P content is not prescribed, but making the content less than 0.001% is economically disadvantageous.

"S: 0.05% or Less"

S has a detrimental effect on the weldability and the manufacturability at the time of casting and the time of hot rolling. Due to this, the upper limit value is 0.05% or less. The lower limit of the S content is not prescribed, but making the content less than 0.0001% is economically disadvantageous.

"Al: 0 to 3%"

Al acts as a deoxidizer and preferably is added in the deoxidation step. To obtain such an effect, the Al content has to be 0.01% or more. On the other hand, if the Al content is more than 3%, the danger of slab cracking at the time of continuous casting rises.

"N: 0.01% or Less"

Since N forms coarse nitrides and causes the bendability to deteriorate, the addition amount has to be kept down. If N is more than 0.01%, since this tendency becomes remarkable, the range of N content is 0.01% or less. In addition N becomes a cause of formation of blowholes at the time of welding, so the smaller the content the better. Even with the lower limit of the N content not particularly determined, the effect of the present invention is exhibited, but making the N content less than 0.0005% invites a large increase in manufacturing costs, and therefore this is substantively the lower limit value.

"At Least One Element Selected from the Group Comprising Cr: 0.01 to 3%, Mo: 0.01 to 1%, and B: 0.0001 to 0.01%"

Cr, Mo, and B are elements contributing to improvement of strength and can be used in place of part of Mn. Cr, Mo, and B, alone or in combinations of two or more, are preferably respectively included in 0.01% or more, 0.01% or more, and 0.0001% or more. On the other hand, if the contents of the elements are too great, since the pickling ability, weldability, hot workability, etc., sometimes deteriorate, the Cr, Mo, and B contents are preferably respectively 3% or less, 1% or less, and 0.01% or less. Further, there is a preferable range for the total of Cr and Mo with Mn. This is as explained above.

Further, the B content of the soft surface layer is preferably 0.9 time or less the B content of the middle part in sheet thickness. If the B content for improving the hardenability is larger than 0.9 time the B content of the middle part in sheet thickness, low temperature transformed structures easily forms and variation of hardness is caused. More preferably, it is 0.7 time or less, still more preferably 0.5 time or less, most preferably 0.3 time or less. No lower limit values of these are prescribed.

"At Least One Type of Element Selected from the Group Comprising Ti: 0.01 to 0.2%, Nb: 0.01 to 0.2%, and V: 0.01 to 0.2%"

Ti, Nb, and V are strengthening elements. They contribute to the rise of strength of the steel sheet by precipitation strengthening, strengthening of crystal grains by suppression of growth of ferrite crystal grains, and dislocation strengthening through suppression of recrystallization. When added for this purpose, 0.01% or more is preferably added. However, if the respective contents are more than 0.2%, the precipitation of carbonitrides increases and the formability deteriorates.

"At Least One Element Selected from the Group Comprised of Cu: 0.01 to 1% and Ni: 0.01 to 1%"

Cu and Ni are elements contributing to improvement of strength and can be used in place of part of Mn. Cu and Ni, alone or together, are preferably respectively included in 0.01% or more. On the other hand, if the contents of the elements are too great, the pickling ability, weldability, hot workability, etc., sometimes deteriorate, so the contents of Cu and Ni are preferably respectively 1.0% or less.

Further, the total of the Cu content and Ni content of the soft surface layer is preferably 0.9 time or less the total of the Cu content and Ni content of the middle part in sheet thickness. If the total of the Cu content and Ni content for improving the hardenability is larger than 0.9 time the total of the Cu content and Ni content of the middle part in sheet thickness, low temperature transformed structures easily form and variation of hardness is caused. More preferably, it is 0.7 time or less, still more preferably 0.5 time or less, most preferably 0.3 time or less. No lower limit values of these are prescribed.

Furthermore, even if intentionally or unavoidably adding the following elements to the soft surface layer, the effect of the present invention is not impaired. That is, O: 0.001 to 0.02%, W: 0.001 to 0.1%, Ta: 0.001 to 0.1%, Sn: 0.001 to 0.05%, Sb: 0.001 to 0.05%, As: 0.001 to 0.05%, Mg: 0.0001 to 0.05%, Ca: 0.001 to 0.05%, Zr: 0.001 to 0.05%, and Y: 0.001 to 0.05%, La: 0.001 to 0.05%, Ce: 0.001 to 0.05%, and other REM (rare earth metal).

The effect of the present invention, i.e., the excellent bendability and/or ductility, can similarly be achieved even if treating the surface of the soft surface layer by hot dip galvanizing, hot dip galvannealing, electrogalvanizing, etc.

Next, the mode of the method of production for obtaining the high strength steel sheet of the present invention will be explained. The following explanation aims at a simple illustration of the method of production for obtaining the high strength steel sheet of the present invention. It is not intended to limit the strength steel sheet of the present invention to double-layer steel sheet comprised of two steel sheets stacked together as explained below. For example, it is also possible to decarburize a single-layer steel sheet to soften the surface layer part and thereby produce a high strength steel sheet comprised of a soft surface layer and a middle part in sheet thickness.

The degreased matrix steel sheet satisfying the above constituents of the middle part in sheet thickness has the surface layer-use steel sheet superposed on one or both surfaces.

By hot rolling, cold rolling, continuously annealing, continuously hot dip coating, and otherwise treating the above-mentioned multilayer member (double-layer steel sheet), the high strength steel sheet according to the present invention, more specifically a hot rolled steel sheet, cold rolled steel sheet, and plated steel sheet, can be obtained.

For example, the method for producing hot rolled steel sheet among the high strength steel sheets encompassed by the present invention is characterized by comprising:

superposing on one or both surfaces of a matrix steel sheet having a chemical composition explained above and forming a middle part in sheet thickness a surface layer-use steel sheet having a chemical composition similarly explained above and forming a soft surface layer to form a double-layer steel sheet, heating the double-layer steel sheet to a heating temperature of 1100° C. or more and 1350° C. or less, preferably more than 1150° C. and 1350° C. or less, then hot rolling it, wherein the hot rolling comprises rough rolling and finish rolling of a finishing temperature of 800 to 980° C., the rough rolling is performed two times under conditions of a rough rolling temperature of 1100° C. or more, a sheet thickness reduction rate per pass of 5% or more and less than 50%, and a time between passes of 3 seconds or more, and holding the hot rolled double-layer steel sheet in a cooling process at a temperature of 700° C. to 500° C. for 3 seconds or more, then coiling it at a coiling temperature of 600° C. or less.

If making an element diffuse between the matrix steel sheet and surface layer-use steel sheet and forming between the two a hardness transition zone with an average hardness change in the sheet thickness direction of 5000 ($\Delta$Hv/mm) or less, in the hot rolling step, it is preferable to heat the double-layer steel sheet by a heating temperature of 1100° C. or more and 1350° C. or less for 2 hours, more preferably to heat it at more than 1150° C. and 1350° C. or less for 2 hours or more.

To make the retained austenite of the middle part in sheet thickness in the high strength steel sheet an area percent of 10% or more to improve the ductility of the high strength steel sheet, the coiling temperature is preferably a temperature of the martensite transformation start temperature Ms to the bainite transformation start temperature Bs of the matrix steel sheet.

Here, $$Bs(°C.)=820-290C/(1-Sf)-37Si-90Mn-65Cr-50Ni+70Al$$

$$Ms(°C.)=541-474C/(1-Sf)-15Si-35Mn-17Cr-17Ni+19Al$$

where, C, Si, Mn, Cr, Ni, and Al are the contents (mass %) of the elements of the matrix steel sheet, while Sf is the area percent of ferrite in the matrix steel sheet.

Figure 2:
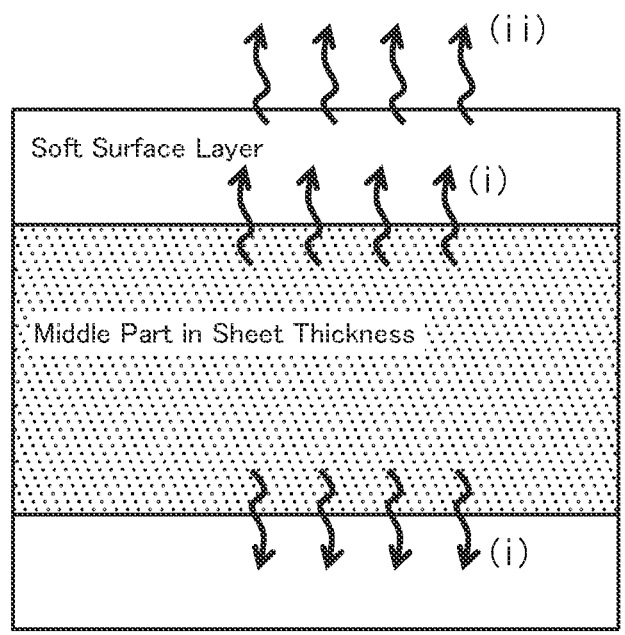
FIG. 2 is a schematic view explaining diffusion of C atoms at the time of production of the high strength steel sheet of the present invention.

If explaining the steps in more detail, if obtaining hot rolled steel sheet, first, the double-layer steel sheet prepared by the above method is heated by a heating temperature of 1100° C. or more, preferably more than 1150° C. and 1350° C. or less. To suppress anisotropy of the crystal orientations due to casting, the heating temperature of the slab is preferably 1100° C. or more. On the other hand, since heating a slab to more than 1350° C. requires input of a large amount of energy and invites a large increase in manufacturing costs, the heating temperature is 1350° C. or less. Further, to control the nano-hardness standard deviation of the soft surface layer to 0.8 or less and, further, when there is a hardness transition zone, give that a steady hardness change, the concentrations of the alloy elements, in particular the C atoms, have to be controlled so as to be steadily distributed. The distribution of the C concentration is obtained by diffusion of the C atoms. The frequency of diffusion of C atoms increases the higher the temperature. Therefore, to control the concentration of C, control from the hot rolling heating to the rough rolling becomes important. In hot rolling heating, to promote the diffusion of C atoms, the heating temperature has to be higher. Preferably, it is 1100° C. or more and 1350° C. or less, more preferably more than 1150° C. and 1350° C. or less. In hot rolling heating, the changes of (i) and (ii) shown in FIG. 2 occur. (i) shows the diffusion of C atoms from the middle part in sheet thickness to the soft surface layer, while (ii) shows the decarburization reaction of C being disassociated from the soft surface layer to the outside. The distribution of the concentration of C arises due to the balance between the diffusion of C atoms and disassociation reaction of this (i) and (ii). If less than 1100° C., since the reaction of (i) is insufficient, the preferable distribution of concentration of C is not obtained. On the other hand, if more than 1350° C., since the reaction of (ii) excessively occurs, similarly the preferred distribution of concentration is not obtained.

Figure 3:
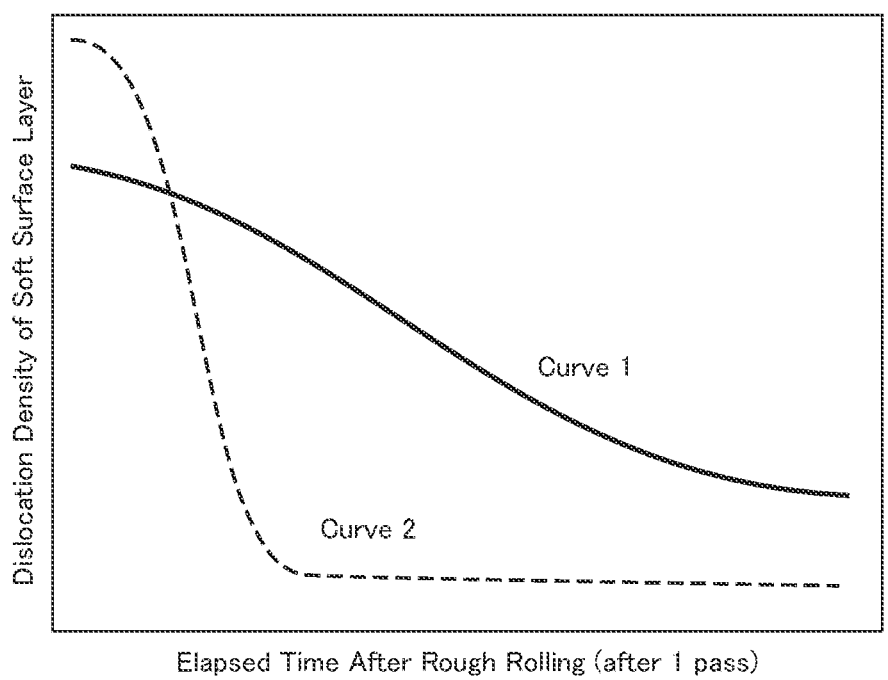
FIG. 3 is a graph showing a change in dislocation density after a rolling pass relating to rough rolling used in the method of producing the high strength steel sheet of the present invention.

Furthermore, to obtain a furthermore suitable distribution of concentration of C after controlling the distribution to the preferable distribution of concentration of C by adjustment of the hot rolling heating temperature, pass control in the rough rolling is extremely important. The rough rolling is performed two times or more under conditions of a rough rolling temperature of 1100° C. or more, a sheet thickness reduction rate per pass of 5% or more and less than 50%, and a time between passes of 3 seconds or more. This is so as to promote the diffusion of C atoms of (i) in FIG. 2 by the strain introduced in the rough rolling. If using an ordinary method for rough rolling and finish rolling a slab controlled to a preferable state of concentration of C by hot rolling heating, the sheet thickness would be reduced without the C atoms being sufficiently diffused inside the soft surface layer. Therefore, if producing hot rolled steel sheet of a thickness of several mm by hot rolling by an ordinary method from a slab having a thickness of more than 200 mm, the result would be a steel sheet with a concentration of C rapidly changing at the soft surface layer and a steady hardness change could no longer be obtained. The method discovered for solving this is the above pass control of rough rolling. The diffusion of C atoms is greatly affected by not only temperature, but also strain (dislocation density). In particular, compared with lattice diffusion, with dislocation diffusion, the diffusion frequency rises 10 times or more higher, so steps are required for making the sheet thickness thinner by rolling while leaving the dislocation density. The curve 1 of FIG. 3 shows the change in dislocation density after a rolling pass when the sheet thickness reduction rate per pass in rough rolling is small. It is learned that strain remains over a long period of time. By leaving strain at the soft surface layer over a long period of time in this way, sufficient diffusion of C atoms inside the soft surface layer occurs and the optimal distribution of concentration of C can be obtained. On the other hand, curve 2 shows the change in the dislocation density when the sheet thickness reduction rate is large. If the amount of strain introduced by rolling becomes higher, recovery is easily promoted and the dislocation density rapidly falls. For this reason, to obtain the optimal distribution of concentration of C, it is necessary to prevent a change in the dislocation density such as shown in the curve 2. From such a viewpoint, the upper limit of the sheet thickness reduction rate per pass becomes less than 50%. To promote the diffusion of C atoms at the soft surface layer, securing certain amounts of dislocation density and holding time becomes necessary, so the lower limit of the sheet thickness reduction rate becomes 5% and a time between passes of 3 seconds or more must be secured.

Further, when forming a hardness transition zone, the heating time of the slab is 2 hours or more. This is so as to cause elements to diffuse between the matrix steel sheet and the surface layer-use steel sheet during slab heating and reduce the average hardness change of the hardness transition zone formed between the two. If the heating time is shorter than 2 hours, the average hardness change of the hardness transition zone will not become sufficiently small. The upper limit of the heating time is not prescribed, but heating for 8 hours or more requires a large amount of heating energy and is not preferable from the cost aspect.

After heating the slab, it is hot rolled. If the end temperature of the hot rolling (finishing temperature) is less than 800° C. the rolling reaction force will become higher and it will become difficult to stably obtain the designated sheet thickness. For this reason, the end temperature of the hot rolling is 800° C. or more. On the other hand, making the end temperature of the hot rolling more than 980° C. requires an apparatus for heating the steel sheet from the end of heating of the slab to the end of the hot rolling. A high cost is required. Therefore, the end temperature of the hot rolling is 980° C. or less.

After that, in the cooling process, the sheet is held at a temperature between 700° C. to 500° C. for 3 seconds or more. This is an important condition in the present invention. This step is necessary for making only the soft layer of the surface layer transform to ferrite and reduce the variation of hardness. At a temperature of 700° C. or more, the ferrite transformation is delayed, so the surface layer cannot be ferrite. At 500° C. or less, part of the surface layer becomes low temperature transformed structures. If there are a plurality of structures of ferrite and low temperature transformed structures, this becomes a cause of variation of hardness of the surface layer, so the holding temperature is 500° C. or more. The holding time is 3 seconds or more. To make the ferrite transformation of the surface layer advance sufficiently, the sheet has to be held for 3 seconds or more. Preferably, the holding time is 5 seconds or more. More preferably it is 10 seconds or more.

The coiling temperature is 600° C. or less. This is so as to form low temperature transformed structures in the matrix steel sheet and obtain high strength steel. Preferably, it is 500° C. or less, more preferably 400° C. or less. In this way, by changing the timings of transformation of the matrix steel sheet and the surface layer-use steel sheet, structures with small variations in hardness are obtained in the surface layer. This is one of the features of the present invention. Further, to make the retained austenite of the middle part in sheet thickness at the high strength steel sheet an area percent of 10% or more to improve the ductility of the high strength steel sheet, the coiling temperature is a temperature of the bainite transformation temperature region of the matrix steel sheet, i.e., a temperature of the martensite transformation start temperature Ms to the bainite transformation start temperature Bs of the matrix steel sheet. This is to cause bainite or martensite to form at the matrix steel sheet to obtain high strength steel and further to stabilize the retained austenite. In this way, by changing the timings of transformation of the matrix steel sheet and the surface layer-use steel sheet, structures with small variations in hardness are obtained in the surface layer. This is one of the features of the present invention. In the present invention, the martensite transformation start temperature Ms and bainite transformation start temperature Bs are calculated by the following formulas:

$$Bs(°\text{ C.})=820-290C/(1-Sf)-37Si-90Mn-65Cr-50Ni+70Al$$

$$Ms(°\text{ C.})=541-474C/(1-Sf)-15Si-35Mn-17Cr-17Ni+19Al$$

where, C, Si, Mn, Cr, Ni, and Al are the contents (mass %) of the elements of the matrix steel sheet, while Sf is the area percent of ferrite in the matrix steel sheet.

It is difficult to find the area percent of ferrite during the manufacture of steel sheet, so in the present invention, in calculating Bs and Ms, a sample of the cold rolled sheet before entering the annealing step is taken and annealed by the same temperature history as the annealing step. The area percent of the ferrite found is used.

Next, the method for obtaining cold rolled steel sheet among the high strength steel sheets encompassed by the present invention will be explained. The method for producing the cold rolled steel sheet is characterized by comprising:
  superposing on one or both surfaces of a matrix steel sheet having a chemical composition explained above and forming a middle part in sheet thickness a surface layer-use steel sheet having a chemical composition similarly explained above and forming a soft surface layer to form a double-layer steel sheet,
  heating the double-layer steel sheet by a heating temperature of 1100° C. or more and 1350° C. or less, more preferably more than 1150° C. and 1350° C. or less, then hot rolling and cold rolling it, wherein the hot rolling comprises rough rolling and finish rolling at a finishing temperature of 800 to 980° C., the rough rolling is performed two times or more under conditions of a rough rolling temperature of 1100° C. or more, a sheet thickness reduction rate per pass of 5% or more and less than 50%, and a time between passes of 3 seconds or more, and
  holding the rolled double-layer steel sheet at a temperature of the Ac3 point of the matrix steel sheet minus 50° C. or more and 700° C. or more and 900° C. or less for 5 seconds or more, then cooling from 750° C. to 550° C. or less by an average cooling rate of 100° C./s or less,
  where $$Ac3=910-203\sqrt{C}+44.7Si-30Mn+700P-20Cu-15.2Ni-11Cr+31.5Mo+400Ti+104V+400Al \quad \text{(formula 1)}$$

where C, Si, Mn, P, Cu, Ni, Cr, Mo, Ti, V, and Al are contents (mass %) of the elements.

Further, if making elements diffuse between the matrix steel sheet and the surface layer-use steel sheet and forming between the two a hardness transition zone with an average hardness change in the sheet thickness direction of 5000 (ΔHv/mm) or less, preferably the above double-layer steel sheet is heated to the heating temperature of 1100° C. or more and 1350° C. or less or more than 1150° C. and 1350° C. or less for 2 hours or more then is hot rolled and cold rolled.

Further, the method preferably includes making the retained austenite of the middle part in sheet thickness in the high strength steel sheet an area percent of 10% or more to improve the ductility of the high strength steel sheet and annealing the rolled double-layer steel sheet by running it through a continuous annealing line instead of the steps after cold rolling prescribed above. The annealing at the continuous annealing line preferably includes, first, holding the double-layer steel sheet at a heating temperature of 700° C. or more and 900° C. or less for 5 seconds or more,
  then, optionally, preliminarily cooling the double-layer steel sheet from the heating temperature so that it remains at a preliminary cooling stop temperature of the Bs point of the matrix steel sheet to less than the Ac3 point minus 20° C. for 5 seconds or more and less than 400 seconds,
  then cooling the double-layer steel sheet to the cooling stop temperature of the Ms of the matrix steel sheet minus 100° C. to less than Bs by an average cooling rate of 10° C./s or more, and
  then making the double-layer steel sheet stop in the temperature region of the Ms of the matrix steel sheet minus 100° C. or more for 30 seconds or more and 600 seconds or less.

$$Ac3(°\text{ C.})=910-203\sqrt{C}+44.7Si-30Mn+700P-20Cu-15.2Ni-11Cr+31.5Mo+400Ti+104V+400Al \quad \text{(formula 1)}$$

$$Bs(°\text{ C.})=820-290C/(1-Sf)-37Si-90Mn-65Cr-50Ni+70Al \quad \text{(formula 2)}$$

$$Ms(°\text{ C.})=541-474C/(1-Sf)-15Si-35Mn-17Cr-17Ni+19Al \quad \text{(formula 3)}$$

where, C, Si, Mn, P, Cu, Ni, Cr, Mo, Ti, V, and Al are the contents (mass %) of the elements of the matrix steel sheet, while Sf is the area percent of ferrite in the matrix steel sheet.

Explaining the steps in more detail, first, the double-layer steel sheet fabricated by the above method, as explained in the method for producing hot rolled steel sheet, is heated to a heating temperature of 1100° C. or more and 1350° C. or less or more than 1150° C. and 1350° C. or less, then is hot rolled and, for example, is coiled at a coiling temperature of 20° C. or more and 700° C. or less. Next, the thus produced hot rolled steel sheet is pickled. The pickling is for removing the oxides on the surface of the hot rolled steel sheet and may be performed one time or may be performed divided into several times. When forming a hardness transition zone, preferably, first, the double-layer steel sheet is heated to a heating temperature of 1100° C. or more and 1350° C. or less or more than 1150° C. and 1350° C. or less for 2 hours or more. This is so as to make elements diffuse between the matrix steel sheet and the surface layer-use steel sheet during heating and to make the average hardness change of the hardness transition zone formed between the two smaller. If the heating time is shorter than 2 hours, the average hardness change of the hardness transition zone will not become sufficiently small. Next, the thus produced hot rolled steel sheet is pickled. The pickling is for removing the oxides on the surface of the hot rolled steel sheet and may be performed one time or may be performed divided into several times.

In the cold rolling, if the total of the rolling reduction is more than 85%, the ductility of the matrix steel sheet is lost and during cold rolling, the danger of the matrix steel sheet fracturing rises, so the total of the rolling reduction is preferably 85% or less. On the other hand, to sufficiently proceed with recrystallization of the soft layer in the annealing step, the total of the rolling reduction is preferably 20% or more, more preferably 30% or more. For the purpose of lowering the cold rolling load before cold rolling, the sheet may be annealed at a temperature of 700° C. or less.

Next, the annealing will be explained. First, in the present invention, as explained above, the soft layer is a system of constituents with lower hardenability compared with the hard layer, so at the time of annealing, almost no low temperature transformed structures are formed. In the structures after annealing, the part transformed once to austenite becomes transformed ferrite, while the part not transformed to austenite becomes recrystallized ferrite or nonrecrystallized ferrite. Among these, the main reason for variation of hardness is the nonrecrystallized ferrite with the large hardness, so in the following explanation, reduction of the nonrecrystallized ferrite becomes the focal point of the invention.

In annealing, the matrix steel sheet is heated until the Ac3 point minus 50° C. or more and 700° C. or more and 900° C. or less and held for 5 seconds or more. The reason for making the temperature the Ac3 point of the matrix steel sheet minus 50° C. or more is that by heating the matrix steel sheet to the dual-phase region of ferrite and austenite or the single-phase region of austenite, subsequent heat treatment enables transformed structures to be obtained and the necessary strength to be obtained. With a temperature lower than this, the strength remarkably falls. The temperature is 700° C. or more so as to make the recrystallization of the soft layer sufficiently proceed and lower the nonrecrystallized fraction and thereby lower the variation of hardness. With a temperature lower than 700° C., the variation of hardness of the soft layer becomes greater. If heating to 900° C. or more, the former γ grain size of the hard layer becomes coarser and the toughness deteriorates, so this is not preferable. The sheet has to be held at the heating temperature for 5 seconds or more. If the holding time is 5 seconds or less, the austenite transformation of the matrix steel sheet insufficiently proceeds and the strength remarkably falls. Further, the soft layer becomes insufficiently recrystallized and the variation of hardness of the surface layer becomes greater. From these viewpoints, the holding time is preferably 10 seconds or more. More preferably, it is 20 seconds or more.

Next, in the cooling, the sheet is cooled from 750° C. to 550° C. or less by an average cooling rate of 100° C./s or less. The lower limit value of the average cooling rate is not particularly limited, but may for example be 2.5° C./s. The reason for making the lower limit value of the average cooling rate 2.5° C./s is to keep ferrite transformation from occurring at the matrix steel sheet and the matrix steel sheet softening. If the average cooling rate is slower than 2.5° C./s, the strength remarkably falls. More preferably it is 5° C./s or more, more preferably 10° C./s or more, still more preferably 20° C./s or more. If 750° C. or more, it becomes remarkably hard for ferrite transformation to occur, so the cooling rate is not limited. With a temperature of 550° C. or less, lower temperature transformed structures are obtained, so the cooling rate is not limited. If cooling by a rate faster than 100° C./s, low temperature transformed structures form at the surface layer as well and variation of hardness is caused, so the sheet is cooled at 100° C./s or less. More preferably the rate is 50° C./s. Still more preferably it is 20° C./s or less.

At 550° C. or less, the sheet may be cooled down to room temperature by a certain cooling rate. By holding this at a temperature of 200° C. to 550° C. or so, the bainite transformation can be promoted and the martensite can be tempered. However, if holding at 300° C. to 550° C. for a long time, there is a possibility of the strength falling, so if holding at this temperature, the holding time is preferably 600 seconds or less.

To make the retained austenite at the middle part in sheet thickness in the high strength steel sheet an area percent of 10% or more and improve the ductility of the high strength steel sheet, instead of the annealing and cooling explained above, the following annealing and cooling are preferably performed. First, in the annealing, the sheet is heated to 700° C. or more and 900° C. or less and held there for 5 seconds or more. The reason for making the temperature 700° C. or more is to make the recrystallization of the softened layer sufficiently proceed so as to lower the nonrecrystallized fraction and reduce the variation of hardness. With a temperature lower than 700° C., the variation of hardness of the softened layer becomes greater. If heating to 900° C. or more, the former γ grain size of the hard layer coarsens and the toughness deteriorates, so this is not preferred. The sheet has to be held at the heating temperature for 5 seconds or more. If the holding time is 5 seconds or less, the austenite transformation of the matrix steel sheet does not sufficiently proceed and the strength remarkably drops. Further, the softened layer becomes insufficiently recrystallized and the variation of hardness of the surface layer becomes greater. From these viewpoints, the holding time is preferably 10 seconds or more. Still more preferably it is 20 seconds or more.

The annealing, for example, is performed by running the rolled double-layer steel sheet through a continuous annealing line. Here, "annealing through a continuous annealing line" includes, first, holding the double-layer steel sheet at a heating temperature of 700° C. or more 900° C. or less heating temperature for 5 seconds or more, then optionally preliminarily cooling the double-layer steel sheet from the heating temperature so that it remains at a preliminary cooling stop temperature of the Bs point of the matrix steel sheet to less than the Ac3 point minus 20° C. for 5 seconds or more and less than 400 seconds. Such a preliminary cooling step may be performed in accordance with need. A subsequent cooling step may also be performed without the preliminary cooling step.

After the optional preliminary cooling step, the annealing on the continuous annealing line includes cooling the double-layer steel sheet until the cooling stop temperature of the Ms of the matrix steel sheet minus 100° C. to less than Bs by an average cooling rate of 10° C./s or more and next making the double-layer steel sheet stop in a temperature region of Ms of the matrix steel sheet minus 100° C. or more, more preferably a temperature region of 300° C. or more and 500° C. or less, for 30 seconds or more and 600 seconds or less. While stopping, the sheet may if necessary be heated and cooled any number of times. To stabilize the retained austenite, this stopping time is important. With the necessary stopping time of less than 30 seconds, it is difficult to obtain 10% or more of retained austenite. On the other hand, if 600 seconds or more, due to the progression of softening in the structures as a whole, sufficient strength becomes difficult to obtain. In the present invention, Ac3, Bs, and Ms are calculated by the following formulas:

$$Ac3(° C.)=910-203\sqrt{C}+44.7Si-30Mn+700P-20Cu-15.2Ni-11Cr+31.5Mo+400Ti+104V+400Al$$

$$Bs(° C.)=820-290C/(1-Sf)-37Si-90Mn-65Cr-50Ni+70Al$$

$$Ms(° C.)=541-474C/(1-Sf)-15Si-35Mn-17Cr-17Ni+19Al \quad \text{(formula 1)}$$

where, C, Si, Mn, P, Cu, Ni, Cr, Mo, Ti, V, and Al are the contents (mass %) of the elements of the matrix steel sheet, while Sf is the area percent of ferrite in the matrix steel sheet.

It is difficult to find the area percent of ferrite in steel sheet, so in the present invention, in calculating Bs and Ms, a sample of the cold rolled sheet before entering the annealing step is taken and annealed by the same temperature history as the annealing step. The area percent of the ferrite found is used.

After that, when performing hot dip galvanization, the plating bath temperature need only be a condition applied in the past. For example, the condition of 440° C. to 550° C. may be applied. Further, after performing the hot dip galvanization, when heating the steel sheet for alloying to prepare hot dip galvannealed steel sheet, the heating temperature of the alloying in that case need only be a condition applied in the past. For example, the condition of 400° C. to 600° C. may be applied. The heating system of alloying is not particularly limited. It is possible to use direct heating by combustion gas, induction heating, direct electrical heating, or another heating system corresponding to the hot dip coating facility from the past.

After the alloying treatment, the steel sheet is cooled to 200° C. or less and if necessary is subjected to skin pass rolling.

When producing electrogalvanized steel sheet, for example, there is the method of performing, as pretreatment for plating, alkali degreasing, rinsing, pickling, and rinsing again, then electrolytically treating the pretreated steel sheet using a solution circulating type electroplating apparatus and using a plating bath comprised of zinc sulfate, sodium sulfate, and sulfuric acid by a current density of 100 A/dm² or so until reaching a predetermined plating thickness.

Finally, the preferable constituents of the surface layer-use steel sheet will be shown. The steel sheet in the present invention sometimes differs in chemical composition between the soft surface layer and the middle part in sheet thickness. In such a case, the preferable chemical composition in the surface layer-use steel sheet forming the soft surface layer is as follows:

The C content of the surface layer-use steel sheet is preferably 0.9 time or less the C content of the matrix steel sheet. This is so as to lower the hardness of the surface layer-use steel sheet from the hardness of the matrix steel sheet. If greater than 0.9 time, in the finally obtained high strength steel sheet, sometimes the average Vickers hardness of the soft surface layer will not become 0.60 time or less the average Vickers hardness of the ½ position in sheet thickness. More preferably, the C content of the surface layer-use steel sheet is 0.7 time or less the C content of the matrix steel sheet, still more preferably 0.5 time or less, most preferably 0.3 time or less.

The total of the Mn content, Cr content, and Mo content of the surface layer-use steel sheet is preferably 0.9 time or less the total of the Mn content, Cr content, and Mo content of the matrix steel sheet. If the total of the Mn content, Cr content, and Mo content for raising the hardenability is larger than 0.9 time the total of the Mn content, Cr content, and Mo content of the matrix steel sheet, it is easy to form low temperature transformed structures and variation of hardness is caused. More preferably, the total is 0.7 time or less, still more preferably 0.5 time or less, most preferably 0.3 time or less.

The B content of the surface layer-use steel sheet is preferably 0.9 time or less the B content of the matrix steel sheet. If the B content for improving the hardenability is larger than 0.9 time the matrix steel sheet, it is easy to form low temperature transformed structures and variation of hardness is caused. More preferably, the B content is 0.7 time or less, still more preferably 0.5 time or less, most preferably 0.3 time or less.

The total of the Cu content and Ni content of the surface layer-use steel sheet is preferably 0.9 time or less the total of the Cu content and Ni content of the matrix steel sheet. If the total of the Cu content and Ni content for improving the hardenability is larger than 0.9 time the total of the Cu content and Ni content of the matrix steel sheet, it is easy to form low temperature transformed structures and variation of hardness is caused. More preferably, the total is 0.7 time or less, still more preferably 0.5 time or less, most preferably 0.3 time or less.

The surface layer-use steel sheet may contain, in addition to the above elements, Si, P, S, Al, N, Cr, B, Ti, Nb, V, Cu, Ni, O, W, Ta, Sn, Sb, As, Mg, Ca, Y, Zr, La, and Ce. The preferable ranges of composition of the above elements are similar to the preferable ranges of the middle part in sheet thickness.

Next, the method of identification of the steel structures according to the present invention will be explained. Steel structures can be identified by observing the cross-section of the steel sheet parallel to the rolling direction and thickness direction and/or the cross-section vertical to the rolling direction by a power of 500× to 10000×. For example, a sample of the steel sheet is cut out, then the surface polished to a mirror finish by machine polishing, then a Nital reagent is used to reveal the steel structures. After that, the steel structures at the region of a depth from the surface of about ½ of the thickness of the steel sheet are examined using a scanning electron microscope (SEM). Due to this, it is possible to measure the area percent of ferrite of the matrix steel sheet. Further, in the present invention, the area percent of the retained austenite at the middle part in sheet thickness is determined as follows by X-ray measurement. First, the part from the surface of the steel sheet down to ½ of the thickness of the steel sheet is ground away by mechanical polishing and chemical polishing. The chemically polished surface is measured using MoKα rays as the characteristic X rays. Further, from the integrated intensity ratio of the diffraction peaks of (200) and (211) of the body centered cubic lattice (bcc) phases and (200), (220), and (311) of the face centered cubic lattice (fcc) phases, the following formula is used to calculate the area percent of retained austenite at the middle part in sheet thickness:

$$S\gamma=(I_{200f}+I_{220f}+I_{311f})/(I_{200b}+I_{211b})\times 100$$

($S\gamma$ indicates the area percent of retained austenite at the middle part in sheet thickness, $I_{200f}$, $I_{220f}$, and $I_{311f}$ indicate the intensities of the diffraction peaks of (200), (220), and (311) of the fcc phases, and $I_{200b}$ and $I_{211b}$ indicate the intensities of the diffraction peaks of (200) and (211) of the bcc phases.)

EXAMPLES

In the examples, the finished products obtained were tested by a Vickers hardness test, nano-hardness test, tensile test, V-bending test, and notch sensitivity test.

The average Vickers hardness was determined as follows: First, at intervals of 5% of sheet thickness in the sheet thickness direction from the ½ position of sheet thickness toward the surface, the Vickers hardnesses at certain positions in the sheet thickness direction were measured by an indentation load of 100 g. Next, the Vickers hardnesses of a total of five points were measured by an indentation load of 100 g in the same way from that position in the direction vertical to sheet thickness on a line parallel to the rolling direction. The average value of these was determined as the average Vickers hardness at that position in the sheet thickness direction. The intervals of the measurement points aligned in the sheet thickness direction and rolling direction were distances of 4 times or more the indents. When the average Vickers hardness at a certain sheet thickness direction position becomes 0.6 time or less the average Vickers hardness at the similarly measured ½ position of sheet thickness, the surface side from that position is defined as the "soft surface layer". The average Vickers hardness of the soft surface layer as a whole was found by measuring the Vickers hardness randomly at 10 points in the thus defined soft surface layer and obtaining the average of these.

Further, the method prescribed in the Description was used to find the thickness of the soft surface layer and determine the ratio to the sheet thickness. Similarly, the method prescribed in the Description was used to determine the value of the average hardness change in the sheet thickness direction of the hardness transition zone.

The nano-hardness of the soft surface layer was measured at the ½ position of thickness of the soft surface layer from the surface at 100 points in the direction vertical to sheet thickness. The standard deviation of these values was determined as the nano-hardness standard deviation of the soft surface layer.

The tensile strength TS and elongation (%) were measured in accordance with JIS Z 2241 by preparing a No. 5 test piece described in JIS Z 2201 having a long axis in a direction perpendicular to the rolling direction.

Further, the limit curvature radius R is found by preparing a No. 1 test piece described in JIS Z2204 so that the direction vertical to the rolling direction becomes the longitudinal direction) (bending ridgeline matching rolling direction). A V-bending test was performed based on JIS Z2248. A sample having a soft surface layer at only one surface was bent so that the surface having the soft surface layer became the outside of the bend. The angle of the die and punch was 60° while the radius of the front end of the punch was changed by units of 0.5 mm in the bending test. The radius of the front end of the punch at which bending was possible without cracks being caused was found as the "limit curvature radius R".

The notch sensitivity is found as follows: First, in the same way as the tensile test, a No. 6 test piece described in JIS Z2201 is prepared. At the middle part of the parallel part, a notch of a depth of 50 μm is introduced. A tensile test is performed at a crosshead speed of 100 mm/min and 0.1 mm/min. The ratio of the tensile strength at the time of tension by a crosshead speed of 100 mm/min (σ high speed) and the tensile strength at the time of tension by a crosshead speed of 0.1 mm/min (σ low speed) (σ high speed/σ low speed) is used as an indicator of the notch sensitivity. If the σ high speed/σ low speed is more than 1.0, it is judged that the notch sensitivity is low and the notch sensitivity can be eased. On the other hand, if the σ high speed/σ low speed becomes 1.0, it can be judged that the notch sensitivity is high and the sheet easily fractures without regard to the tensile rate.

Example A

A continuously cast slab of a thickness of 20 mm having each of the chemical compositions shown in Table 1 (matrix steel sheet) was ground at its surfaces to remove surface oxides, then was superposed with a surface layer-use steel sheet having the chemical composition shown in Table 1 at one surface or both surfaces by arc welding. The ratio of the thickness of the surface layer-use steel sheet to the sheet thickness was as shown in "ratio of soft surface layer (one side) (%)" of Table 1. This was hot rolled under conditions of a heating temperature, finishing temperature, and coiling temperature shown in Table 2 to obtain a multilayer hot rolled steel sheet. In the case of a test material having the hot rolled steel sheet as the finished product, the holding time at 700° C. to 500° C. in the hot rolling was intentionally controlled to the value shown in Table 2. If having a cold rolled steel sheet as the finished product, after that, the sheet was pickled, cold rolled by 50%, and annealed under the conditions shown in Table 2.

When the obtained products were measured for chemical compositions at positions of 2% of the sheet thickness from the surface layer and for chemical compositions at ½ positions of sheet thickness, there were substantially no changes from the chemical compositions of the matrix steel sheets and steel sheets for surface layer use shown in Table 1.

TABLE 1

| | Matrix steel sheet (mass %) | | | | | | | | | | | | | | |
|---|---|---|---|---|---|---|---|---|---|---|---|---|---|---|---|
| Steel type | C | Si | Mn | S | P | Al | N | Cr | Mo | B | Ti | Nb | V | Cu | Ni |
| a | 0.310 | 1.10 | 2.10 | 0.001 | 0.001 | | | | | | | | | | |
| b | 0.510 | 2.00 | 2.00 | 0.002 | 0.001 | | | | | | | | | | |
| c | 0.790 | 0.90 | 0.50 | 0.001 | 0.001 | | | | | | | | | | |
| d | 0.310 | 2.42 | 2.00 | 0.002 | 0.002 | | | | | | | | | | |
| e | 0.400 | 0.10 | 8.00 | 0.002 | 0.002 | | | | | | | | | | |
| f | 0.400 | 0.10 | 2.00 | 0.002 | 0.002 | | | 1.00 | 1.00 | 0.002 | | | | | |
| g | 0.490 | 0.50 | 3.10 | 0.001 | 0.001 | | | | | | 0.100 | 0.100 | 0.10 | | |
| h | 0.510 | 0.60 | 3.00 | 0.001 | 0.001 | | | | | | | | | 0.10 | 0.10 |

TABLE 1-continued

| | | | | | | | | | | | | | | |
|---|---|---|---|---|---|---|---|---|---|---|---|---|---|---|
| i | 0.300 | 0.60 | 3.10 | 0.001 | 0.001 | | | | | | | | | |
| j | 0.290 | 0.60 | 1.00 | 0.001 | 0.001 | | | | | | | | | |
| k | 0.300 | 0.60 | 2.00 | 0.001 | 0.001 | | 1.00 | | | | | | | |
| l | 0.310 | 0.60 | 2.00 | 0.001 | 0.001 | | | | 0.001 | | | | | |
| m | 0.300 | 0.60 | 2.00 | 0.001 | 0.001 | | | | | | | | | 0.10 |

Surface layer-use steel sheet (mass %)

| Steel type | C | Si | Mn | S | P | Al | N | Cr | Mo | B | Ti | Nb | V | Cu | Ni |
|---|---|---|---|---|---|---|---|---|---|---|---|---|---|---|---|
| a | 0.001 | 1.10 | 0.50 | 0.001 | 0.001 | | | | | | | | | | |
| b | 0.002 | 0.05 | 0.20 | 0.002 | 0.001 | | | | | | | | | | |
| c | 0.250 | 0.90 | 0.40 | 0.001 | 0.001 | | | | | | | | | | |
| d | 0.001 | 1.50 | 0.02 | 0.001 | 0.005 | | | | | | | | | | |
| e | 0.050 | 1.51 | 0.02 | 0.002 | 0.010 | | | | | | | | | | |
| f | 0.050 | 0.49 | 1.00 | 0.002 | 0.010 | | | 0.50 | 0.50 | 0.001 | | | | | |
| g | 0.010 | 1.51 | 1.00 | 0.002 | 0.010 | | | | | | 0.050 | 0.050 | 0.05 | | |
| h | 0.050 | 1.51 | 1.00 | 0.002 | 0.010 | | | | | | | | | 0.05 | 0.05 |
| i | 0.400 | 0.50 | 1.1 | 0.001 | 0.005 | | | | | | | | | | |
| j | 0.110 | 0.50 | 2 | 0.001 | 0.005 | | | | | | | | | | |
| k | 0.100 | 0.50 | 2 | 0.001 | 0.005 | | | 5 | | | | | | | |
| l | 0.100 | 0.50 | 1 | 0.001 | 0.005 | | | | | 0.002 | | | | | |
| m | 0.110 | 0.50 | 1 | 0.001 | 0.005 | | | | | | | | | | 0.5 |

Ratio of surface layer-use steel sheet to matrix steel sheet

| Steel type | C | Mn + Cr + Mo | B | Cu + Ni | Ratio of surface layer-use (one side) (%) | Ac3 |
|---|---|---|---|---|---|---|
| a | 0.0 | 0.2 | — | — | 25 | 784 |
| b | 0.0 | 0.1 | — | — | 15 | 795 |
| c | 0.3 | 0.8 | — | — | 15 | 755 |
| d | 0.0 | 0.0 | — | — | 15 | 847 |
| e | 0.1 | 0.0 | — | — | 15 | 547 |
| f | 0.1 | 0.5 | 0.33 | — | 15 | 748 |
| g | 0.0 | 0.3 | — | — | 15 | 748 |
| h | 0.1 | 0.3 | — | 0.5 | 15 | 699 |
| i | 1.3 | 0.4 | — | — | 15 | 733 |
| j | 0.4 | 2.0 | — | — | 15 | 798 |
| k | 0.3 | 2.3 | — | — | 15 | 755 |
| l | 0.3 | 0.5 | 2.00 | — | 15 | 764 |
| m | 0.4 | 0.5 | — | 5 | 15 | 765 |

* Empty fields show elements not intentionally added.

TABLE 2

| | | | | Hot rolling conditions | | | | |
|---|---|---|---|---|---|---|---|---|
| Class | No. | Steel type | Steel sheet | Heating temp. (° C.) | Rough rolling temp. (° C.) | Sheet thickness reduction rate per pass (%) | Time between passes (s) | Rolling operations |
| Inv. ex. | 1 | a | Hot rolled steel sheet | 1200 | 1190 | 17 | 9 | 5 |
| Inv. ex. | 2 | a | Cold rolled steel sheet | 1200 | 1200 | 23 | 8 | 3 |
| Inv. ex. | 3 | b | Hot rolled steel sheet | 1200 | 1170 | 41 | 9 | 2 |
| Comp. ex. | 4 | b | Hot rolled steel sheet | 1200 | 1110 | 13 | 8 | 3 |
| Inv. ex. | 5 | b | Cold rolled steel sheet | 1100 | 1100 | 24 | 3 | 4 |
| Comp. ex. | 6 | b | Cold rolled steel sheet | 1100 | 1100 | 36 | 10 | 5 |
| Comp. ex. | 7 | b | Cold rolled steel sheet | 1100 | 1100 | 37 | 4 | 3 |
| Inv. ex. | 8 | b | Cold rolled steel sheet | 1100 | 1100 | 34 | 5 | 3 |
| Inv. ex. | 9 | b | Cold rolled steel sheet | 1100 | 1100 | 17 | 6 | 5 |
| Comp. ex. | 10 | b | Cold rolled steel sheet | 1100 | 1100 | 35 | 8 | 4 |
| Inv. ex. | 11 | b | Hot dip galvanized steel sheet | 1100 | 1100 | 26 | 5 | 3 |
| Inv. ex. | 12 | b | Hot dip galvannealed steel sheet steel sheet | 1100 | 1100 | 45 | 10 | 2 |
| Inv. ex. | 13 | b | Electrogalvanized steel sheet | 1100 | 1100 | 18 | 10 | 4 |
| Inv. ex. | 14 | c | Hot rolled steel sheet | 1200 | 1100 | 29 | 9 | 3 |
| Inv. ex. | 15 | c | Cold rolled steel sheet | 1100 | 1100 | 45 | 10 | 3 |
| Inv. ex. | 16 | d | Hot rolled steel sheet | 1100 | 1100 | 38 | 9 | 3 |
| Inv. ex. | 17 | d | Cold rolled steel sheet | 1100 | 1100 | 43 | 6 | 4 |
| Inv. ex. | 18 | e | Hot rolled steel sheet | 1100 | 1100 | 15 | 10 | 3 |
| Inv. ex. | 19 | e | Cold rolled steel sheet | 1100 | 1100 | 29 | 10 | 5 |
| Inv. ex. | 20 | f | Hot rolled steel sheet | 1100 | 1100 | 37 | 6 | 3 |
| Inv. ex. | 21 | f | Cold rolled steel sheet | 1100 | 1100 | 13 | 5 | 5 |
| Inv. ex. | 22 | g | Hot rolled steel sheet | 1100 | 1100 | 36 | 4 | 5 |
| Inv. ex. | 23 | g | Cold rolled steel sheet | 1100 | 1100 | 18 | 5 | 3 |
| Inv. ex. | 24 | h | Hot rolled steel sheet | 1100 | 1100 | 20 | 10 | 2 |
| Inv. ex. | 25 | h | Cold rolled steel sheet | 1100 | 1100 | 23 | 7 | 4 |

TABLE 2-continued

| Class | No. | | | | | | |
|---|---|---|---|---|---|---|---|
| Comp. ex. | 26 | i | Hot rolled steel sheet | 1100 | 1100 | 34 | 9 | 2 |
| Comp. ex. | 27 | i | Cold rolled steel sheet | 1100 | 1100 | 30 | 7 | 5 |
| Inv. ex. | 28 | a | Hot rolled steel sheet | 1200 | 1170 | 22 | 6 | 2 |
| Inv. ex. | 29 | a | Cold rolled steel sheet | 1200 | 1100 | 13 | 5 | 5 |
| Inv. ex. | 30 | b | Hot rolled steel sheet | 1200 | 1170 | 14 | 3 | 3 |
| Inv. ex. | 31 | b | Cold rolled steel sheet | 1100 | 1100 | 42 | 4 | 4 |
| Inv. ex. | 32 | c | Hot rolled steel sheet | 1200 | 1180 | 44 | 8 | 5 |
| Inv. ex. | 33 | c | Cold rolled steel sheet | 1100 | 1100 | 42 | 3 | 5 |
| Inv. ex. | 34 | d | Hot rolled steel sheet | 1100 | 1100 | 45 | 10 | 4 |
| Inv. ex. | 35 | d | Cold rolled steel sheet | 1100 | 1100 | 17 | 10 | 4 |
| Comp. ex. | 36 | c | Cold rolled steel sheet | 1100 | 1100 | 39 | 9 | <u>1</u> |
| Comp. ex. | 37 | c | Cold rolled steel sheet | 1100 | 1100 | 16 | <u>2</u> | 4 |
| Comp. ex. | 38 | c | Cold rolled steel sheet | 1100 | <u>1000</u> | 20 | 6 | 5 |
| Comp. ex. | 39 | c | Cold rolled steel sheet | 1100 | 1100 | <u>4</u> | 8 | 5 |
| Comp. ex. | 40 | c | Cold rolled steel sheet | 1100 | 1100 | <u>60</u> | 3 | 2 |
| Comp. ex. | 41 | c | Cold rolled steel sheet | 1100 | 1100 | 30 | <u>1</u> | 2 |

| | | Hot rolling conditions | | | Annealing conditions | | 750° C. to 550° C. |
|---|---|---|---|---|---|---|---|
| Class | No. | Finishing temp. (° C.) | 700° C. to 500° C. holding time (s) | Coiling temp. (° C.) | Heating temp. (° C.) | Holding time (s) | average cooling rate (° C./s) |
| Inv. ex. | 1 | 880 | 10 | 400 | — | — | — |
| Inv. ex. | 2 | 880 | — | 400 | 750 | 120 | 10 |
| Inv. ex. | 3 | 890 | 20 | 200 | — | — | — |
| Comp. ex. | 4 | 890 | <u>1</u> | 200 | — | — | — |
| Inv. ex. | 5 | 930 | — | 600 | 820 | 150 | 20 |
| Comp. ex. | 6 | 930 | — | 600 | <u>650</u> | 150 | 20 |
| Comp. ex. | 7 | 930 | — | 600 | 820 | <u>2</u> | 20 |
| Inv. ex. | 8 | 930 | — | 600 | 820 | 10 | 20 |
| Inv. ex. | 9 | 930 | — | 600 | 820 | 150 | 2 |
| Comp. ex. | 10 | 930 | — | 600 | 820 | 150 | <u>200</u> |
| Inv. ex. | 11 | 930 | — | 600 | 820 | 150 | 20 |
| Inv. ex. | 12 | 930 | — | 600 | 820 | 150 | 20 |
| Inv. ex. | 13 | 930 | — | 600 | 820 | 150 | 20 |
| Inv. ex. | 14 | 900 | 30 | 100 | — | — | — |
| Inv. ex. | 15 | 930 | — | 700 | 850 | 60 | 5 |
| Inv. ex. | 16 | 930 | 20 | 50 | — | — | — |
| Inv. ex. | 17 | 930 | — | 700 | 850 | 30 | 10 |
| Inv. ex. | 18 | 920 | 10 | 300 | — | — | — |
| Inv. ex. | 19 | 930 | — | 700 | 850 | 30 | 10 |
| Inv. ex. | 20 | 930 | 40 | 500 | — | — | — |
| Inv. ex. | 21 | 920 | — | 700 | 850 | 200 | 20 |
| Inv. ex. | 22 | 930 | 30 | 500 | — | — | — |
| Inv. ex. | 23 | 920 | — | 700 | 850 | 180 | 20 |
| Inv. ex. | 24 | 930 | 30 | 300 | — | — | — |
| Inv. ex. | 25 | 930 | — | 700 | 850 | 180 | 30 |
| Comp. ex. | 26 | 920 | 20 | 300 | — | — | — |
| Comp. ex. | 27 | 930 | — | 700 | 820 | 150 | 50 |
| Inv. ex. | 28 | 900 | 15 | 300 | — | — | — |
| Inv. ex. | 29 | 900 | — | 600 | 830 | 250 | 10 |
| Inv. ex. | 30 | 900 | 30 | 200 | — | — | — |
| Inv. ex. | 31 | 910 | — | 600 | 820 | 150 | 10 |
| Inv. ex. | 32 | 910 | 25 | 200 | — | — | — |
| Inv. ex. | 33 | 910 | — | 600 | 840 | 60 | 10 |
| Inv. ex. | 34 | 910 | 15 | 50 | — | — | — |
| Inv. ex. | 35 | 910 | — | 600 | 840 | 60 | 5 |
| Comp. ex. | 36 | 930 | — | 700 | 850 | 70 | 15 |
| Comp. ex. | 37 | 930 | — | 700 | 850 | 60 | 15 |
| Comp. ex. | 38 | 930 | — | 700 | 850 | 60 | 15 |
| Comp. ex. | 39 | 930 | — | 700 | 850 | 60 | 15 |
| Comp. ex. | 40 | 930 | — | 700 | 850 | 60 | 15 |
| Comp. ex. | 41 | 930 | — | 700 | 850 | 60 | 15 |

| | | Hardness | | | | |
|---|---|---|---|---|---|---|
| Class | No. | A Sheet thickness ½ average Vickers hardness (Hv) | B Soft surface layer average Vickers hardness (Hv) | B/A | Soft surface layer nano-hardness standard deviation | Ratio of soft surface layer (one side) to sheet thickness (%) |
| Inv. ex. | 1 | 590 | 160 | 0.27 | 0.4 | 23 |
| Inv. ex. | 2 | 600 | 160 | 0.27 | 0.4 | 23 |
| Inv. ex. | 3 | 700 | 170 | 0.24 | 0.5 | 13 |
| Comp. ex. | 4 | 700 | 170 | 0.24 | <u>0.9</u> | 13 |
| Inv. ex. | 5 | 700 | 180 | 0.26 | 0.5 | 13 |
| Comp. ex. | 6 | 550 | 200 | 0.36 | <u>0.9</u> | 13 |

TABLE 2-continued

| Class | No. | | | | | |
|---|---|---|---|---|---|---|
| Comp. ex. | 7 | 600 | 200 | 0.33 | <u>0.9</u> | 13 |
| Inv. ex. | 8 | 650 | 190 | 0.29 | 0.6 | 13 |
| Inv. ex. | 9 | 500 | 190 | 0.38 | 0.6 | 13 |
| Comp. ex. | 10 | 700 | 220 | 0.31 | <u>0.9</u> | 13 |
| Inv. ex. | 11 | 690 | 170 | 0.25 | 0.4 | 13 |
| Inv. ex. | 12 | 680 | 170 | 0.25 | 0.4 | 13 |
| Inv. ex. | 13 | 700 | 190 | 0.27 | 0.5 | 13 |
| Inv. ex. | 14 | 750 | 420 | 0.56 | 0.5 | 13 |
| Inv. ex. | 15 | 730 | 430 | 0.59 | 0.5 | 13 |
| Inv. ex. | 16 | 600 | 170 | 0.28 | 0.4 | 13 |
| Inv. ex. | 17 | 590 | 160 | 0.27 | 0.4 | 13 |
| Inv. ex. | 18 | 680 | 250 | 0.37 | 0.5 | 13 |
| Inv. ex. | 19 | 660 | 250 | 0.38 | 0.5 | 13 |
| Inv. ex. | 20 | 680 | 240 | 0.35 | 0.6 | 13 |
| Inv. ex. | 21 | 680 | 240 | 0.35 | 0.6 | 13 |
| Inv. ex. | 22 | 720 | 240 | 0.33 | 0.6 | 13 |
| Inv. ex. | 23 | 710 | 250 | 0.35 | 0.6 | 13 |
| Inv. ex. | 24 | 770 | 290 | 0.38 | 0.6 | 13 |
| Inv. ex. | 25 | 750 | 290 | 0.39 | 0.7 | 13 |
| Comp. ex. | 26 | 600 | 690 | <u>1.15</u> | <u>0.9</u> | 13 |
| Comp. ex. | 27 | 580 | 680 | <u>1.17</u> | <u>0.9</u> | 13 |
| Inv. ex. | 28 | 580 | 160 | 0.28 | 0.4 | 23 |
| Inv. ex. | 29 | 600 | 150 | 0.25 | 0.4 | 23 |
| Inv. ex. | 30 | 700 | 170 | 0.24 | 0.5 | 13 |
| Inv. ex. | 31 | 690 | 170 | 0.25 | 0.5 | 13 |
| Inv. ex. | 32 | 750 | 430 | 0.57 | 0.5 | 13 |
| Inv. ex. | 33 | 740 | 420 | 0.57 | 0.5 | 13 |
| Inv. ex. | 34 | 600 | 160 | 0.27 | 0.4 | 13 |
| Inv. ex. | 35 | 600 | 160 | 0.27 | 0.4 | 13 |
| Comp. ex. | 36 | 740 | 440 | 0.59 | <u>0.9</u> | 13 |
| Comp. ex. | 37 | 740 | 440 | 0.59 | <u>0.9</u> | 13 |
| Comp. ex. | 38 | 740 | 430 | 0.58 | <u>0.9</u> | 13 |
| Comp. ex. | 39 | 740 | 440 | 0.59 | <u>0.9</u> | 13 |
| Comp. ex. | 40 | 740 | 430 | 0.58 | <u>0.9</u> | 13 |
| Comp. ex. | 41 | 740 | 440 | 0.59 | <u>0.9</u> | 13 |

| | | Mechanical properties | | | | Notch tensile test |
|---|---|---|---|---|---|---|
| Class | No. | Tensile strength (MPa) | Limit bending radius R (mm) | Sheet thickness (mm) | Softened part | σ high speed/σ low speed |
| Inv. ex. | 1 | 1670 | 1 | 2.4 | Both surfaces | 1.2 |
| Inv. ex. | 2 | 1690 | 1 | 1.2 | Both surfaces | 1.3 |
| Inv. ex. | 3 | 1780 | 1 | 2.4 | Both surfaces | 1.3 |
| Comp. ex. | 4 | 1790 | <u>2</u> | 2.4 | Both surfaces | 1.3 |
| Inv. ex. | 5 | 1790 | 1 | 1.2 | Both surfaces | 1.2 |
| Comp. ex. | 6 | 1600 | <u>2</u> | 1.2 | Both surfaces | 1.3 |
| Comp. ex. | 7 | 1620 | <u>2</u> | 1.2 | Both surfaces | 1.3 |
| Inv. ex. | 8 | 1670 | 1.5 | 1.2 | Both surfaces | 1.3 |
| Inv. ex. | 9 | 1500 | 1.5 | 1.2 | Both surfaces | 1.2 |
| Comp. ex. | 10 | 1800 | <u>2</u> | 1.2 | Both surfaces | 1.5 |
| Inv. ex. | 11 | 1780 | 1 | 1.2 | Both surfaces | 1.3 |
| Inv. ex. | 12 | 1770 | 1 | 1.2 | Both surfaces | 1.2 |
| Inv. ex. | 13 | 1790 | 1 | 1.2 | Both surfaces | 1.5 |
| Inv. ex. | 14 | 2100 | 1 | 2.4 | Both surfaces | 1.3 |
| Inv. ex. | 15 | 2100 | 1 | 1.2 | Both surfaces | 1.2 |
| Inv. ex. | 16 | 1710 | 1 | 2.6 | Both surfaces | 1.2 |
| Inv. ex. | 17 | 1670 | 1 | 1.2 | Both surfaces | 1.2 |
| Inv. ex. | 18 | 1920 | 1 | 2.8 | Both surfaces | 1.2 |
| Inv. ex. | 19 | 1900 | 1 | 1.6 | Both surfaces | 1.3 |
| Inv. ex. | 20 | 1930 | 1.5 | 2 | Both surfaces | 1.4 |
| Inv. ex. | 21 | 1950 | 1.5 | 1 | Both surfaces | 1.2 |
| Inv. ex. | 22 | 2100 | 1.5 | 2.4 | Both surfaces | 1.5 |
| Inv. ex. | 23 | 2080 | 1.5 | 1.6 | Both surfaces | 1.2 |
| Inv. ex. | 24 | 2270 | 1.5 | 2.8 | Both surfaces | 1.5 |
| Inv. ex. | 25 | 2250 | 1.5 | 0.8 | Both surfaces | 1.2 |
| Comp. ex. | 26 | 2160 | <u>2.5</u> | 2.4 | Both surfaces | <u>1.0</u> |
| Comp. ex. | 27 | 2130 | <u>2.5</u> | 1.6 | Both surfaces | <u>1.0</u> |
| Inv. ex. | 28 | 1710 | 1 | 2.4 | One surface | 1.2 |
| Inv. ex. | 29 | 1700 | 1 | 1.6 | One surface | 1.5 |
| Inv. ex. | 30 | 1810 | 1 | 2.4 | One surface | 1.5 |
| Inv. ex. | 31 | 1830 | 1 | 1.6 | One surface | 1.5 |
| Inv. ex. | 32 | 2200 | 1 | 2.4 | One surface | 1.2 |
| Inv. ex. | 33 | 2200 | 1 | 1.6 | One surface | 1.3 |
| Inv. ex. | 34 | 1770 | 1 | 2.4 | One surface | 1.2 |
| Inv. ex. | 35 | 1720 | 1 | 1.6 | One surface | 1.1 |
| Comp. ex. | 36 | 2200 | <u>3</u> | 1.6 | Both surfaces | 1.2 |
| Comp. ex. | 37 | 2150 | <u>3</u> | 1.6 | Both surfaces | 1.3 |

TABLE 2-continued

| | | | | | | |
|---|---|---|---|---|---|---|
| Comp. ex. | 38 | 2120 | 3 | 2.6 | Both surfaces | 1.2 |
| Comp. ex. | 39 | 2130 | 3 | 3.6 | Both surfaces | 1.3 |
| Comp. ex. | 40 | 2120 | 3 | 4.6 | Both surfaces | 1.2 |
| Comp. ex. | 41 | 2140 | 3 | 5.6 | Both surfaces | 1.2 |

If referring to Table 2, for example, in the steel sheets of Comparative Examples 4, 6, 7, and 10, it is learned that the requirement of the average Vickers hardness of the soft surface layer being 0.60 time or less the average Vickers hardness of the ½ position in sheet thickness was satisfied, but the nano-hardness standard deviation of the soft surface layer was 0.9, i.e., the requirement of being 0.8 or less was not satisfied. As a result, in the steel sheets of these comparative examples, the limit curvature radius R was 2.5 mm or 2 mm. In contrast to this, in the steel sheets in the invention examples of the present invention satisfying the two requirements, the limit curvature radius R was less than 2 mm, in particular, was 1.5 mm or 1 mm. For this reason, it was learned that by suppressing the variation of hardness of the soft surface layer to within a specific range, it is possible to remarkably improve the bendability of the steel sheet compared with steel sheet just combining a middle part in sheet thickness and a soft surface layer softer than the same.

Further, if referring to the hot rolled steel sheet of Comparative Example 4, if making the holding time at 700° C. to 500° C. in the cooling process after hot rolling 1 second, the nano-hardness standard deviation of the soft surface layer was 0.9, and the limit curvature radius R was 2 mm. In contrast to this, in the hot rolled steel sheet of Invention Example 3 prepared in the same way as Comparative Example 4 except for making the holding time 20 seconds, the nano-hardness standard deviation of the soft surface layer was 0.5, and the limit curvature radius R was 1 mm.

Further, if referring to the cold rolled steel sheet of Invention Example 5, it was learned that by suitably selecting the temperature and the holding time at the time of annealing so as to satisfy the requirement of a temperature of the Ac3 point minus 50° C. or more and 700° C. or more and 900° C. or less and 5 seconds or more, it is possible to suppress variation of hardness of the soft surface layer (nano-hardness standard deviation of soft surface layer: 0.5) and as a result to remarkably improve the bendability of the cold rolled steel sheet (limit curvature radius R of 1 mm). On the other hand, in the cold rolled steel sheets of Comparative Examples 6 and 7 not satisfying the above requirement, the nano-hardness standard deviation of the soft surface layer was 0.9 and the limit curvature radius R was 2 mm.

In addition, in the cold rolled steel sheet of Invention Example 9, the average cooling rate at the time of annealing was 2° C./s and the tensile strength was 1500 MPa. On the other hand, in the cold rolled steel sheet of Invention Example 8 using the same steel type "b", by controlling that average cooling rate to 20° C./s, it was possible to achieve a tensile strength higher than 1670 MPa.

Further, in steel sheet manufactured by hot rolling without rough rolling being performed two times or more under conditions of a rough rolling temperature of 1100° C. or more, a sheet thickness reduction rate per pass of 5% to less than 50%, and a time between passes of 3 seconds or more, the limit curvature radius R was high and/or the bending load was low and a sufficient bendability could not be achieved. Further, in all of the steel sheets according to the invention examples of the present invention, the value of a high speed/α low speed was more than 1.0, therefore it was possible to suppress the notch effect.

Example B: Formation of Hardness Transition Zone

A continuously cast slab of a thickness of 20 mm having each of the chemical compositions shown in Table 3 (matrix steel sheet) was ground at its surfaces to remove surface oxides, then was superposed with surface layer-use steel sheet having the chemical compositions shown in Table 1 at one surface or both surfaces by arc welding. The ratio of the thickness of the surface layer-use steel sheet to the sheet thickness was as shown in "ratio of surface layer-use steel sheet (one side) (%)" of Table 3. This was hot rolled under conditions of a heating temperature, heating time, finishing temperature, and coiling temperature shown in Table 4 to obtain a multilayer hot rolled steel sheet. In the case of a test material having the hot rolled steel sheet as the finished product, the holding time at 700° C. to 500° C. of hot rolling was intentionally controlled to the value shown in Table 4. If having a cold rolled steel sheet as the finished product, after that, the sheet was pickled, cold rolled by 50%, and annealed under the conditions shown in Table 4.

When the obtained products were measured for chemical compositions at positions of 2% of the sheet thickness from the surface layer and chemical compositions at ½ positions of sheet thickness, there were substantially no changes from the chemical compositions of the matrix steel sheets and steel sheets for surface layer use shown in Table 3.

TABLE 3

| | Matrix steel sheet (mass %) | | | | | | | | | | | | | | |
|---|---|---|---|---|---|---|---|---|---|---|---|---|---|---|---|
| Steel type | C | Si | Mn | S | P | Al | N | Cr | Mo | B | Ti | Nb | V | Cu | Ni |
| a' | 0.310 | 1.10 | 2.10 | 0.001 | 0.001 | | | | | | | | | | |
| b' | 0.510 | 2.00 | 2.00 | 0.002 | 0.001 | | | | | | | | | | |
| c' | 0.790 | 0.90 | 0.50 | 0.001 | 0.001 | | | | | | | | | | |
| d' | 0.310 | 2.42 | 2.00 | 0.002 | 0.002 | | | | | | | | | | |
| e' | 0.400 | 0.10 | 8.00 | 0.002 | 0.002 | | | | | | | | | | |
| f' | 0.400 | 0.10 | 2.00 | 0.002 | 0.002 | | | 1.00 | 1.00 | 0.002 | | | | | |
| g' | 0.490 | 0.50 | 3.10 | 0.001 | 0.001 | | | | | | 0.100 | 0.100 | 0.10 | | |
| h' | 0.510 | 0.60 | 3.00 | 0.001 | 0.001 | | | | | | | | | 0.10 | 0.10 |
| i' | 0.300 | 0.60 | 3.10 | 0.001 | 0.001 | | | | | | | | | | |
| j' | 0.290 | 0.60 | 1.00 | 0.001 | 0.001 | | | | | | | | | | |
| k' | 0.300 | 0.60 | 2.00 | 0.001 | 0.001 | | | 1.00 | | | | | | | |

TABLE 3-continued

| | | | | | | | | | | | | | | | |
|---|---|---|---|---|---|---|---|---|---|---|---|---|---|---|---|
| l' | 0.310 | 0.60 | 2.00 | 0.001 | 0.001 | | | 0.001 | | | | | | | |
| m' | 0.300 | 0.60 | 2.00 | 0.001 | 0.001 | | | | | | | | | | 0.10 |

| | Surface layer-use steel sheet (mass %) | | | | | | | | | | | | | | |
|---|---|---|---|---|---|---|---|---|---|---|---|---|---|---|---|
| Steel type | C | Si | Mn | S | P | Al | N | Cr | Mo | B | Ti | Nb | V | Cu | Ni |
| a' | 0.002 | 1.05 | 0.60 | 0.001 | 0.002 | | | | | | | | | | |
| b' | 0.003 | 0.05 | 0.30 | 0.003 | 0.001 | | | | | | | | | | |
| c' | 0.250 | 0.90 | 0.40 | 0.001 | 0.001 | | | | | | | | | | |
| d' | 0.002 | 1.50 | 0.02 | 0.002 | 0.005 | | | | | | | | | | |
| e' | 0.045 | 1.51 | 0.02 | 0.002 | 0.010 | | | | | | | | | | |
| f' | 0.050 | 0.50 | 1.10 | 0.002 | 0.002 | | | 0.50 | 0.60 | 0.001 | | | | | |
| g' | 0.005 | 1.50 | 1.10 | 0.003 | 0.010 | | | | | | 0.600 | 0.050 | 0.05 | | |
| h' | 0.050 | 1.50 | 1.00 | 0.002 | 0.002 | | | | | | | | | 0.06 | 0.05 |
| i' | 0.405 | 0.30 | 1.2 | 0.002 | 0.005 | | | | | | | | | | |
| j' | 0.110 | 0.20 | 2 | 0.001 | 0.002 | | | | | | | | | | |
| k' | 0.105 | 0.40 | 2 | 0.001 | 0.001 | | | 5 | | | | | | | |
| l' | 0.100 | 0.60 | 1.1 | 0.002 | 0.002 | | | | | 0.002 | | | | | |
| m' | 0.100 | 0.50 | 1.1 | 0.001 | 0.005 | | | | | | | | | | 0.5 |

| | Ratio of surface layer-use steel sheet to matrix steel sheet | | | | | |
|---|---|---|---|---|---|---|
| Steel type | C | Mn + Cr + Mo | B | Cu + Ni | Ratio of surface layer-use (one side) (%) | Ac3 |
| a' | 0.0 | 0.3 | — | — | 25 | 783 |
| b' | 0.0 | 0.2 | — | — | 15 | 794 |
| c' | 0.3 | 0.8 | — | — | 15 | 755 |
| d' | 0.0 | 0.0 | — | — | 15 | 845 |
| e' | 0.1 | 0.0 | — | — | 15 | 546 |
| f' | 0.1 | 0.6 | 0.33 | — | 15 | 747 |
| g' | 0.0 | 0.4 | — | — | 15 | 668 |
| h' | 0.1 | 0.3 | — | 0.55 | 15 | 698 |
| i' | 1.4 | 0.4 | — | — | 15 | 733 |
| j' | 0.4 | 2.0 | — | — | 15 | 798 |
| k' | 0.4 | 2.3 | — | — | 15 | 755 |
| l' | 0.3 | 0.6 | 2.00 | — | 15 | 764 |
| m' | 0.3 | 0.6 | — | 5 | 15 | 764 |

* Empty fields show elements not intentionally added.

TABLE 4

| | | | | Hot rolling conditions | | | | |
|---|---|---|---|---|---|---|---|---|
| Class | No. | Steel type | Steel sheet | Heating temp. (° C.) | Heating time (min) | Rough rolling temp. (° C.) | Rate of reduction of sheet thickness per pass (%) | Time between passes (s) |
| Inv. ex. | 101 | a' | Hot rolled steel sheet | 1100 | 120 | 1100 | 20 | 5 |
| Inv. ex. | 102 | a' | Cold rolled steel sheet | 1100 | 120 | 1100 | 30 | 3 |
| Inv. ex. | 103 | b' | Hot rolled steel sheet | 1200 | 150 | 1140 | 23 | 5 |
| Comp. ex. | 104 | b' | Hot rolled steel sheet | 1200 | 150 | 1200 | 22 | 5 |
| Inv. ex. | 105 | b' | Cold rolled steel sheet | 1200 | 150 | 1140 | 35 | 8 |
| Comp. ex. | 106 | b' | Cold rolled steel sheet | 1200 | 150 | 1170 | 11 | 8 |
| Comp. ex. | 107 | b' | Cold rolled steel sheet | 1200 | 150 | 1150 | 39 | 7 |
| Inv. ex. | 108 | b' | Cold rolled steel sheet | 1200 | 150 | 1200 | 23 | 9 |
| Inv. ex. | 109 | b' | Cold rolled steel sheet | 1200 | 150 | 1160 | 39 | 3 |
| Inv. ex. | 110 | b' | Cold rolled steel sheet | 1340 | 150 | 1200 | 22 | 7 |
| Comp. ex. | 111 | b' | Cold rolled steel sheet | 1200 | 150 | 1150 | 41 | 5 |
| Inv. ex. | 112 | b' | Cold rolled steel sheet | 1200 | 100 | 1190 | 15 | 9 |
| Inv. ex. | 113 | b' | Hot dip galvanized steel sheet | 1200 | 150 | 1110 | 43 | 3 |
| Inv. ex. | 114 | b' | Hot dip galvannealed steel sheet steel sheet | 1200 | 150 | 1190 | 34 | 4 |
| Inv. ex. | 115 | b' | Electrogalvanized steel sheet | 1200 | 150 | 1100 | 27 | 9 |
| Inv. ex. | 116 | c' | Hot rolled steel sheet | 1200 | 300 | 1140 | 36 | 7 |
| Inv. ex. | 117 | c' | Cold rolled steel sheet | 1200 | 300 | 1160 | 31 | 6 |
| Inv. ex. | 118 | d' | Hot rolled steel sheet | 1150 | 300 | 1140 | 44 | 5 |
| Inv. ex. | 119 | d' | Cold rolled steel sheet | 1150 | 300 | 1130 | 44 | 7 |
| Inv. ex. | 120 | e' | Hot rolled steel sheet | 1150 | 300 | 1130 | 13 | 4 |
| Inv. ex. | 121 | e' | Cold rolled steel sheet | 1150 | 300 | 1140 | 21 | 6 |
| Inv. ex. | 122 | f' | Hot rolled steel sheet | 1150 | 300 | 1140 | 45 | 5 |
| Inv. ex. | 123 | f' | Cold rolled steel sheet | 1150 | 300 | 1130 | 36 | 7 |
| Inv. ex. | 124 | g' | Hot rolled steel sheet | 1150 | 300 | 1140 | 19 | 8 |
| Inv. ex. | 125 | g' | Cold rolled steel sheet | 1150 | 300 | 1130 | 45 | 7 |
| Inv. ex. | 126 | h' | Hot rolled steel sheet | 1150 | 300 | 1120 | 41 | 9 |
| Inv. ex. | 127 | h' | Cold rolled steel sheet | 1150 | 300 | 1110 | 25 | 3 |
| Comp. ex. | 128 | i' | Hot rolled steel sheet | 1150 | 300 | 1130 | 4 | 4 |

TABLE 4-continued

| Class | No. | | | | | | |
|---|---|---|---|---|---|---|---|
| Comp. ex. | 129 | i' | Cold rolled steel sheet | 1150 | 300 | 1140 | 25 | 2 |
| Inv. ex. | 130 | a' | Hot rolled steel sheet | 1200 | 150 | 1130 | 45 | 8 |
| Inv. ex. | 131 | a' | Cold rolled steel sheet | 1200 | 150 | 1140 | 41 | 8 |
| Inv. ex. | 132 | b' | Hot rolled steel sheet | 1200 | 150 | 1160 | 19 | 8 |
| Inv. ex. | 133 | b' | Cold rolled steel sheet | 1200 | 150 | 1140 | 14 | 10 |
| Inv. ex. | 134 | c' | Hot rolled steel sheet | 1200 | 150 | 1190 | 34 | 6 |
| Inv. ex. | 135 | c' | Cold rolled steel sheet | 1200 | 150 | 1140 | 41 | 4 |
| Inv. ex. | 136 | d' | Hot rolled steel sheet | 1200 | 150 | 1120 | 41 | 4 |
| Inv. ex. | 137 | d' | Cold rolled steel sheet | 1200 | 150 | 1130 | 35 | 4 |
| Comp. ex. | 138 | d' | Cold rolled steel sheet | 1200 | 150 | 1000 | 35 | 10 |
| Comp. ex. | 139 | d' | Cold rolled steel sheet | 1200 | 150 | 1200 | 4 | 5 |
| Comp. ex. | 140 | d' | Cold rolled steel sheet | 1200 | 150 | 1200 | 65 | 5 |
| Comp. ex. | 141 | d' | Cold rolled steel sheet | 1200 | 150 | 1200 | 35 | 2 |
| Comp. ex. | 142 | d' | Cold rolled steel sheet | 1200 | 150 | 1200 | 30 | 4 |
| Comp. ex. | 143 | c' | Cold rolled steel sheet | 1200 | 1100 | 1090 | 25 | 3 |
| Comp. ex. | 144 | c' | Cold rolled steel sheet | 1200 | 1100 | 1200 | 30 | 2 |

| | | Hot rolling conditions | | | | Annealing conditions | | 750° C. to 550° C. |
|---|---|---|---|---|---|---|---|---|
| Class | No. | Rolling operations | Finishing temp. (° C.) | 700° C. to 500° C. holding time (s) | Coiling temp. (° C.) | Heating temp. (° C.) | Holding time (s) | average cooling rate (° C./s) |
| Inv. ex. | 101 | 5 | 890 | 20 | 400 | — | — | — |
| Inv. ex. | 102 | 2 | 890 | — | 500 | 780 | 150 | 10 |
| Inv. ex. | 103 | 5 | 900 | 30 | 300 | — | — | — |
| Comp. ex. | 104 | 3 | 900 | 1 | 200 | — | — | — |
| Inv. ex. | 105 | 5 | 920 | — | 650 | 800 | 120 | 10 |
| Comp. ex. | 106 | 5 | 920 | — | 650 | 650 | 120 | 10 |
| Comp. ex. | 107 | 4 | 920 | — | 650 | 800 | 2 | 10 |
| Inv. ex. | 108 | 4 | 930 | — | 650 | 830 | 10 | 10 |
| Inv. ex. | 109 | 5 | 930 | — | 650 | 830 | 120 | 2 |
| Inv. ex. | 110 | 2 | 930 | — | 650 | 830 | 120 | 2 |
| Comp. ex. | 111 | 3 | 930 | — | 650 | 830 | 120 | 100 |
| Inv. ex. | 112 | 4 | 920 | — | 650 | 830 | 120 | 100 |
| Inv. ex. | 113 | 3 | 930 | — | 650 | 820 | 120 | 100 |
| Inv. ex. | 114 | 3 | 940 | — | 650 | 820 | 120 | 100 |
| Inv. ex. | 115 | 5 | 940 | — | 650 | 820 | 120 | 100 |
| Inv. ex. | 116 | 4 | 900 | 10 | 200 | — | — | — |
| Inv. ex. | 117 | 4 | 900 | — | 650 | 840 | 60 | 5 |
| Inv. ex. | 118 | 4 | 940 | 20 | 100 | — | — | — |
| Inv. ex. | 119 | 2 | 930 | — | 700 | 820 | 60 | 10 |
| Inv. ex. | 120 | 3 | 920 | 20 | 50 | — | — | — |
| Inv. ex. | 121 | 4 | 910 | — | 600 | 830 | 60 | 10 |
| Inv. ex. | 122 | 2 | 910 | 30 | 500 | — | — | — |
| Inv. ex. | 123 | 5 | 910 | — | 600 | 850 | 30 | 20 |
| Inv. ex. | 124 | 5 | 910 | 30 | 400 | — | — | — |
| Inv. ex. | 125 | 3 | 920 | — | 600 | 850 | 30 | 20 |
| Inv. ex. | 126 | 2 | 930 | 20 | 300 | — | — | — |
| Inv. ex. | 127 | 4 | 930 | — | 600 | 850 | 30 | 50 |
| Comp. ex. | 128 | 8 | 930 | 10 | 300 | — | — | — |
| Comp. ex. | 129 | 3 | 930 | — | 650 | 830 | 150 | 50 |
| Inv. ex. | 130 | 3 | 910 | 20 | 100 | — | — | — |
| Inv. ex. | 131 | 3 | 910 | — | 600 | 840 | 30 | 100 |
| Inv. ex. | 132 | 2 | 910 | 20 | 100 | — | — | — |
| Inv. ex. | 133 | 5 | 910 | — | 650 | 820 | 150 | 100 |
| Inv. ex. | 134 | 5 | 910 | 20 | 50 | — | — | — |
| Inv. ex. | 135 | 3 | 900 | — | 650 | 810 | 60 | 100 |
| Inv. ex. | 136 | 5 | 900 | 10 | 50 | — | — | — |
| Inv. ex. | 137 | 4 | 900 | — | 650 | 810 | 60 | 100 |
| Comp. ex. | 138 | 3 | 900 | — | 650 | 810 | 60 | 100 |
| Comp. ex. | 139 | 8 | 900 | — | 650 | 810 | 60 | 100 |
| Comp. ex. | 140 | 1 | 900 | — | 650 | 810 | 60 | 100 |
| Comp. ex. | 141 | 4 | 900 | — | 650 | 810 | 60 | 100 |
| Comp. ex. | 142 | 1 | 900 | — | 650 | 810 | 60 | 100 |
| Comp. ex. | 143 | 3 | 930 | — | 700 | 850 | 70 | 15 |
| Comp. ex. | 144 | 3 | 930 | — | 700 | 850 | 60 | 15 |

| | | Hardness | | | Soft surface layer nano-hardness standard deviation | Average hardness change of hardness transition zone (ΔHv/mm) |
|---|---|---|---|---|---|---|
| Class | No. | A Sheet thickness ½ average Vickers hardness (Hv) | B Soft surface layer average Vickers hardness (Hv) | B/A | | |
| Inv. ex. | 101 | 600 | 170 | 0.28 | 0.4 | 1792 |
| Inv. ex. | 102 | 600 | 160 | 0.27 | 0.4 | 1833 |
| Inv. ex. | 103 | 690 | 170 | 0.25 | 0.5 | 2167 |
| Comp. ex. | 104 | 700 | 180 | 0.26 | 0.9 | 2156 |

TABLE 4-continued

| Class | No. | | | | | |
|---|---|---|---|---|---|---|
| Inv. ex. | 105 | 690 | 190 | 0.28 | 0.5 | 2670 |
| Comp. ex. | 106 | 540 | 250 | 0.46 | 0.9 | 2655 |
| Comp. ex. | 107 | 600 | 240 | 0.40 | 0.9 | 2661 |
| Inv. ex. | 108 | 640 | 190 | 0.30 | 0.4 | 2269 |
| Inv. ex. | 109 | 480 | 190 | 0.40 | 0.6 | 2243 |
| Inv. ex. | 110 | 480 | 180 | 0.38 | 0.6 | 815 |
| Comp. ex. | 111 | 690 | 230 | 0.33 | 0.9 | 2205 |
| Inv. ex. | 112 | 690 | 220 | 0.32 | 0.6 | 5633 |
| Inv. ex. | 113 | 700 | 180 | 0.26 | 0.5 | 2266 |
| Inv. ex. | 114 | 700 | 170 | 0.24 | 0.5 | 2261 |
| Inv. ex. | 115 | 700 | 180 | 0.26 | 0.5 | 2243 |
| Inv. ex. | 116 | 750 | 420 | 0.56 | 0.5 | 1010 |
| Inv. ex. | 117 | 730 | 420 | 0.58 | 0.5 | 1750 |
| Inv. ex. | 118 | 600 | 170 | 0.28 | 0.4 | 1792 |
| Inv. ex. | 119 | 590 | 160 | 0.27 | 0.4 | 2688 |
| Inv. ex. | 120 | 680 | 250 | 0.37 | 0.5 | 1933 |
| Inv. ex. | 121 | 660 | 250 | 0.38 | 0.5 | 2563 |
| Inv. ex. | 122 | 680 | 260 | 0.38 | 0.6 | 1756 |
| Inv. ex. | 123 | 680 | 260 | 0.38 | 0.6 | 2625 |
| Inv. ex. | 124 | 710 | 240 | 0.34 | 0.5 | 1958 |
| Inv. ex. | 125 | 710 | 250 | 0.35 | 0.5 | 2875 |
| Inv. ex. | 126 | 760 | 280 | 0.37 | 0.6 | 2000 |
| Inv. ex. | 127 | 740 | 280 | 0.38 | 0.7 | 2875 |
| Comp. ex. | 128 | 600 | 680 | 1.13 | 0.9 | — |
| Comp. ex. | 129 | 580 | 670 | 1.16 | 0.9 | — |
| Inv. ex. | 130 | 580 | 160 | 0.28 | 0.4 | 1750 |
| Inv. ex. | 131 | 590 | 150 | 0.25 | 0.4 | 2750 |
| Inv. ex. | 132 | 700 | 160 | 0.23 | 0.5 | 2250 |
| Inv. ex. | 133 | 680 | 170 | 0.25 | 0.5 | 4663 |
| Inv. ex. | 134 | 750 | 410 | 0.55 | 0.5 | 1123 |
| Inv. ex. | 135 | 730 | 410 | 0.56 | 0.5 | 1649 |
| Inv. ex. | 136 | 590 | 160 | 0.27 | 0.5 | 1792 |
| Inv. ex. | 137 | 590 | 160 | 0.27 | 0.5 | 2688 |
| Comp. ex. | 138 | 590 | 160 | 0.27 | 0.9 | 5300 |
| Comp. ex. | 139 | 590 | 160 | 0.27 | 0.9 | 5200 |
| Comp. ex. | 140 | 590 | 160 | 0.27 | 0.9 | 5400 |
| Comp. ex. | 141 | 590 | 160 | 0.27 | 0.9 | 5100 |
| Comp. ex. | 142 | 590 | 160 | 0.27 | 0.9 | 5200 |
| Comp. ex. | 143 | 730 | 430 | 0.59 | 0.9 | 5100 |
| Comp. ex. | 144 | 730 | 420 | 0.58 | 0.9 | 5300 |

| Class | No. | Ratio of soft surface layer (one side) to sheet thickness (%) | Tensile strength (MPa) | Limit bending radius R (mm) | Sheet thickness (mm) | Softened part | Notch tensile test σ high speed/σ low speed |
|---|---|---|---|---|---|---|---|
| Inv. ex. | 101 | 20 | 1680 | 1 | 2.4 | Both surfaces | 1.2 |
| Inv. ex. | 102 | 20 | 1690 | 1 | 2.4 | Both surfaces | 1.3 |
| Inv. ex. | 103 | 10 | 1790 | 1 | 2.4 | Both surfaces | 1.2 |
| Comp. ex. | 104 | 10 | 1790 | 2 | 2.4 | Both surfaces | 1.5 |
| Inv. ex. | 105 | 10 | 1800 | 1 | 1.2 | Both surfaces | 1.2 |
| Comp. ex. | 106 | 10 | 1600 | 2 | 1.2 | Both surfaces | 1.2 |
| Comp. ex. | 107 | 10 | 1640 | 2 | 1.2 | Both surfaces | 1.5 |
| Inv. ex. | 108 | 10 | 1650 | 1 | 1.2 | Both surfaces | 1.5 |
| Inv. ex. | 109 | 10 | 1470 | 1 | 1.2 | Both surfaces | 1.3 |
| Inv. ex. | 110 | 10 | 1460 | 1 | 1.2 | Both surfaces | 1.2 |
| Comp. ex. | 111 | 10 | 1790 | 2 | 1.2 | Both surfaces | 1.2 |
| Inv. ex. | 112 | 10 | 1800 | 1.5 | 1.2 | Both surfaces | 1.4 |
| Inv. ex. | 113 | 10 | 1780 | 1 | 1.2 | Both surfaces | 1.4 |
| Inv. ex. | 114 | 10 | 1780 | 1 | 1.2 | Both surfaces | 1.3 |
| Inv. ex. | 115 | 10 | 1800 | 1 | 1.2 | Both surfaces | 1.3 |
| Inv. ex. | 116 | 10 | 2400 | 1 | 2.6 | Both surfaces | 1.3 |
| Inv. ex. | 117 | 10 | 2300 | 1 | 0.8 | Both surfaces | 1.3 |
| Inv. ex. | 118 | 10 | 1710 | 1 | 2.4 | Both surfaces | 1.4 |
| Inv. ex. | 119 | 10 | 1670 | 1 | 1.6 | Both surfaces | 1.2 |
| Inv. ex. | 120 | 10 | 1920 | 1 | 2.4 | Both surfaces | 1.5 |
| Inv. ex. | 121 | 10 | 1900 | 1 | 1.6 | Both surfaces | 1.2 |
| Inv. ex. | 122 | 10 | 1940 | 1 | 2.4 | Both surfaces | 1.2 |
| Inv. ex. | 123 | 10 | 1960 | 1 | 1.6 | Both surfaces | 1.5 |
| Inv. ex. | 124 | 10 | 2080 | 1 | 2.4 | Both surfaces | 1.3 |
| Inv. ex. | 125 | 10 | 2070 | 1 | 1.6 | Both surfaces | 1.5 |
| Inv. ex. | 126 | 10 | 2250 | 1 | 2.4 | Both surfaces | 1.4 |
| Inv. ex. | 127 | 10 | 2230 | 1 | 1.6 | Both surfaces | 1.5 |
| Comp. ex. | 128 | 10 | 2150 | 2.5 | 2.4 | Both surfaces | 1.0 |
| Comp. ex. | 129 | 10 | 2120 | 2.5 | 1.6 | Both surfaces | 1.0 |
| Inv. ex. | 130 | 20 | 1710 | 1 | 2.4 | One surface | 1.4 |
| Inv. ex. | 131 | 20 | 1690 | 1 | 1.6 | One surface | 1.2 |
| Inv. ex. | 132 | 10 | 1810 | 1 | 2.4 | One surface | 1.2 |

TABLE 4-continued

| | | | | | | | |
|---|---|---|---|---|---|---|---|
| Inv. ex. | 133 | 10 | 1830 | 1 | 1.6 | One surface | 1.4 |
| Inv. ex. | 134 | 10 | 2440 | 1 | 2.4 | One surface | 1.2 |
| Inv. ex. | 135 | 10 | 2350 | 1 | 1.6 | One surface | 1.2 |
| Inv. ex. | 136 | 10 | 1760 | 1 | 2.4 | One surface | 1.4 |
| Inv. ex. | 137 | 10 | 1750 | 1 | 1.6 | One surface | 1.5 |
| Comp. ex. | 138 | 10 | 1780 | <u>2.5</u> | 1.6 | One surface | 1.1 |
| Comp. ex. | 139 | 10 | 1790 | <u>2.5</u> | 1.6 | One surface | 1.3 |
| Comp. ex. | 140 | 10 | 1800 | <u>3.0</u> | 1.6 | One surface | 1.5 |
| Comp. ex. | 141 | 10 | 1790 | <u>2.5</u> | 1.6 | One surface | 1.2 |
| Comp. ex. | 142 | 10 | 1790 | <u>2.5</u> | 1.6 | One surface | 1.5 |
| Comp. ex. | 143 | 13 | 2200 | <u>3.0</u> | 1.6 | Both surfaces | 1.1 |
| Comp. ex. | 144 | 13 | 2150 | <u>3.0</u> | 1.6 | Both surfaces | 1.1 |

If referring to Table 4, for example, in the steel sheets of Comparative Examples 104, 106, 107, and 111, the requirement of the average Vickers hardness of the soft surface layer being 0.60 time or less the average Vickers hardness of the ½ position in sheet thickness was satisfied and further the requirement of the average hardness change in the sheet thickness direction of the hardness transition zone being 5000 (ΔHv/mm) or less was satisfied, but it was learned that the nano-hardness standard deviation of the soft surface layer was 0.9, i.e., the requirement of being 0.8 or less was not satisfied. As a result, in the steel sheets of these comparative examples, the limit curvature radius R was 2.5 mm or 2 mm. On the other hand, in Invention Example 112, the requirement of the average Vickers hardness of the soft surface layer being 0.60 time or less the average Vickers hardness of the ½ position in sheet thickness was satisfied and further the requirement of the nano-hardness standard deviation of the soft surface layer being 0.8 or less was satisfied, but it was learned that the average hardness change in the sheet thickness direction of the hardness transition zone was 5633 (ΔHv/mm), i.e., more than 5000 (ΔHv/mm). As a result, in the steel sheet of Invention Example 112, the limit curvature radius R was 1.5 mm. In contrast to this, in the steel sheets of the invention examples satisfying the two requirements of "the average Vickers hardness of the soft surface layer being 0.60 time or less the average Vickers hardness of the ½ position in sheet thickness" and "the nano-hardness standard deviation of the soft surface layer being 0.8 or less" and having "the average hardness change in the sheet thickness direction of the hardness transition zone of 5000 (ΔHv/mm) or less", the limit curvature radius R was 1 mm. For this reason, it was learned that by controlling both the variation of hardness of the soft surface layer and the average hardness change in the sheet thickness direction of the hardness transition zone to within specific ranges, it is possible to remarkably improve the bendability of the steel sheet compared with steel sheet just combining a middle part in sheet thickness and a soft surface layer softer than the same in which only one of the variation of hardness of the soft surface layer and the average hardness change in the sheet thickness direction of the hardness transition zone is controlled to within a specific range.

Further, if referring to the hot rolled steel sheet of Comparative Example 104, if making the holding time at 700° C. to 500° C. in the cooling process after hot rolling 1 second, the nano-hardness standard deviation of the soft surface layer was 0.9 and the limit curvature radius R was 2 mm. In contrast to this, in the hot rolled steel sheet of Invention Example 103 prepared in the same way as Comparative Example 104 except for making the holding time 30 seconds and the coiling temperature 300° C., the nano-hardness standard deviation of the soft surface layer was 0.5 and the limit curvature radius R was 1 mm.

Further, if referring to the cold rolled steel sheet of Invention Example 105, it was learned that by suitably selecting the temperature and the holding time at the time of annealing so as to satisfy the requirement of holding at the Ac3 point minus 50° C. or more and 700° C. and 900° C. or less for 5 seconds or more, it is possible to suppress variation of hardness of the soft surface layer (nano-hardness standard deviation of soft surface layer: 0.5) and as a result to remarkably improve the bendability of the cold rolled steel sheet (limit curvature radius R of 1 mm). On the other hand, in the cold rolled steel sheets of Comparative Examples 106 and 107 not satisfying the above requirements, the nano-hardness standard deviation of the soft surface layer was 0.9 and the limit curvature radius R was 2 mm.

In addition, in the cold rolled steel sheet of Invention Example 109, the average cooling rate at the time of annealing was 2° C./s and the tensile strength was 1470 MPa. On the other hand, in the cold rolled steel sheet of Invention Example 108 using the same steel type b', by controlling the average cooling rate to 10° C./s, it was possible to achieve a tensile strength higher than 1650 MPa.

Further, in steel sheet manufactured by hot rolling without rough rolling being performed two times or more under conditions of a rough rolling temperature of 1100° C. or more, a sheet thickness reduction rate per pass of 5% to less than 50%, and a time between passes of 3 seconds or more, the limit curvature radius R was high and a sufficient bendability could not be achieved. Further, in all of the steel sheets according to the invention examples of the present invention, the value of a high speed/α low speed was more than 1.0, therefore it was possible to suppress the notch effect.

Example C: Formation of Middle Part in Sheet Thickness Comprising, by Area Percent, 10% or More of Retained Austenite A continuously cast slab of a thickness of 20 mm having each of the chemical compositions shown in Table 5 (matrix steel sheet) was ground at its surfaces to remove surface oxides, then was superposed with surface layer-use steel sheet having the chemical compositions shown in Table 5 at one surface or both surfaces by arc welding. This was hot rolled under conditions of a heating temperature, finishing temperature, and coiling temperature shown in Table 6 to obtain a multilayer hot rolled steel sheet. In the case of a test material having the hot rolled steel sheet as the finished product, the holding time at the 700° C. to 500° C. of hot rolling was intentionally controlled to the value shown in Table 6. If having a cold rolled steel sheet as the finished product, after that, the sheet was pickled, cold rolled by the cold rolling rate shown in Table 6, and further annealed under the conditions shown in Table 6.

When the obtained products were measured for chemical compositions at positions of 2% of the sheet thickness from the surface layer and for chemical compositions at ½ positions of sheet thickness, there were substantially no changes from the chemical compositions of the matrix steel sheets and steel sheets for surface layer use shown in Table 5.

TABLE 5

| | Matrix steel sheet (mass %) | | | | | | | | | | | | | | | |
|---|---|---|---|---|---|---|---|---|---|---|---|---|---|---|---|---|
| Steel type | C | Si | Mn | S | P | Al | N | Cr | Mo | B | Ti | Nb | V | Cu | Ni | REM |
| A | 0.05 | 0.8 | 2.10 | 0.001 | 0.02 | | | | | | | | | | | |
| B | 0.10 | 1.4 | 2.00 | 0.002 | 0.03 | | | | | | | | | | | |
| C | 0.15 | 1.8 | 2.1 | 0.04 | 0.01 | | | | | | | | | | | |
| D | 0.20 | 1.5 | 2 | 0.03 | 0.03 | | | | | | | | | | | |
| E | 0.35 | 1.9 | 2.60 | 0.001 | 0.05 | | | | | | | | | | | |
| F | 0.45 | 1.9 | 2.80 | 0.002 | 0.01 | | | | | | | | | | | |
| G | 0.62 | 2.2 | 3.10 | 0.002 | 0.03 | | | | | | | | | | | |
| H | 0.78 | 2.3 | 2.00 | 0.002 | 0.02 | | | | | | | | | | | 0.10 | |
| I | 0.15 | 0.4 | 3.10 | 0.001 | 0.02 | | | | | | | | | 0.05 | | |
| J | 0.17 | 1.2 | 3.10 | 0.001 | 0.04 | | | | | | | | | | | |
| K | 0.14 | 1.5 | 1.00 | 0.001 | 0.02 | | | | | | | | | | | |
| L | 0.24 | 2.2 | 2.00 | 0.001 | 0.02 | | | | | | | | | | | |
| M | 0.18 | 2.5 | 2.00 | 0.001 | 0.01 | | | | | | | | | | | |
| N | 0.18 | 1.5 | 0.5 | 0.002 | 0.06 | | | | | | | | | | | |
| O | 0.15 | 1.6 | 1.2 | 0.01 | 0.04 | | | | | | | | | | | |
| P | 0.14 | 1.4 | 1.8 | 0.01 | 0.03 | | | | | | | | | | | |
| Q | 0.16 | 1.8 | 2.5 | 0.02 | 0.01 | | | | | | | | | | | |
| R | 0.17 | 1.7 | 3.8 | 0.03 | 0.01 | | | | | | | | | | | |
| U | 0.61 | 2.4 | 3.7 | 0.05 | 0.03 | | | 0.5 | | | | | | | | 0.01 |
| V | 0.41 | 2.3 | 4 | 0.04 | 0.01 | 1 | | | | | | | | | | |
| W | 0.21 | 2.1 | 3.4 | 0.01 | 0.01 | | | | 0.5 | | | | | | | |
| X | 0.3 | 2.1 | 3 | 0.03 | 0.01 | | | | 1 | | | | | | | |
| Y | 0.41 | 1.7 | 3.4 | 0.01 | 0.01 | | | | | 0.002 | | | | | 0.3 | |
| Z | 0.58 | 2 | 3.9 | 0.02 | 0.01 | | | | | | 0.03 | | 0.1 | | | |
| AA | 0.6 | 2.4 | 2 | 0.01 | 0.02 | | | 0.3 | | | | 0.03 | | 0.2 | 0.05 | |
| AB | 0.19 | 2.5 | 2.8 | 0.01 | 0.01 | | | | 0.05 | | | 0.02 | 0.02 | | | |
| AC | 0.54 | 1.6 | 3.2 | 0.02 | 0.01 | | | | | | | | 0.06 | | | |
| AD | 0.18 | 1.6 | 3.9 | 0.02 | 0.01 | | | 0.2 | 0.1 | 0.01 | 0.02 | 0.02 | | | | 0.03 |
| AE | 0.02 | 1.2 | 2 | 0.001 | 0.02 | | | | | | | | | | | |
| AF | 0.15 | 0.2 | 2 | 0.001 | 0.02 | | | | | | | | | | | |
| AG | 0.15 | 1.2 | 0.005 | 0.001 | 0.02 | | | | | | | | | | | |
| AH | 0.15 | 1.2 | 2 | 0.001 | 0.15 | | | | | | | | | | | |
| AI | 0.1 | 1.2 | 2 | 0.001 | 0.02 | | | | | | | | | | | |
| AJ | 0.15 | 1.8 | 2.1 | 0.04 | 0.01 | | | | 0.5 | 0.002 | | | | | | |
| AK | 0.15 | 1.3 | 2.5 | 0.001 | 0.02 | | | | | | 0.02 | | | | | |
| AL | 0.15 | 1.5 | 3 | 0.001 | 0.02 | | | | | | | 0.02 | | | | |

| | Surface layer-use steel sheet (mass %) | | | | | | | | | | | | | | | |
|---|---|---|---|---|---|---|---|---|---|---|---|---|---|---|---|---|
| Steel type | C | Si | Mn | S | P | Al | N | Cr | Mo | B | Ti | Nb | V | Cu | Ni | REM |
| A | 0.04 | 1.32 | 0.7 | 0.001 | 0.001 | | | | | | | | | | | |
| B | 0.07 | 0.40 | 1.4 | 0.001 | 0.001 | | | 0.100 | | | | | | | | |
| C | 0.12 | 1.28 | 0.6 | 0.002 | 0.001 | | | | 0.050 | | | | | | | |
| D | 0.13 | 0.53 | 1.4 | 0.001 | 0.001 | | | | | 0.003 | | | | | | |
| E | 0.09 | 1.83 | 0.8 | 0.001 | 0.005 | | | | | | 0.02 | | | | | |
| F | 0.07 | 1.36 | 0.9 | 0.002 | 0.010 | | | | | | | 0.02 | | | | |
| G | 0.09 | 1.43 | 2.2 | 0.002 | 0.010 | | | | | | | | 0.02 | | | |
| H | 0.03 | 1.52 | 1.1 | 0.002 | 0.010 | | | | | | | | | 0.01 | | |
| I | 0.08 | 0.57 | 1.3 | 0.002 | 0.010 | | | | | | | | | | 0.01 | |
| J | 0.11 | 1.60 | 1.5 | 0.001 | 0.005 | | | 0.2 | 0.1 | | 0.02 | | | | | |
| K | 0.03 | 1.48 | 0.3 | 0.001 | 0.005 | | | | | | 0.01 | 0.02 | | | | |
| L | 0.07 | 0.69 | 0.8 | 0.001 | 0.005 | | | | | | | | | | | |
| M | 0.01 | 0.52 | 1.5 | 0.001 | 0.005 | | | | | | | | 0.03 | | | |
| N | 0.11 | 0.41 | 0.1 | 0.001 | 0.005 | | | | | | | | | | | |
| O | 0.13 | 1.28 | 0.4 | 0.002 | 0.001 | | | | | | 0.04 | | | | | |
| P | 0.02 | 1.92 | 0.4 | 0.001 | 0.001 | | | | | | | | | | | |
| Q | 0.05 | 1.41 | 1.3 | 0.001 | 0.005 | | | | | | | | 0.03 | | | |
| R | 0.04 | 0.87 | 2.0 | 0.002 | 0.010 | | | | 0.002 | | | | | | | |
| U | 0.04 | 1.25 | 2.3 | 0.002 | 0.005 | | | | | | | | | | | |
| V | 0.15 | 0.99 | 1.2 | 0.001 | 0.005 | | | | | | | 0.01 | 0.02 | | | |
| W | 0.02 | 0.83 | 0.3 | 0.001 | 0.005 | | | | 0.002 | 0.01 | | | 0.02 | | | |
| X | 0.07 | 1.19 | 1.4 | 0.001 | 0.001 | | | | | | | | | | | |
| Y | 0.02 | 0.77 | 1.6 | 0.002 | 0.001 | 1 | | | | | | | | | | |
| Z | 0.01 | 1.76 | 0.5 | 0.001 | 0.001 | | | 1 | | | | | | | | |
| AA | 0.10 | 1.69 | 1.4 | 0.002 | 0.005 | | | | | | | | | 0.1 | | |
| AB | 0.10 | 0.66 | 1.2 | 0.001 | 0.010 | | | | | | | | | | | |
| AC | 0.00 | 0.47 | 0.8 | 0.001 | 0.010 | | | | | | | | | | | |
| AD | 0.13 | 1.76 | 0.4 | 0.002 | 0.02 | | | | | | | | | | | |
| AE | 0.01 | 0.50 | 1.4 | 0.001 | 0.001 | | | | | | | | | | | |
| AF | 0.07 | 0.50 | 1.4 | 0.001 | 0.001 | | | | | | | | | | | |
| AG | 0.07 | 0.50 | 0.01 | 0.001 | 0.001 | | | | | | | | | | | |
| AH | 0.07 | 0.50 | 1.4 | 0.001 | 0.001 | | | | | | | | | | | |
| AI | 0.07 | 0.50 | 1.3 | 0.001 | 0.001 | | | | | | | | | | | |

TABLE 5-continued

| | | | | | |
|---|---|---|---|---|---|
| AJ | 0.04 | 1.32 | 0.7 | 0.001 | 0.001 |
| AK | 0.04 | 1.32 | 0.7 | 0.001 | 0.001 |
| AL | 0.04 | 1.32 | 0.7 | 0.001 | 0.001 |

TABLE 6

| | | | Hot rolling conditions | | | | |
|---|---|---|---|---|---|---|---|
| Class | No. | Steel | Heating temp. (° C.) | Rough rolling temp. (° C.) | Sheet thickness reduction rate per pass (%) | Time between passes (s) | Rolling operations |
| Inv. ex. | 201 | A | 1166 | 1150 | 19 | 7 | 4 |
| Inv. ex. | 202 | B | 1110 | 1110 | 17 | 7 | 2 |
| Inv. ex. | 203 | C | 1115 | 1110 | 21 | 5 | 4 |
| Inv. ex. | 204 | D | 1170 | 1100 | 35 | 6 | 3 |
| Inv. ex. | 205 | E | 1172 | 1160 | 36 | 7 | 4 |
| Inv. ex. | 206 | F | 1290 | 1240 | 42 | 10 | 3 |
| Inv. ex. | 207 | G | 1220 | 1190 | 22 | 10 | 3 |
| Inv. ex. | 208 | H | 1160 | 1130 | 39 | 5 | 2 |
| Inv. ex. | 209 | I | 1238 | 1220 | 12 | 9 | 3 |
| Inv. ex. | 210 | J | 1245 | 1160 | 24 | 6 | 5 |
| Inv. ex. | 211 | K | 1152 | 1140 | 18 | 9 | 4 |
| Inv. ex. | 212 | L | 1253 | 1220 | 27 | 10 | 4 |
| Inv. ex. | 213 | M | 1116 | 1110 | 14 | 6 | 4 |
| Inv. ex. | 214 | N | 1146 | 1100 | 26 | 9 | 2 |
| Inv. ex. | 215 | O | 1112 | 1110 | 44 | 10 | 5 |
| Inv. ex. | 216 | P | 1201 | 1110 | 36 | 6 | 5 |
| Inv. ex. | 217 | Q | 1233 | 1220 | 14 | 4 | 4 |
| Inv. ex. | 218 | R | 1257 | 1110 | 20 | 8 | 3 |
| Inv. ex. | 219 | U | 1214 | 1150 | 33 | 9 | 3 |
| Inv. ex. | 220 | V | 1116 | 1110 | 44 | 4 | 3 |
| Inv. ex. | 221 | W | 1252 | 1240 | 35 | 10 | 4 |
| Inv. ex. | 222 | X | 1248 | 1160 | 20 | 8 | 2 |
| Inv. ex. | 223 | Y | 1203 | 1200 | 23 | 9 | 3 |
| Inv. ex. | 224 | Z | 1121 | 1120 | 38 | 5 | 3 |
| Inv. ex. | 225 | AA | 1126 | 1120 | 43 | 10 | 5 |
| Inv. ex. | 226 | AA | 1212 | 1200 | 12 | 9 | 4 |
| Inv. ex. | 227 | AA | 1249 | 1150 | 40 | 8 | 5 |
| Inv. ex. | 228 | AA | 1151 | 1150 | 27 | 4 | 2 |
| Inv. ex. | 229 | AA | 1157 | 1150 | 23 | 6 | 3 |
| Inv. ex. | 230 | AA | 1109 | 1100 | 34 | 5 | 4 |
| Inv. ex. | 231 | AA | 1107 | 1100 | 39 | 3 | 2 |
| Inv. ex. | 232 | AA | 1131 | 1130 | 32 | 3 | 5 |
| Inv. ex. | 233 | AA | 1121 | 1110 | 24 | 10 | 5 |
| Inv. ex. | 234 | AB | 1123 | 1110 | 17 | 8 | 2 |
| Inv. ex. | 235 | AB | 1219 | 1210 | 36 | 10 | 3 |
| Inv. ex. | 236 | AB | 1193 | 1190 | 41 | 7 | 2 |
| Inv. ex. | 237 | AC | 1166 | 1160 | 13 | 3 | 3 |
| Inv. ex. | 238 | AC | 1231 | 1220 | 43 | 6 | 2 |
| Inv. ex. | 239 | AD | 1238 | 1210 | 24 | 10 | 5 |
| Inv. ex. | 240 | AD | 1219 | 1210 | 10 | 6 | 5 |
| Inv. ex. | 241 | AD | 1193 | 1130 | 28 | 4 | 3 |
| Comp. ex. | 242 | AE | 1241 | 1160 | 41 | 7 | 2 |
| Inv. ex. | 243 | AF | 1226 | 1140 | 32 | 8 | 5 |
| Comp. ex. | 244 | AG | 1257 | 1250 | 24 | 7 | 3 |
| Comp. ex. | 245 | AH | 1244 | 1240 | 18 | 9 | 5 |
| Comp. ex. | 246 | AI | 1215 | 1200 | 11 | 9 | 4 |
| Comp. ex. | 247 | AJ | <u>1000</u> | <u>1000</u> | 10 | 10 | 4 |
| Comp. ex. | 248 | AK | 1200 | 1180 | 16 | 4 | 2 |
| Comp. ex. | 249 | AL | 1250 | 1240 | 19 | 9 | 5 |
| Comp. ex. | 250 | AL | 1250 | 1120 | 21 | 6 | 2 |
| Comp. ex. | 251 | AL | 1250 | 1190 | 42 | 9 | 2 |
| Inv. ex. | 252 | AL | 1250 | 1180 | 36 | 7 | 4 |
| Inv. ex. | 253 | AL | 1250 | 1190 | 22 | 9 | 5 |
| Inv. ex. | 254 | AL | 1250 | 1230 | 30 | 4 | 5 |
| Inv. ex. | 255 | AL | 1250 | 1240 | 44 | 9 | 3 |
| Comp. ex. | 256 | AL | 1250 | 1140 | 11 | 3 | 4 |
| Comp. ex. | 257 | AL | 1250 | <u>1000</u> | 30 | 5 | 3 |
| Comp. ex. | 258 | AL | 1250 | 1200 | <u>4</u> | 5 | 4 |
| Comp. ex. | 259 | AL | 1250 | 1200 | <u>60</u> | 5 | 3 |
| Comp. ex. | 260 | AL | 1250 | 1200 | 30 | <u>2</u> | 2 |
| Comp. ex. | 261 | AL | 1250 | 1200 | 30 | 5 | <u>1</u> |

TABLE 6-continued

| | | Hot rolling conditions | | | Cold rolling |
| --- | --- | --- | --- | --- | --- |
| Class | No. | Finishing temp. (° C.) | 700° C. to 500° C. holding time (s) | Coiling temp. (° C.) | Cold rolling rate (%) |
| Inv. ex. | 201 | 827 | 3 | 480 | — |
| Inv. ex. | 202 | 840 | 10 | 539 | — |
| Inv. ex. | 203 | 854 | 16 | 481 | — |
| Inv. ex. | 204 | 850 | 28 | 447 | — |
| Inv. ex. | 205 | 852 | 42 | 320 | — |
| Inv. ex. | 206 | 845 | — | 640 | 23 |
| Inv. ex. | 207 | 878 | — | 660 | 45 |
| Inv. ex. | 208 | 844 | — | 510 | 66 |
| Inv. ex. | 209 | 828 | — | 420 | 62 |
| Inv. ex. | 210 | 854 | — | 680 | 65 |
| Inv. ex. | 211 | 860 | — | 270 | 72 |
| Inv. ex. | 212 | 843 | — | 480 | 34 |
| Inv. ex. | 213 | 886 | — | 680 | 23 |
| Inv. ex. | 214 | 835 | — | 490 | 29 |
| Inv. ex. | 215 | 893 | — | 490 | 35 |
| Inv. ex. | 216 | 872 | — | 580 | 62 |
| Inv. ex. | 217 | 862 | — | 620 | 76 |
| Inv. ex. | 218 | 887 | — | 360 | 47 |
| Inv. ex. | 219 | 887 | — | 500 | 62 |
| Inv. ex. | 220 | 896 | — | 640 | 60 |
| Inv. ex. | 221 | 862 | — | 390 | 23 |
| Inv. ex. | 222 | 822 | — | 470 | 31 |
| Inv. ex. | 223 | 882 | — | 530 | 48 |
| Inv. ex. | 224 | 855 | — | 540 | 79 |
| Inv. ex. | 225 | 869 | — | 450 | 50 |
| Inv. ex. | 226 | 892 | — | 320 | 65 |
| Inv. ex. | 227 | 841 | — | 590 | 72 |
| Inv. ex. | 228 | 850 | — | 450 | 64 |
| Inv. ex. | 229 | 871 | — | 320 | 30 |
| Inv. ex. | 230 | 845 | — | 380 | 60 |
| Inv. ex. | 231 | 860 | — | 390 | 50 |
| Inv. ex. | 232 | 889 | — | 540 | 71 |
| Inv. ex. | 233 | 829 | — | 390 | 35 |
| Inv. ex. | 234 | 860 | — | 390 | 27 |
| Inv. ex. | 235 | 827 | — | 550 | 60 |
| Inv. ex. | 236 | 892 | — | 360 | 67 |
| Inv. ex. | 237 | 892 | — | 390 | 67 |
| Inv. ex. | 238 | 845 | — | 520 | 43 |
| Inv. ex. | 239 | 845 | — | 580 | 79 |
| Inv. ex. | 240 | 827 | — | 550 | 60 |
| Inv. ex. | 241 | 892 | — | 360 | 67 |
| Comp. ex. | 242 | 882 | — | 541 | 59 |
| Inv. ex. | 243 | 889 | — | 567 | 49 |
| Comp. ex. | 244 | 893 | — | 589 | 47 |
| Comp. ex. | 245 | 879 | — | 541 | 62 |
| Comp. ex. | 246 | 862 | — | 528 | 59 |
| Comp. ex. | 247 | Sheet fractured during hot rolling, so subsequent tests not possible | | | |
| Comp. ex. | 248 | 760 | Due to shape defects of hot rolled sheet, subsequent tests not possible | | |
| Comp. ex. | 249 | 850 | — | 560 | 5 |
| Comp. ex. | 250 | 850 | — | 560 | 95 |
| Comp. ex. | 251 | 850 | — | 560 | 45 |
| Inv. ex. | 252 | 850 | — | 560 | 50 |
| Inv. ex. | 253 | 850 | — | 560 | 45 |
| Inv. ex. | 254 | 850 | — | 560 | 45 |
| Inv. ex. | 255 | 850 | — | 560 | 45 |
| Comp. ex. | 256 | 850 | — | 560 | 45 |
| Comp. ex. | 257 | 851 | — | 560 | 45 |
| Comp. ex. | 258 | 852 | — | 560 | 45 |
| Comp. ex. | 259 | 853 | — | 560 | 45 |
| Comp. ex. | 260 | 854 | — | 560 | 45 |
| Comp. ex. | 261 | 855 | — | 560 | 45 |

| | | Annealing conditions | | | | | |
| --- | --- | --- | --- | --- | --- | --- | --- |
| Class | No. | Heating temp. (° C.) | Holding time (s) | Preliminary cooling stop temp. (° C.) | Stopping time during preliminary cooling (s) | Cooling rate (° C./s) | Cooling stop temp. (° C.) | 300° C. to 500° C. stopping time (s) |
| Inv. ex. | 201 | — | — | — | — | — | — | — |
| Inv. ex. | 202 | — | — | — | — | — | — | — |
| Inv. ex. | 203 | — | — | — | — | — | — | — |
| Inv. ex. | 204 | — | — | — | — | — | — | — |

TABLE 6-continued

| Class | No. | | | | | | | |
|---|---|---|---|---|---|---|---|---|
| Inv. ex. | 205 | — | — | — | — | — | — | — |
| Inv. ex. | 206 | 810 | 43 | None | None | 18 | 223 | 148 |
| Inv. ex. | 207 | 850 | 94 | None | None | 18 | 207 | 233 |
| Inv. ex. | 208 | 840 | 62 | None | None | 42 | 207 | 220 |
| Inv. ex. | 209 | 760 | 28 | None | None | 25 | 386 | 250 |
| Inv. ex. | 210 | 820 | 133 | None | None | 38 | 354 | 305 |
| Inv. ex. | 211 | 840 | 32 | None | None | 36 | 483 | 133 |
| Inv. ex. | 212 | 880 | 171 | None | None | 40 | 419 | 275 |
| Inv. ex. | 213 | 890 | 70 | None | None | 45 | 464 | 289 |
| Inv. ex. | 214 | 825 | 5 | None | None | 29 | 402 | 195 |
| Inv. ex. | 215 | 821 | 30 | None | None | 35 | 280 | 223 |
| Inv. ex. | 216 | 838 | 100 | None | None | 34 | 513 | 235 |
| Inv. ex. | 217 | 859 | 230 | None | None | 25 | 379 | 250 |
| Inv. ex. | 218 | 856 | 128 | 730 | 5 | 22 | 254 | 333 |
| Inv. ex. | 219 | 845 | 40 | 650 | 6 | 14 | 163 | 203 |
| Inv. ex. | 220 | 839 | 170 | 650 | 15 | 26 | 105 | 335 |
| Inv. ex. | 221 | 828 | 147 | None | None | 10 | 309 | 284 |
| Inv. ex. | 222 | 826 | 165 | None | None | 20 | 265 | 141 |
| Inv. ex. | 223 | 856 | 91 | None | None | 50 | 200 | 230 |
| Inv. ex. | 224 | 838 | 84 | None | None | 80 | 191 | 201 |
| Inv. ex. | 225 | 838 | 89 | None | None | 100 | 200 | 212 |
| Inv. ex. | 226 | 856 | 133 | None | None | 25 | 144 | 188 |
| Inv. ex. | 227 | 827 | 43 | None | None | 44 | 184 | 323 |
| Inv. ex. | 228 | 850 | 85 | None | None | 41 | 202 | 238 |
| Inv. ex. | 229 | 837 | 12 | None | None | 18 | 224 | 263 |
| Inv. ex. | 230 | 845 | 44 | None | None | 11 | 254 | 123 |
| Inv. ex. | 231 | 830 | 58 | None | None | 42 | 284 | 265 |
| Inv. ex. | 232 | 833 | 146 | None | None | 28 | 250 | 337 |
| Inv. ex. | 233 | 832 | 106 | None | None | 37 | 80 | 253 |
| Inv. ex. | 234 | 821 | 96 | None | None | 39 | 230 | 313 |
| Inv. ex. | 235 | 855 | 98 | None | None | 14 | 150 | 137 |
| Inv. ex. | 236 | 827 | 96 | None | None | 35 | 293 | 186 |
| Inv. ex. | 237 | 851 | 70 | None | None | 10 | 233 | 304 |
| Inv. ex. | 238 | 835 | 101 | None | None | 35 | 233 | 190 |
| Inv. ex. | 239 | 854 | 171 | None | None | 22 | 270 | 125 |
| Inv. ex. | 240 | 828 | 51 | None | None | 10 | 250 | 146 |
| Inv. ex. | 241 | 859 | 68 | None | None | 38 | 324 | 173 |
| Comp. ex. | 242 | 835 | 80 | None | None | 19 | 447 | 340 |
| Inv. ex. | 243 | 859 | 60 | None | None | 30 | 387 | 282 |
| Comp. ex. | 244 | 859 | 68 | None | None | 24 | 377 | 132 |
| Comp. ex. | 245 | 849 | 39 | None | None | 19 | 386 | 172 |
| Comp. ex. | 246 | 849 | 69 | None | None | 26 | 382 | 214 |
| Comp. ex. | 247 | Sheet fractured during hot rolling, so subsequent tests not possible | | | | | | |
| Comp. ex. | 248 | Due to shape defects of hot rolled sheet, subsequent tests not possible | | | | | | |
| Comp. ex. | 249 | Due to shape defects of cold rolled sheet, subsequent tests not possible | | | | | | |
| Comp. ex. | 250 | Cold rolling load excessive, so cold rolling not possible | | | | | | |
| Comp. ex. | 251 | 680 | 60 | None | None | 30 | 300 | 300 |
| Inv. ex. | 252 | 850 | 2 | None | None | 30 | 250 | 50 |
| Inv. ex. | 253 | 850 | 60 | None | None | 20 | 235 | 0 |
| Inv. ex. | 254 | 850 | 60 | None | None | 20 | 260 | 3 |
| Inv. ex. | 255 | 850 | 60 | None | None | 20 | 260 | 15 |
| Comp. ex. | 256 | 850 | 60 | None | None | 20 | 260 | 20 |
| Comp. ex. | 257 | 850 | 60 | None | None | 20 | 260 | 20 |
| Comp. ex. | 258 | 850 | 60 | None | None | 20 | 260 | 20 |
| Comp. ex. | 259 | 850 | 60 | None | None | 20 | 260 | 20 |
| Comp. ex. | 260 | 850 | 60 | None | None | 20 | 260 | 20 |
| Comp. ex. | 261 | 850 | 60 | None | None | 20 | 260 | 20 |

| | | Annealing conditions Stopping time at Ms-100° C. | Plating | | Sf | | | |
|---|---|---|---|---|---|---|---|---|
| Class | No. | or more (s) | Plating | Alloying | (%) | Bs | Ms | Ac3 |
| Inv. ex. | 201 | — | — | — | 11 | 585 | 429 | 900 |
| Inv. ex. | 202 | — | — | — | 16 | 554 | 394 | 908 |
| Inv. ex. | 203 | — | — | — | 23 | 508 | 348 | 912 |
| Inv. ex. | 204 | — | — | — | 28 | 504 | 317 | 886 |
| Inv. ex. | 205 | — | — | — | 36 | 357 | 162 | 875 |
| Inv. ex. | 206 | 158 | None | None | 32 | 306 | 101 | 859 |
| Inv. ex. | 207 | 248 | None | None | 0 | 280 | 106 | 848 |
| Inv. ex. | 208 | 240 | None | None | 0 | 324 | 65 | 832 |
| Inv. ex. | 209 | 262 | None | None | 64 | 405 | 229 | 849 |
| Inv. ex. | 210 | 315 | Yes | Yes | 44 | 408 | 270 | 880 |
| Inv. ex. | 211 | 163 | None | None | 17 | 626 | 404 | 901 |
| Inv. ex. | 212 | 295 | None | None | 0 | 489 | 324 | 909 |
| Inv. ex. | 213 | 305 | None | None | 0 | 495 | 348 | 936 |
| Inv. ex. | 214 | 205 | None | None | 16 | 657 | 399 | 891 |
| Inv. ex. | 215 | 234 | None | None | 38 | 583 | 360 | 903 |
| Inv. ex. | 216 | 260 | None | None | 43 | 534 | 340 | 897 |

TABLE 6-continued

| Class | No. | | | | | | | |
|---|---|---|---|---|---|---|---|---|
| Inv. ex. | 217 | 257 | None | None | 35 | 457 | 310 | 909 |
| Inv. ex. | 218 | 339 | None | None | 51 | 314 | 218 | 902 |
| Inv. ex. | 219 | 215 | None | None | 0 | 189 | 78 | 859 |
| Inv. ex. | 220 | 355 | None | None | 32 | 135 | 64 | 883 |
| Inv. ex. | 221 | 301 | Yes | None | 45 | 325 | 209 | 927 |
| Inv. ex. | 222 | 169 | None | None | 52 | 292 | 109 | 924 |
| Inv. ex. | 223 | 255 | None | None | 27 | 273 | 125 | 851 |
| Inv. ex. | 224 | 229 | None | None | 12 | 204 | 62 | 845 |
| Inv. ex. | 225 | 239 | None | None | 30 | 281 | 23 | 859 |
| Inv. ex. | 226 | 204 | None | None | 21 | 309 | 69 | 859 |
| Inv. ex. | 227 | 349 | None | None | 18 | 317 | 82 | 859 |
| Inv. ex. | 228 | 256 | None | None | 1 | 353 | 141 | 859 |
| Inv. ex. | 229 | 263 | None | None | 7 | 341 | 122 | 859 |
| Inv. ex. | 230 | 123 | None | None | 16 | 322 | 90 | 859 |
| Inv. ex. | 231 | 265 | None | None | 16 | 322 | 90 | 859 |
| Inv. ex. | 232 | 337 | None | None | 30 | 279 | 20 | 859 |
| Inv. ex. | 233 | 282 | None | None | 32 | 275 | 13 | 859 |
| Inv. ex. | 234 | 318 | None | None | 68 | 305 | 126 | 937 |
| Inv. ex. | 235 | 153 | None | None | 48 | 370 | 233 | 937 |
| Inv. ex. | 236 | 201 | None | None | 64 | 321 | 154 | 937 |
| Inv. ex. | 237 | 304 | None | None | 0 | 316 | 149 | 839 |
| Inv. ex. | 238 | 190 | None | None | 3 | 311 | 140 | 839 |
| Inv. ex. | 239 | 125 | None | None | 27 | 326 | 261 | 899 |
| Inv. ex. | 240 | 176 | Yes | None | 42 | 307 | 230 | 899 |
| Inv. ex. | 241 | 253 | Yes | Yes | 24 | 328 | 265 | 899 |
| Comp. ex. | 242 | 349 | None | None | 50 | 584 | 434 | 935 |
| Inv. ex. | 243 | 297 | None | None | 0 | 589 | 397 | 840 |
| Comp. ex. | 244 | 138 | None | None | 20 | 721 | 434 | 885 |
| Comp. ex. | 245 | 197 | None | None | 24 | 538 | 359 | 885 |
| Comp. ex. | 246 | 246 | None | None | 31 | 554 | 384 | 899 |
| Comp. ex. | 247 | Sheet fractured during hot rolling, so subsequent tests not possible | | | | | | |
| Comp. ex. | 248 | Due to shape defects of hot rolled sheet, subsequent tests not possible | | | | | | |
| Comp. ex. | 249 | Due to shape defects of cold rolled sheet, subsequent tests not possible | | | | | | |
| Comp. ex. | 250 | Cold rolling load excessive, so cold rolling not possible | | | | | | |
| Comp. ex. | 251 | 315 | None | None | 100 | None | None | 898 |
| Inv. ex. | 252 | 213 | None | None | 30 | 432 | 312 | 898 |
| Inv. ex. | 253 | 0 | None | None | 30 | 432 | 312 | 898 |
| Inv. ex. | 254 | 3 | None | None | 30 | 432 | 312 | 898 |
| Inv. ex. | 255 | 25 | None | None | 30 | 432 | 312 | 898 |
| Comp. ex. | 256 | 1050 | None | None | 30 | 432 | 312 | 898 |
| Comp. ex. | 257 | 150 | None | None | 30 | 432 | 312 | 898 |
| Comp. ex. | 258 | 150 | None | None | 30 | 432 | 312 | 898 |
| Comp. ex. | 259 | 150 | None | None | 30 | 432 | 312 | 898 |
| Comp. ex. | 260 | 150 | None | None | 30 | 432 | 312 | 898 |
| Comp. ex. | 261 | 150 | None | None | 30 | 432 | 312 | 898 |

| Class | No. | Middle part in sheet thickness (mm) | Soft surface layer (one side) (mm) | Position of soft surface layer | Ratio of soft surface layer (one side) to sheet thickness (%) | Sheet thickness Total thickness (mm) | A Sheet thickness ½ average Vickers hardness (Hv) | B Soft surface layer average Vickers hardness (Hv) |
|---|---|---|---|---|---|---|---|---|
| Inv. ex. | 201 | 2.0 | 0.3 | Both surfaces | 12 | 2.6 | 289 | 153 |
| Inv. ex. | 202 | 2.5 | 0.3 | One surface | 11 | 2.8 | 305 | 170 |
| Inv. ex. | 203 | 2.4 | 0.4 | Both surfaces | 13 | 3.2 | 329 | 194 |
| Inv. ex. | 204 | 2.8 | 0.4 | Both surfaces | 11 | 3.6 | 351 | 199 |
| Inv. ex. | 205 | 1.8 | 0.3 | Both surfaces | 13 | 2.4 | 409 | 179 |
| Inv. ex. | 206 | 2.6 | 0.25 | Both surfaces | 8 | 3.1 | 440 | 170 |
| Inv. ex. | 207 | 2.9 | 0.3 | Both surfaces | 9 | 3.5 | 486 | 179 |
| Inv. ex. | 208 | 1.6 | 0.3 | Both surfaces | 14 | 2.2 | 527 | 148 |
| Inv. ex. | 209 | 2.1 | 0.5 | Both surfaces | 16 | 3.1 | 385 | 175 |
| Inv. ex. | 210 | 1.9 | 0.35 | Both surfaces | 13 | 2.6 | 348 | 188 |
| Inv. ex. | 211 | 1.9 | 0.35 | Both surfaces | 13 | 2.6 | 332 | 147 |
| Inv. ex. | 212 | 3.0 | 0.15 | One surface | 5 | 3.2 | 379 | 170 |
| Inv. ex. | 213 | 2.6 | 0.35 | Both surfaces | 11 | 3.3 | 343 | 136 |
| Inv. ex. | 214 | 2.8 | 0.45 | Both surfaces | 12 | 3.7 | 333 | 189 |
| Inv. ex. | 215 | 2.3 | 0.25 | Both surfaces | 9 | 2.8 | 325 | 188 |
| Inv. ex. | 216 | 3.0 | 0.25 | Both surfaces | 7 | 3.5 | 314 | 142 |
| Inv. ex. | 217 | 2.3 | 0.3 | Both surfaces | 10 | 2.9 | 324 | 161 |
| Inv. ex. | 218 | 2.9 | 0.45 | Both surfaces | 12 | 3.8 | 328 | 155 |
| Inv. ex. | 219 | 1.6 | 0.35 | Both surfaces | 15 | 2.3 | 474 | 154 |
| Inv. ex. | 220 | 2.0 | 0.45 | Both surfaces | 16 | 2.9 | 418 | 209 |
| Inv. ex. | 221 | 2.5 | 0.4 | Both surfaces | 12 | 3.3 | 346 | 141 |
| Inv. ex. | 222 | 2.4 | 0.8 | One surface | 25 | 3.2 | 381 | 169 |
| Inv. ex. | 223 | 3.0 | 0.5 | Both surfaces | 13 | 4.0 | 418 | 140 |
| Inv. ex. | 224 | 1.8 | 0.25 | Both surfaces | 11 | 2.3 | 466 | 135 |
| Inv. ex. | 225 | 1.7 | 0.45 | Both surfaces | 17 | 2.6 | 471 | 186 |
| Inv. ex. | 226 | 1.7 | 0.45 | Both surfaces | 17 | 2.6 | 471 | 186 |

TABLE 6-continued

| Class | No. | | | | | | | |
|---|---|---|---|---|---|---|---|---|
| Inv. ex. | 227 | 1.7 | 0.45 | Both surfaces | 17 | 2.6 | 471 | 186 |
| Inv. ex. | 228 | 1.7 | 0.45 | Both surfaces | 17 | 2.6 | 471 | 186 |
| Inv. ex. | 229 | 1.7 | 0.45 | Both surfaces | 17 | 2.6 | 471 | 186 |
| Inv. ex. | 230 | 1.7 | 0.45 | Both surfaces | 17 | 2.6 | 471 | 186 |
| Inv. ex. | 231 | 1.7 | 0.45 | Both surfaces | 17 | 2.6 | 471 | 186 |
| Inv. ex. | 232 | 1.7 | 0.45 | Both surfaces | 17 | 2.6 | 471 | 186 |
| Inv. ex. | 233 | 1.7 | 0.45 | Both surfaces | 17 | 2.6 | 471 | 186 |
| Inv. ex. | 234 | 1.9 | 0.3 | Both surfaces | 12 | 2.5 | 337 | 187 |
| Inv. ex. | 235 | 1.9 | 0.3 | Both surfaces | 12 | 2.5 | 337 | 187 |
| Inv. ex. | 236 | 1.9 | 0.3 | Both surfaces | 12 | 2.5 | 337 | 187 |
| Inv. ex. | 237 | 2.8 | 0.45 | Both surfaces | 12 | 3.7 | 456 | 133 |
| Inv. ex. | 238 | 2.8 | 0.45 | Both surfaces | 12 | 3.7 | 456 | 198 |
| Inv. ex. | 239 | 1.9 | 0.45 | Both surfaces | 16 | 2.8 | 333 | 198 |
| Inv. ex. | 240 | 1.9 | 0.45 | Both surfaces | 16 | 2.8 | 333 | 198 |
| Inv. ex. | 241 | 1.9 | 0.45 | Both surfaces | 16 | 2.8 | 333 | 198 |
| Comp. ex. | 242 | 1.7 | 0.3 | Both surfaces | 13 | 2.3 | 252 | 136 |
| Inv. ex. | 243 | 2.9 | 0.45 | Both surfaces | 12 | 3.8 | 319 | 170 |
| Comp. ex. | 244 | 1.6 | 0.5 | Both surfaces | 19 | 2.6 | 199 | 183 |
| Comp. ex. | 245 | 1.6 | 0.45 | Both surfaces | 18 | 2.5 | 319 | 170 |
| Comp. ex. | 246 | 1.6 | 1.3 | One surface | 31 | 4.2 | 295 | 169 |
| Comp. ex. | 247 | | | Cannot be evaluated | | | | |
| Comp. ex. | 248 | | | | | | | |
| Comp. ex. | 249 | | | | | | | |
| Comp. ex. | 250 | | | | | | | |
| Comp. ex. | 251 | 1.6 | 0.2 | Both surfaces | 10 | 2.0 | 187 | 175 |
| Inv. ex. | 252 | 1.6 | 0.2 | Both surfaces | 10 | 2.0 | 315 | 153 |
| Inv. ex. | 253 | 1.6 | 0.2 | Both surfaces | 10 | 2.0 | 315 | 153 |
| Inv. ex. | 254 | 1.6 | 0.2 | Both surfaces | 10 | 2.0 | 315 | 153 |
| Inv. ex. | 255 | 1.6 | 0.2 | Both surfaces | 10 | 2.0 | 315 | 153 |
| Comp. ex. | 256 | 1.6 | 0.2 | Both surfaces | 10 | 2.0 | 189 | 172 |
| Comp. ex. | 257 | 1.6 | 0.2 | Both surfaces | 10 | 2.0 | 315 | 172 |
| Comp. ex. | 258 | 1.6 | 0.2 | Both surfaces | 10 | 2.0 | 315 | 172 |
| Comp. ex. | 259 | 1.6 | 0.2 | Both surfaces | 10 | 2.0 | 315 | 172 |
| Comp. ex. | 260 | 1.6 | 0.2 | Both surfaces | 10 | 2.0 | 315 | 172 |
| Comp. ex. | 261 | 1.6 | 0.2 | Both surfaces | 10 | 2.0 | 315 | 172 |

| Class | No. | B/A | Soft surface layer nano-hardness standard deviation | $S_\gamma$ (%) | Tensile strength (MPa) | Elongation (%) | Limit bending radius R (mm) | Notch tensile test $\sigma$ high speed/ $\sigma$ low speed |
|---|---|---|---|---|---|---|---|---|
| Inv. ex. | 201 | 0.53 | 0.3 | 10 | 868 | 15 | 1.5 | 1.2 |
| Inv. ex. | 202 | 0.56 | 0.7 | 10 | 929 | 16 | 1.5 | 1.5 |
| Inv. ex. | 203 | 0.59 | 0.6 | 12 | 991 | 19 | 1.5 | 1.3 |
| Inv. ex. | 204 | 0.57 | 0.4 | 15 | 1064 | 25 | 1.5 | 1.5 |
| Inv. ex. | 205 | 0.44 | 0.1 | 13 | 1203 | 23 | 1 | 1.2 |
| Inv. ex. | 206 | 0.39 | 0.2 | 13 | 1333 | 25 | 1.5 | 1.5 |
| Inv. ex. | 207 | 0.37 | 0.3 | 14 | 1542 | 17 | 1 | 1.3 |
| Inv. ex. | 208 | 0.28 | 0.3 | 13 | 1632 | 17 | 1 | 1.3 |
| Inv. ex. | 209 | 0.46 | 0.1 | 14 | 1102 | 30 | 1 | 1.2 |
| Inv. ex. | 210 | 0.54 | 0.4 | 17 | 1033 | 31 | 1.5 | 1.2 |
| Inv. ex. | 211 | 0.44 | 0.7 | 13 | 972 | 19 | 1.5 | 1.4 |
| Inv. ex. | 212 | 0.45 | 0.3 | 15 | 1153 | 20 | 1 | 1.3 |
| Inv. ex. | 213 | 0.40 | 0.6 | 16 | 1018 | 21 | 1.5 | 1.3 |
| Inv. ex. | 214 | 0.57 | 0.1 | 13 | 1001 | 19 | 1 | 1.4 |
| Inv. ex. | 215 | 0.58 | 0.4 | 13 | 997 | 24 | 1.5 | 1.2 |
| Inv. ex. | 216 | 0.45 | 0.4 | 14 | 963 | 25 | 1 | 1.2 |
| Inv. ex. | 217 | 0.50 | 0.2 | 14 | 975 | 25 | 1.5 | 1.2 |
| Inv. ex. | 218 | 0.47 | 0.3 | 18 | 975 | 36 | 1 | 1.3 |
| Inv. ex. | 219 | 0.32 | 0.2 | 13 | 1333 | 24 | 1 | 1.4 |
| Inv. ex. | 220 | 0.50 | 0.3 | 18 | 1216 | 36 | 1 | 1.4 |
| Inv. ex. | 221 | 0.41 | 0.3 | 15 | 1016 | 29 | 1 | 1.3 |
| Inv. ex. | 222 | 0.44 | 0.6 | 13 | 1102 | 25 | 1.5 | 1.2 |
| Inv. ex. | 223 | 0.34 | 0.5 | 13 | 1212 | 22 | 1 | 1.2 |
| Inv. ex. | 224 | 0.29 | 0.1 | 13 | 1362 | 20 | 1 | 1.2 |
| Inv. ex. | 225 | 0.39 | 0.3 | 13 | 1317 | 23 | 1 | 1.5 |
| Inv. ex. | 226 | 0.39 | 0.7 | 13 | 1317 | 23 | 1.5 | 1.4 |
| Inv. ex. | 227 | 0.39 | 0.4 | 18 | 1317 | 35 | 1 | 1.3 |
| Inv. ex. | 228 | 0.39 | 0.2 | 14 | 1317 | 18 | 1 | 1.4 |
| Inv. ex. | 229 | 0.39 | 0.4 | 15 | 1317 | 21 | 1 | 1.2 |
| Inv. ex. | 230 | 0.39 | 0.1 | 13 | 1317 | 19 | 1 | 1.2 |
| Inv. ex. | 231 | 0.39 | 0.3 | 15 | 1317 | 26 | 1 | 1.2 |
| Inv. ex. | 232 | 0.39 | 0.7 | 17 | 1317 | 30 | 1.5 | 1.2 |
| Inv. ex. | 233 | 0.39 | 0.6 | 14 | 1317 | 24 | 1.5 | 1.4 |
| Inv. ex. | 234 | 0.55 | 0.1 | 17 | 1013 | 36 | 1 | 1.2 |
| Inv. ex. | 235 | 0.55 | 0.5 | 13 | 1013 | 25 | 1.5 | 1.5 |
| Inv. ex. | 236 | 0.55 | 0.3 | 13 | 1013 | 28 | 1.5 | 1.2 |
| Inv. ex. | 237 | 0.29 | 0.5 | 16 | 1315 | 23 | 1 | 1.4 |
| Inv. ex. | 238 | 0.43 | 0.7 | 13 | 1344 | 17 | 1.5 | 1.4 |

TABLE 6-continued

| | | | | | | | | |
|---|---|---|---|---|---|---|---|---|
| Inv. ex. | 239 | 0.60 | 0.4 | 13 | 982 | 21 | 1 | 1.4 |
| Inv. ex. | 240 | 0.60 | 0.2 | 13 | 982 | 24 | 1 | 1.4 |
| Inv. ex. | 241 | 0.60 | 0.2 | 13 | 982 | 20 | 1 | 1.2 |
| Comp. ex. | 242 | 0.54 | 0.6 | <u>7</u> | <u>750</u> | 17 | <u>2.5</u> | 1.1 |
| Inv. ex. | 243 | 0.53 | 0.3 | <u>8</u> | 957 | <u>9</u> | 1.5 | 1.2 |
| Comp. ex. | 244 | <u>0.92</u> | 0.5 | 13 | <u>693</u> | 20 | <u>2.5</u> | <u>1.0</u> |
| Comp. ex. | 245 | 0.53 | <u>0.9</u> | 13 | 916 | 20 | <u>3</u> | 1.5 |
| Comp. ex. | 246 | 0.57 | 0.5 | 13 | <u>420</u> | 22 | 1.5 | 1.1 |
| Comp. ex. | 247 | | | Cannot be evaluated | | | | |
| Comp. ex. | 248 | | | | | | | |
| Comp. ex. | 249 | | | | | | | |
| Comp. ex. | 250 | | | | | | | |
| Comp. ex. | 251 | <u>0.94</u> | 0.7 | <u>0</u> | <u>430</u> | <u>13</u> | 1 | <u>1.0</u> |
| Inv. ex. | 252 | 0.49 | 0.2 | <u>4</u> | 830 | <u>14</u> | 1 | 1.2 |
| Inv. ex. | 253 | 0.49 | 0.2 | <u>0</u> | 1020 | <u>11</u> | 1 | 1.5 |
| Inv. ex. | 254 | 0.49 | 0.2 | <u>3</u> | 949 | <u>14</u> | 1 | 1.3 |
| Inv. ex. | 255 | 0.49 | 0.5 | <u>4</u> | 1040 | <u>13</u> | 1.5 | 1.2 |
| Comp. ex. | 256 | <u>0.91</u> | 0.6 | 18 | <u>450</u> | 37 | <u>3</u> | <u>1.0</u> |
| Comp. ex. | 257 | 0.55 | <u>0.9</u> | 13 | 1030 | 15 | <u>3</u> | 1.2 |
| Comp. ex. | 258 | 0.55 | <u>0.9</u> | 13 | 1040 | 15 | <u>3</u> | 1.1 |
| Comp. ex. | 259 | 0.55 | <u>0.9</u> | 12 | 1020 | 15 | <u>3</u> | 1.2 |
| Comp. ex. | 260 | 0.55 | <u>0.9</u> | 11 | 1000 | 15 | <u>3</u> | 1.1 |
| Comp. ex. | 261 | 0.55 | <u>0.9</u> | 13 | 1010 | 15 | <u>3</u> | 1.1 |

Sheets having a tensile strength of 800 MPa or more and a limit curvature radius R of less than 2 mm were evaluated as high strength steel sheets excellent in bendability (invention examples in Table 6). Further, sheets having an elongation of 15% or more were evaluated as high strength steel sheets excellent in bendability and ductility (Invention Examples 201 to 241 in Table 6). On the other hand, if even one of the performances of a "tensile strength of 800 MPa or more" and a "limit curvature radius R of less than 2 mm" is not satisfied, the sheet was designated a comparative example.

Further, in steel sheets manufactured by hot rolling without rough rolling being performed two times or more under conditions of a rough rolling temperature of 1100° C. or more, a sheet thickness reduction rate per pass of 5% to less than 50%, and a time between passes of 3 seconds or more, the limit curvature radius R was high and a sufficient bendability could not be achieved. Further, in all of the steel sheets according to the invention examples of the present invention, the value of a high speed/α low speed was more than 1.0, therefore it was possible to suppress the notch effect.

Example D: Formation of Hardness Transition Zone and Middle Part in Sheet Thickness Comprising, by Area Percent, 10% or More of Retained Austenite A continuously cast slab of a thickness of 20 mm having each of the chemical compositions shown in Table 7 (matrix steel sheet) was ground at its surfaces to remove surface oxides, then was superposed with surface layer-use steel sheet having the chemical compositions shown in Table 7 at one surface or both surfaces by arc welding. This was hot rolled under conditions of a heating temperature, finishing temperature, and coiling temperature shown in Table 8 to obtain a multilayer hot rolled steel sheet. In the case of a test material having the hot rolled steel sheet as the finished product, the holding time at the 700° C. to 500° C. of hot rolling was intentionally controlled to the value shown in Table 8. If having a cold rolled steel sheet as the finished product, after that, the sheet was pickled, cold rolled by the cold rolling rate shown in Table 8, and further annealed under the conditions shown in Table 8.

When the obtained products were measured for chemical compositions at positions of 2% of the sheet thickness from the surface layer and for chemical compositions at ½ positions of sheet thickness, there were substantially no changes from the chemical compositions of the matrix steel sheets and steel sheets for surface layer use shown in Table 7.

TABLE 7

| | Matrix steel sheet (mass %) | | | | | | | | | | | | | | | |
|---|---|---|---|---|---|---|---|---|---|---|---|---|---|---|---|---|
| Steel type | C | Si | Mn | S | P | Al | N | Cr | Mo | B | Ti | Nb | V | Cu | Ni | REM |
| A' | 0.05 | 0.8 | 2.10 | 0.001 | 0.02 | | | | | | | | | | | |
| B' | 0.10 | 1.4 | 2.00 | 0.002 | 0.03 | | | | | | | | | | | |
| C' | 0.15 | 1.8 | 2.1 | 0.04 | 0.01 | | | | | | | | | | | |
| D' | 0.20 | 1.5 | 2 | 0.03 | 0.03 | | | | | | | | | | | |
| E' | 0.35 | 1.9 | 2.60 | 0.001 | 0.05 | | | | | | | | | | | |
| F' | 0.45 | 1.9 | 2.80 | 0.002 | 0.01 | | | | | | | | | | | |
| G' | 0.62 | 2.2 | 3.10 | 0.002 | 0.03 | | | | | | | | | | | |
| H' | 0.78 | 2.3 | 2.00 | 0.002 | 0.02 | | | | | | | | | | 0.10 | |
| I' | 0.15 | 0.4 | 3.10 | 0.001 | 0.02 | | | | | | | | 0.05 | | | |
| J' | 0.17 | 1.2 | 3.10 | 0.001 | 0.04 | | | | | | | | | | | |
| K' | 0.14 | 1.5 | 1.00 | 0.001 | 0.02 | | | | | | | | | | | |

TABLE 7-continued

| | | | | | | | | | | | | | |
|---|---|---|---|---|---|---|---|---|---|---|---|---|---|
| L' | 0.24 | 2.2 | 2.00 | 0.001 | 0.02 | | | | | | | | |
| M' | 0.18 | 2.5 | 2.00 | 0.001 | 0.01 | | | | | | | | |
| N' | 0.18 | 1.5 | 0.5 | 0.002 | 0.06 | | | | | | | | |
| O' | 0.15 | 1.6 | 1.2 | 0.01 | 0.04 | | | | | | | | |
| P' | 0.14 | 1.4 | 1.8 | 0.01 | 0.03 | | | | | | | | |
| Q' | 0.16 | 1.8 | 2.5 | 0.02 | 0.01 | | | | | | | | |
| R' | 0.17 | 1.7 | 3.8 | 0.03 | 0.01 | | | | | | | | |
| U' | 0.61 | 2.4 | 3.7 | 0.05 | 0.03 | 0.5 | | | | | | | 0.01 |
| V' | 0.41 | 2.3 | 4 | 0.04 | 0.01 | 1 | | | | | | | |
| W' | 0.21 | 2.1 | 3.4 | 0.01 | 0.01 | | 0.5 | | | | | | |
| X' | 0.3 | 2.1 | 3 | 0.03 | 0.01 | | 1 | | | | | | |
| Y' | 0.41 | 1.7 | 3.4 | 0.01 | 0.01 | | | 0.002 | | | | 0.3 | |
| Z' | 0.58 | 2 | 3.9 | 0.02 | 0.01 | | | | 0.03 | | 0.1 | | |
| AA' | 0.6 | 2.4 | 2 | 0.01 | 0.02 | 0.3 | | | | 0.03 | 0.2 | 0.1 | |
| AB' | 0.19 | 2.5 | 2.8 | 0.01 | 0.01 | | | 0.05 | | 0.02 | 0.02 | | |
| AC' | 0.54 | 1.6 | 3.2 | 0.02 | 0.01 | | | | | | 0.06 | | |
| AD' | 0.18 | 1.6 | 3.9 | 0.02 | 0.01 | 0.2 | 0.1 | 0.01 | 0.02 | 0.02 | | | 0.03 |
| AE' | <u>0.02</u> | 1.2 | 2 | 0.001 | 0.02 | | | | | | | | |
| AF' | 0.15 | <u>0.2</u> | 2 | 0.001 | 0.02 | | | | | | | | |
| AG' | 0.15 | 1.2 | <u>0.005</u> | 0.001 | 0.02 | | | | | | | | |
| AH' | 0.15 | 1.2 | 2 | 0.001 | <u>0.15</u> | | | | | | | | |
| AI' | 0.1 | 1.2 | 2 | 0.001 | 0.02 | | | | | | | | |
| AJ' | 0.15 | 1.8 | 2.1 | 0.04 | 0.01 | | 0.5 | 0.002 | | | | | |
| AK' | 0.15 | 1.3 | 2.5 | 0.001 | 0.02 | | | | | 0.02 | | | |
| AL' | 0.15 | 1.5 | 3 | 0.001 | 0.02 | | | | | | 0.02 | | |

| | Surface layer-use steel sheet (mass %) | | | | | | | | | | | | | | |
|---|---|---|---|---|---|---|---|---|---|---|---|---|---|---|---|
| Steel type | C | Si | Mn | S | P | Al | N | Cr | Mo | B | Ti | Nb | V | Cu | Ni | REM |
| A' | 0.04 | 1.32 | 0.7 | 0.001 | 0.001 | | | | | | | | | | | |
| B' | 0.07 | 0.40 | 1.4 | 0.001 | 0.001 | 0.100 | | | | | | | | | | |
| C' | 0.12 | 1.28 | 0.6 | 0.002 | 0.001 | | | 0.050 | | | | | | | | |
| D' | 0.13 | 0.53 | 1.4 | 0.001 | 0.001 | | | | 0.003 | | | | | | | |
| E' | 0.09 | 1.83 | 0.8 | 0.001 | 0.005 | | | | | | 0.02 | | | | | |
| F' | 0.07 | 1.36 | 0.9 | 0.002 | 0.010 | | | | | | | 0.02 | | | | |
| G' | 0.09 | 1.43 | 2.2 | 0.002 | 0.010 | | | | | | | | 0.02 | | | |
| H' | 0.03 | 1.52 | 1.1 | 0.002 | 0.010 | | | | | | | | | 0.01 | | |
| I' | 0.08 | 0.57 | 1.3 | 0.002 | 0.010 | | | | | | | | | | 0.01 | |
| J' | 0.11 | 1.60 | 1.5 | 0.001 | 0.005 | 0.2 | 0.1 | | | | 0.02 | | | | | |
| K' | 0.03 | 1.48 | 0.3 | 0.001 | 0.005 | | | | | | 0.01 | 0.02 | | | | |
| L' | 0.07 | 0.69 | 0.8 | 0.001 | 0.005 | | | | | | | | | | | |
| M' | 0.01 | 0.52 | 1.5 | 0.001 | 0.005 | | | | | | | | 0.03 | | | |
| N' | 0.11 | 0.41 | 0.1 | 0.001 | 0.005 | | | | | | | | | | | |
| O' | 0.13 | 1.28 | 0.4 | 0.002 | 0.001 | | | | | | 0.04 | | | | | |
| P' | 0.02 | 1.92 | 0.4 | 0.001 | 0.001 | | | | | | | | | | | |
| Q' | 0.05 | 1.41 | 1.3 | 0.001 | 0.005 | | | | | | 0.03 | | | | | |
| R' | 0.04 | 0.87 | 2.0 | 0.002 | 0.010 | | | | 0.002 | | | | | | | |
| U' | 0.04 | 1.25 | 2.3 | 0.002 | 0.005 | | | | | | | | | | | |
| V' | 0.15 | 0.99 | 1.2 | 0.001 | 0.005 | | | | | | | 0.01 | 0.02 | | | |
| W' | 0.02 | 0.83 | 0.3 | 0.001 | 0.005 | | | | | 0.002 | 0.01 | | 0.02 | | | |
| X' | 0.07 | 1.19 | 1.4 | 0.001 | 0.001 | | | | | | | | | | | |
| Y' | 0.02 | 0.77 | 1.6 | 0.002 | 0.001 | 1 | | | | | | | | | | |
| Z' | 0.01 | 1.76 | 0.5 | 0.001 | 0.001 | | | 1 | | | | | | | | |
| AA' | 0.10 | 1.69 | 1.4 | 0.002 | 0.005 | | | | | | | | | 0.1 | | |
| AB' | 0.10 | 0.66 | 1.2 | 0.001 | 0.010 | | | | | | | | | | | |
| AC' | 0.00 | 0.47 | 0.8 | 0.001 | 0.010 | | | | | | | | | | | |
| AD' | 0.13 | 1.76 | 0.4 | 0.002 | 0.02 | | | | | | | | | | | |
| AE' | 0.01 | 0.50 | 1.4 | 0.001 | 0.001 | | | | | | | | | | | |
| AF' | 0.07 | 0.50 | 1.4 | 0.001 | 0.001 | | | | | | | | | | | |
| AG' | 0.07 | 0.50 | 0.01 | 0.001 | 0.001 | | | | | | | | | | | |
| AH' | 0.07 | 0.50 | 1.4 | 0.001 | 0.001 | | | | | | | | | | | |
| AI' | 0.07 | 0.50 | 1.3 | 0.001 | 0.001 | | | | | | | | | | | |
| AJ' | 0.04 | 1.32 | 0.7 | 0.001 | 0.001 | | | | | | | | | | | |
| AK' | 0.04 | 1.32 | 0.7 | 0.001 | 0.001 | | | | | | | | | | | |
| AL' | 0.04 | 1.32 | 0.7 | 0.001 | 0.001 | | | | | | | | | | | |

TABLE 8

| | | | Hot rolling conditions | | | | | |
|---|---|---|---|---|---|---|---|---|
| Class | No. | Steel | Heating temp. (° C.) | Heating time (min) | Rough rolling temp. (° C.) | Sheet thickness reduction rate per pass (%) | Time between passes (s) | Rolling operations |
| Inv. ex. | 301 | A' | 1166 | 187 | 1160 | 32 | 5 | 2 |
| Inv. ex. | 302 | B' | 1110 | 166 | 1100 | 34 | 7 | 3 |

TABLE 8-continued

| Class | No. | | | | | | | |
|---|---|---|---|---|---|---|---|---|
| Inv. ex. | 303 | C' | 1115 | 201 | 1110 | 25 | 7 | 2 |
| Inv. ex. | 304 | D' | 1170 | 156 | 1150 | 24 | 10 | 3 |
| Inv. ex. | 305 | E' | 1172 | 132 | 1130 | 10 | 7 | 4 |
| Inv. ex. | 306 | F' | 1220 | 120 | 1190 | 31 | 4 | 3 |
| Inv. ex. | 307 | G' | 1200 | 191 | 1180 | 43 | 6 | 3 |
| Inv. ex. | 308 | H' | 1160 | 200 | 1160 | 10 | 7 | 3 |
| Inv. ex. | 309 | I' | 1238 | 215 | 1160 | 16 | 4 | 4 |
| Inv. ex. | 310 | J' | 1245 | 193 | 1190 | 16 | 5 | 4 |
| Inv. ex. | 311 | K' | 1152 | 202 | 1152 | 42 | 9 | 4 |
| Inv. ex. | 312 | L' | 1253 | 155 | 1190 | 20 | 5 | 4 |
| Inv. ex. | 313 | M' | 1116 | 124 | 1116 | 17 | 10 | 2 |
| Inv. ex. | 314 | N' | 1186 | 181 | 1160 | 29 | 4 | 2 |
| Inv. ex. | 315 | O' | 1112 | 176 | 1110 | 42 | 4 | 3 |
| Inv. ex. | 316 | P' | 1201 | 174 | 1150 | 42 | 10 | 3 |
| Inv. ex. | 317 | Q' | 1233 | 187 | 1140 | 16 | 8 | 3 |
| Inv. ex. | 318 | R' | 1257 | 188 | 1100 | 44 | 7 | 4 |
| Inv. ex. | 319 | U' | 1214 | 177 | 1180 | 13 | 10 | 3 |
| Inv. ex. | 320 | V' | 1116 | 137 | 1110 | 31 | 5 | 5 |
| Inv. ex. | 321 | W' | 1252 | 120 | 1100 | 39 | 8 | 2 |
| Inv. ex. | 322 | X' | 1248 | 185 | 1170 | 23 | 10 | 3 |
| Inv. ex. | 323 | Y' | 1203 | 205 | 1130 | 29 | 5 | 3 |
| Inv. ex. | 324 | Z' | 1121 | 205 | 1120 | 34 | 3 | 4 |
| Inv. ex. | 325 | AA' | 1126 | 207 | 1110 | 34 | 6 | 3 |
| Inv. ex. | 326 | AA' | 1212 | 129 | 1200 | 18 | 10 | 3 |
| Inv. ex. | 327 | AA' | 1249 | 122 | 1150 | 34 | 4 | 5 |
| Inv. ex. | 328 | AA' | 1151 | 130 | 1100 | 15 | 7 | 3 |
| Inv. ex. | 329 | AA' | 1157 | 137 | 1157 | 41 | 7 | 3 |
| Inv. ex. | 330 | AA' | 1109 | 172 | 1100 | 13 | 6 | 2 |
| Inv. ex. | 331 | AA' | 1107 | 131 | 1100 | 12 | 6 | 2 |
| Inv. ex. | 332 | AA' | 1131 | 179 | 1100 | 28 | 5 | 2 |
| Inv. ex. | 333 | AA' | 1121 | 149 | 1120 | 13 | 7 | 3 |
| Inv. ex. | 334 | AB' | 1123 | 215 | 1120 | 41 | 9 | 4 |
| Inv. ex. | 335 | AB' | 1219 | 176 | 1190 | 16 | 4 | 5 |
| Inv. ex. | 336 | AB' | 1193 | 127 | 1190 | 18 | 10 | 5 |
| Inv. ex. | 337 | AC' | 1166 | 165 | 1165 | 30 | 9 | 5 |
| Inv. ex. | 338 | AC' | 1231 | 120 | 1110 | 36 | 5 | 5 |
| Inv. ex. | 339 | AD' | 1190 | 194 | 1180 | 12 | 10 | 4 |
| Inv. ex. | 340 | AD' | 1219 | 207 | 1180 | 14 | 5 | 3 |
| Inv. ex. | 341 | AD' | 1193 | 147 | 1100 | 40 | 9 | 5 |
| Comp. ex. | 342 | AE' | 1241 | 231 | 1160 | 16 | 9 | 2 |
| Inv. ex. | 343 | AF' | 1226 | 192 | 1100 | 32 | 8 | 5 |
| Comp. ex. | 344 | AG' | 1257 | 201 | 1190 | 25 | 6 | 3 |
| Comp. ex. | 345 | AH' | 1244 | 160 | 1140 | 14 | 7 | 2 |
| Comp. ex. | 346 | AI' | 1215 | 172 | 1160 | 43 | 6 | 3 |
| Comp. ex. | 347 | AJ' | <u>1000</u> | 182 | <u>1000</u> | 31 | 4 | 3 |
| Comp. ex. | 348 | AK' | 1200 | 192 | 1100 | 14 | 6 | 2 |
| Comp. ex. | 349 | AL' | 1250 | 140 | 1190 | 22 | 4 | 5 |
| Comp. ex. | 350 | AL' | 1250 | 172 | 1160 | 23 | 7 | 2 |
| Comp. ex. | 351 | AL' | 1250 | 166 | 1110 | 36 | 6 | 2 |
| Inv. ex. | 352 | AL' | 1250 | 198 | 1170 | 28 | 7 | 4 |
| Inv. ex. | 353 | AL' | 1250 | 179 | 1110 | 29 | 8 | 4 |
| Inv. ex. | 354 | AL' | 1250 | 205 | 1180 | 31 | 7 | 5 |
| Inv. ex. | 355 | AL' | 1250 | 188 | 1190 | 23 | 4 | 4 |
| Inv. ex. | 356 | AL' | 1250 | 190 | 1180 | 28 | 3 | 3 |
| Comp. ex. | 357 | AL' | 1250 | 200 | 1160 | 31 | 8 | 2 |
| Comp. ex. | 358 | AL' | 1250 | 200 | <u>1000</u> | 35 | 10 | 3 |
| Comp. ex. | 359 | AL' | 1250 | 200 | 1200 | <u>4</u> | 5 | 8 |
| Comp. ex. | 360 | AL' | 1250 | 200 | 1200 | <u>65</u> | 5 | <u>1</u> |
| Comp. ex. | 361 | AL' | 1250 | 200 | 1200 | 35 | <u>2</u> | 4 |
| Comp. ex. | 362 | AL' | 1250 | 200 | 1200 | 30 | 4 | <u>1</u> |

| | | Hot rolling conditions | | | Cold rolling |
|---|---|---|---|---|---|
| Class | No. | Finishing temp. (° C.) | 700° C. to 500° C. holding time (s) | Coiling temp. (° C.) | Cold rolling rate (%) |
| Inv. ex. | 301 | 827 | 3 | 480 | — |
| Inv. ex. | 302 | 840 | 10 | 539 | — |
| Inv. ex. | 303 | 854 | 16 | 481 | — |
| Inv. ex. | 304 | 850 | 28 | 447 | — |
| Inv. ex. | 305 | 852 | 42 | 320 | — |
| Inv. ex. | 306 | 845 | — | 640 | 23 |
| Inv. ex. | 307 | 878 | — | 660 | 45 |
| Inv. ex. | 308 | 844 | — | 510 | 66 |
| Inv. ex. | 309 | 828 | — | 420 | 62 |
| Inv. ex. | 310 | 854 | — | 680 | 65 |
| Inv. ex. | 311 | 860 | — | 270 | 72 |
| Inv. ex. | 312 | 843 | — | 480 | 34 |
| Inv. ex. | 313 | 886 | — | 680 | 23 |
| Inv. ex. | 314 | 835 | — | 490 | 29 |

TABLE 8-continued

| Class | No. | | | | | |
|---|---|---|---|---|---|---|
| Inv. ex. | 315 | 893 | — | 490 | 35 | |
| Inv. ex. | 316 | 872 | — | 580 | 62 | |
| Inv. ex. | 317 | 862 | — | 620 | 76 | |
| Inv. ex. | 318 | 887 | — | 360 | 47 | |
| Inv. ex. | 319 | 887 | — | 500 | 62 | |
| Inv. ex. | 320 | 896 | — | 640 | 60 | |
| Inv. ex. | 321 | 862 | — | 390 | 23 | |
| Inv. ex. | 322 | 822 | — | 470 | 31 | |
| Inv. ex. | 323 | 882 | — | 530 | 48 | |
| Inv. ex. | 324 | 855 | — | 540 | 79 | |
| Inv. ex. | 325 | 869 | — | 450 | 50 | |
| Inv. ex. | 326 | 892 | — | 320 | 65 | |
| Inv. ex. | 327 | 841 | — | 590 | 72 | |
| Inv. ex. | 328 | 850 | — | 450 | 64 | |
| Inv. ex. | 329 | 871 | — | 320 | 30 | |
| Inv. ex. | 330 | 845 | — | 380 | 60 | |
| Inv. ex. | 331 | 860 | — | 390 | 50 | |
| Inv. ex. | 332 | 889 | — | 540 | 71 | |
| Inv. ex. | 333 | 829 | — | 390 | 35 | |
| Inv. ex. | 334 | 860 | — | 390 | 27 | |
| Inv. ex. | 335 | 827 | — | 550 | 60 | |
| Inv. ex. | 336 | 892 | — | 360 | 67 | |
| Inv. ex. | 337 | 892 | — | 390 | 67 | |
| Inv. ex. | 338 | 845 | — | 520 | 43 | |
| Inv. ex. | 339 | 845 | — | 580 | 79 | |
| Inv. ex. | 340 | 827 | — | 550 | 60 | |
| Inv. ex. | 341 | 892 | — | 360 | 67 | |
| Comp. ex. | 342 | 882 | — | 541 | 59 | |
| Inv. ex. | 343 | 889 | — | 567 | 49 | |
| Comp. ex. | 344 | 893 | — | 589 | 47 | |
| Comp. ex. | 345 | 879 | — | 541 | 62 | |
| Comp. ex. | 346 | 862 | — | 528 | 59 | |
| Comp. ex. | 347 | Sheet fractured during hot rolling, so subsequent tests not possible | | | | |
| Comp. ex. | 348 | 760 | Due to shape defects of hot rolled sheet, subsequent tests not possible | | | |
| Comp. ex. | 349 | 850 | — | 560 | 5 | |
| Comp. ex. | 350 | 850 | — | 560 | 95 | |
| Comp. ex. | 351 | 850 | — | 560 | 45 | |
| Inv. ex. | 352 | 850 | — | 560 | 50 | |
| Inv. ex. | 353 | 850 | — | 560 | 45 | |
| Inv. ex. | 354 | 850 | — | 560 | 45 | |
| Inv. ex. | 355 | 850 | — | 560 | 45 | |
| Inv. ex. | 356 | 850 | — | 560 | 45 | |
| Comp. ex. | 357 | 850 | — | 560 | 45 | |
| Comp. ex. | 358 | 851 | — | 560 | 45 | |
| Comp. ex. | 359 | 852 | — | 560 | 45 | |
| Comp. ex. | 360 | 853 | — | 560 | 45 | |
| Comp. ex. | 361 | 854 | — | 560 | 45 | |
| Comp. ex. | 362 | 855 | — | 560 | 45 | |

| | | Annealing conditions | | | | | |
|---|---|---|---|---|---|---|---|
| Class | No. | Heating temp. (° C.) | Holding time (s) | Preliminary cooling stop temp. (° C.) | Stopping time during preliminary cooling (s) | Cooling rate (° C./s) | Cooling stop temp. (° C.) | 300° C. to 500° C. stopping time (s) |
| Inv. ex. | 301 | — | — | — | — | — | — | — |
| Inv. ex. | 302 | — | — | — | — | — | — | — |
| Inv. ex. | 303 | — | — | — | — | — | — | — |
| Inv. ex. | 304 | — | — | — | — | — | — | — |
| Inv. ex. | 305 | — | — | — | — | — | — | — |
| Inv. ex. | 306 | 810 | 43 | None | None | 18 | 223 | 148 |
| Inv. ex. | 307 | 823 | 94 | None | None | 18 | 207 | 233 |
| Inv. ex. | 308 | 832 | 62 | None | None | 42 | 207 | 220 |
| Inv. ex. | 309 | 730 | 28 | None | None | 25 | 386 | 250 |
| Inv. ex. | 310 | 780 | 133 | None | None | 38 | 354 | 305 |
| Inv. ex. | 311 | 830 | 32 | None | None | 36 | 483 | 133 |
| Inv. ex. | 312 | 840 | 171 | None | None | 40 | 419 | 275 |
| Inv. ex. | 313 | 890 | 70 | None | None | 45 | 464 | 289 |
| Inv. ex. | 314 | 830 | 5 | None | None | 29 | 402 | 195 |
| Inv. ex. | 315 | 821 | 30 | None | None | 35 | 280 | 223 |
| Inv. ex. | 316 | 838 | 100 | None | None | 34 | 513 | 235 |
| Inv. ex. | 317 | 859 | 230 | None | None | 25 | 379 | 250 |
| Inv. ex. | 318 | 856 | 128 | 730 | 5 | 22 | 254 | 333 |
| Inv. ex. | 319 | 845 | 40 | 650 | 6 | 14 | 163 | 203 |
| Inv. ex. | 320 | 839 | 170 | 650 | 15 | 26 | 105 | 335 |
| Inv. ex. | 321 | 828 | 147 | None | None | 10 | 309 | 284 |
| Inv. ex. | 322 | 826 | 165 | None | None | 20 | 265 | 141 |
| Inv. ex. | 323 | 856 | 91 | None | None | 50 | 200 | 230 |
| Inv. ex. | 324 | 838 | 84 | None | None | 80 | 191 | 201 |

TABLE 8-continued

| Class | No. | | | | | | | |
|---|---|---|---|---|---|---|---|---|
| Inv. ex. | 325 | 838 | 89 | None | None | 100 | 200 | 212 |
| Inv. ex. | 326 | 856 | 133 | None | None | 25 | 144 | 188 |
| Inv. ex. | 327 | 827 | 43 | None | None | 44 | 184 | 323 |
| Inv. ex. | 328 | 850 | 85 | None | None | 41 | 202 | 238 |
| Inv. ex. | 329 | 837 | 12 | None | None | 18 | 224 | 263 |
| Inv. ex. | 330 | 845 | 44 | None | None | 11 | 254 | 123 |
| Inv. ex. | 331 | 830 | 58 | None | None | 42 | 284 | 265 |
| Inv. ex. | 332 | 833 | 146 | None | None | 28 | 250 | 337 |
| Inv. ex. | 333 | 832 | 106 | None | None | 37 | 80 | 253 |
| Inv. ex. | 334 | 821 | 96 | None | None | 39 | 230 | 313 |
| Inv. ex. | 335 | 855 | 98 | None | None | 14 | 150 | 137 |
| Inv. ex. | 336 | 827 | 96 | None | None | 35 | 293 | 186 |
| Inv. ex. | 337 | 851 | 70 | None | None | 10 | 233 | 304 |
| Inv. ex. | 338 | 835 | 101 | None | None | 35 | 233 | 190 |
| Inv. ex. | 339 | 854 | 171 | None | None | 22 | 270 | 125 |
| Inv. ex. | 340 | 828 | 51 | None | None | 10 | 250 | 146 |
| Inv. ex. | 341 | 859 | 68 | None | None | 38 | 324 | 173 |
| Comp. ex. | 342 | 835 | 80 | None | None | 19 | 447 | 340 |
| Inv. ex. | 343 | 859 | 60 | None | None | 30 | 387 | 282 |
| Comp. ex. | 344 | 859 | 68 | None | None | 24 | 377 | 132 |
| Comp. ex. | 345 | 849 | 39 | None | None | 19 | 386 | 172 |
| Comp. ex. | 346 | 849 | 69 | None | None | 26 | 382 | 214 |
| Comp. ex. | 347 | Sheet fractured during hot rolling, so subsequent tests not possible | | | | | | |
| Comp. ex. | 348 | Due to shape defects of hot rolled sheet, subsequent tests not possible | | | | | | |
| Comp. ex. | 349 | Due to shape defects of cold rolled sheet, subsequent tests not possible | | | | | | |
| Comp. ex. | 350 | Cold rolling load excessive, so cold rolling not possible | | | | | | |
| Comp. ex. | 351 | _680_ | 60 | None | None | 30 | 300 | 300 |
| Inv. ex. | 352 | 850 | _2_ | None | None | 30 | 250 | 50 |
| Inv. ex. | 353 | 850 | 60 | None | None | _1_ | 280 | 315 |
| Inv. ex. | 354 | 850 | 60 | None | None | 20 | 100 | 0 |
| Inv. ex. | 355 | 850 | 60 | None | None | 20 | 260 | 3 |
| Inv. ex. | 356 | 850 | 60 | None | None | 20 | 260 | 15 |
| Comp. ex. | 357 | 850 | 60 | None | None | 20 | 260 | 20 |
| Comp. ex. | 358 | 850 | 60 | None | None | 20 | 260 | 300 |
| Comp. ex. | 359 | 850 | 60 | None | None | 20 | 260 | 300 |
| Comp. ex. | 360 | 850 | 60 | None | None | 20 | 260 | 300 |
| Comp. ex. | 361 | 850 | 60 | None | None | 20 | 260 | 300 |
| Comp. ex. | 362 | 850 | 60 | None | None | 20 | 260 | 300 |

| | | Annealing conditions Stopping time at Ms-100° C. | Plating | | Sf | | | |
|---|---|---|---|---|---|---|---|---|
| Class | No. | or more (s) | Plating | Alloying | (%) | Bs | Ms | Ac3 |
| Inv. ex. | 301 | — | — | — | 11 | 585 | 429 | 900 |
| Inv. ex. | 302 | — | — | — | 16 | 554 | 394 | 908 |
| Inv. ex. | 303 | — | — | — | 23 | 508 | 348 | 912 |
| Inv. ex. | 304 | — | — | — | 28 | 504 | 317 | 886 |
| Inv. ex. | 305 | — | — | — | 36 | 357 | 162 | 875 |
| Inv. ex. | 306 | 158 | None | None | 32 | 306 | 101 | 859 |
| Inv. ex. | 307 | 248 | None | None | 0 | 280 | 106 | 848 |
| Inv. ex. | 308 | 240 | None | None | 0 | 324 | 65 | 832 |
| Inv. ex. | 309 | 262 | None | None | 64 | 405 | 229 | 849 |
| Inv. ex. | 310 | 315 | Yes | Yes | 44 | 408 | 270 | 880 |
| Inv. ex. | 311 | 163 | None | None | 17 | 626 | 404 | 901 |
| Inv. ex. | 312 | 295 | None | None | 0 | 489 | 324 | 909 |
| Inv. ex. | 313 | 305 | None | None | 0 | 495 | 348 | 936 |
| Inv. ex. | 314 | 205 | None | None | 16 | 657 | 399 | 891 |
| Inv. ex. | 315 | 234 | None | None | 38 | 583 | 360 | 903 |
| Inv. ex. | 316 | 260 | None | None | 43 | 534 | 340 | 897 |
| Inv. ex. | 317 | 257 | None | None | 35 | 457 | 310 | 909 |
| Inv. ex. | 318 | 339 | None | None | 51 | 314 | 218 | 902 |
| Inv. ex. | 319 | 215 | None | None | 0 | 189 | 78 | 859 |
| Inv. ex. | 320 | 355 | None | None | 32 | 135 | 64 | 883 |
| Inv. ex. | 321 | 301 | Yes | None | 45 | 325 | 209 | 927 |
| Inv. ex. | 322 | 169 | None | None | 52 | 292 | 109 | 924 |
| Inv. ex. | 323 | 255 | None | None | 27 | 273 | 125 | 851 |
| Inv. ex. | 324 | 229 | None | None | 12 | 204 | 62 | 845 |
| Inv. ex. | 325 | 239 | None | None | 30 | 281 | 23 | 859 |
| Inv. ex. | 326 | 204 | None | None | 21 | 309 | 69 | 859 |
| Inv. ex. | 327 | 349 | None | None | 18 | 317 | 82 | 859 |
| Inv. ex. | 328 | 256 | None | None | 1 | 353 | 141 | 859 |
| Inv. ex. | 329 | 263 | None | None | 7 | 341 | 122 | 859 |
| Inv. ex. | 330 | 123 | None | None | 16 | 322 | 90 | 859 |
| Inv. ex. | 331 | 265 | None | None | 16 | 322 | 90 | 859 |
| Inv. ex. | 332 | 337 | None | None | 30 | 279 | 20 | 859 |
| Inv. ex. | 333 | 282 | None | None | 32 | 275 | 13 | 859 |
| Inv. ex. | 334 | 318 | None | None | 68 | 305 | 126 | 937 |
| Inv. ex. | 335 | 153 | None | None | 48 | 370 | 233 | 937 |

TABLE 8-continued

| Class | No. | | | | | | | |
|---|---|---|---|---|---|---|---|---|
| Inv. ex. | 336 | 201 | None | None | 64 | 321 | 154 | 937 |
| Inv. ex. | 337 | 304 | None | None | 0 | 316 | 149 | 839 |
| Inv. ex. | 338 | 190 | None | None | 3 | 311 | 140 | 839 |
| Inv. ex. | 339 | 125 | None | None | 27 | 326 | 261 | 899 |
| Inv. ex. | 340 | 176 | Yes | None | 42 | 307 | 230 | 899 |
| Inv. ex. | 341 | 253 | Yes | Yes | 24 | 328 | 265 | 899 |
| Comp. ex. | 342 | 349 | None | None | 50 | 584 | 434 | 935 |
| Inv. ex. | 343 | 297 | None | None | 0 | 589 | 397 | 840 |
| Comp. ex. | 344 | 138 | None | None | 20 | 721 | 434 | 885 |
| Comp. ex. | 345 | 197 | None | None | 24 | 538 | 359 | 885 |
| Comp. ex. | 346 | 246 | None | None | 31 | 554 | 384 | 899 |
| Comp. ex. | 347 | Sheet fractured during hot rolling, so subsequent tests not possible | | | | | | |
| Comp. ex. | 348 | Due to shape defects of hot rolled sheet, subsequent tests not possible | | | | | | |
| Comp. ex. | 349 | Due to shape defects of cold rolled sheet, subsequent tests not possible | | | | | | |
| Comp. ex. | 350 | Cold rolling load excessive, so cold rolling not possible | | | | | | |
| Comp. ex. | 351 | 315 | None | None | 100 | None | None | 898 |
| Inv. ex. | 352 | 213 | None | None | 30 | 432 | 312 | 898 |
| Inv. ex. | 353 | 356 | None | None | 50 | 408 | 271 | 898 |
| Inv. ex. | 354 | 0 | None | None | 30 | 432 | 312 | 898 |
| Inv. ex. | 355 | 3 | None | None | 30 | 432 | 312 | 898 |
| Inv. ex. | 356 | 25 | None | None | 30 | 432 | 312 | 898 |
| Comp. ex. | 357 | 1050 | None | None | 30 | 432 | 312 | 898 |
| Comp. ex. | 358 | 150 | None | None | 30 | 432 | 312 | 898 |
| Comp. ex. | 359 | 150 | None | None | 30 | 432 | 312 | 898 |
| Comp. ex. | 360 | 150 | None | None | 30 | 432 | 312 | 898 |
| Comp. ex. | 361 | 150 | None | None | 30 | 432 | 312 | 898 |
| Comp. ex. | 362 | 150 | None | None | 30 | 432 | 312 | 898 |

| | | Sheet thickness | | | | | | |
|---|---|---|---|---|---|---|---|---|
| Class | No. | Middle part in sheet thickness (mm) | Soft surface layer (one side) (mm) | Position of soft surface layer | Ratio of soft surface layer (one side) to sheet thickness (%) | Total thickness (mm) | A Sheet thickness ½ average Vickers hardness (Hv) | B Soft surface layer average Vickers hardness (Hv) |
| Inv. ex. | 301 | 2.0 | 0.3 | Both surfaces | 12 | 2.6 | 289 | 153 |
| Inv. ex. | 302 | 2.5 | 0.3 | One surface | 11 | 2.8 | 305 | 170 |
| Inv. ex. | 303 | 2.4 | 0.4 | Both surfaces | 13 | 3.2 | 329 | 194 |
| Inv. ex. | 304 | 2.8 | 0.4 | Both surfaces | 11 | 3.6 | 351 | 199 |
| Inv. ex. | 305 | 1.8 | 0.3 | Both surfaces | 13 | 2.4 | 409 | 179 |
| Inv. ex. | 306 | 2.6 | 0.25 | Both surfaces | 8 | 3.1 | 440 | 170 |
| Inv. ex. | 307 | 2.9 | 0.3 | Both surfaces | 9 | 3.5 | 486 | 179 |
| Inv. ex. | 308 | 1.6 | 0.3 | Both surfaces | 14 | 2.2 | 527 | 148 |
| Inv. ex. | 309 | 2.1 | 0.5 | Both surfaces | 16 | 3.1 | 385 | 175 |
| Inv. ex. | 310 | 1.9 | 0.35 | Both surfaces | 13 | 2.6 | 348 | 188 |
| Inv. ex. | 311 | 1.9 | 0.35 | Both surfaces | 13 | 2.6 | 332 | 147 |
| Inv. ex. | 312 | 3.0 | 0.15 | One surface | 5 | 3.2 | 379 | 170 |
| Inv. ex. | 313 | 2.6 | 0.35 | Both surfaces | 11 | 3.3 | 343 | 136 |
| Inv. ex. | 314 | 2.8 | 0.45 | Both surfaces | 12 | 3.7 | 333 | 189 |
| Inv. ex. | 315 | 2.3 | 0.25 | Both surfaces | 9 | 2.8 | 325 | 188 |
| Inv. ex. | 316 | 3.0 | 0.25 | Both surfaces | 7 | 3.5 | 314 | 142 |
| Inv. ex. | 317 | 2.3 | 0.3 | Both surfaces | 10 | 2.9 | 324 | 161 |
| Inv. ex. | 318 | 2.9 | 0.45 | Both surfaces | 12 | 3.8 | 328 | 155 |
| Inv. ex. | 319 | 1.6 | 0.35 | Both surfaces | 15 | 2.3 | 474 | 154 |
| Inv. ex. | 320 | 2.0 | 0.45 | Both surfaces | 16 | 2.9 | 418 | 209 |
| Inv. ex. | 321 | 2.5 | 0.4 | Both surfaces | 12 | 3.3 | 346 | 141 |
| Inv. ex. | 322 | 2.4 | 0.8 | One surface | 25 | 3.2 | 381 | 169 |
| Inv. ex. | 323 | 3.0 | 0.5 | Both surfaces | 13 | 4.0 | 418 | 140 |
| Inv. ex. | 324 | 1.8 | 0.25 | Both surfaces | 11 | 2.3 | 466 | 135 |
| Inv. ex. | 325 | 1.7 | 0.45 | Both surfaces | 17 | 2.6 | 471 | 186 |
| Inv. ex. | 326 | 1.7 | 0.45 | Both surfaces | 17 | 2.6 | 471 | 186 |
| Inv. ex. | 327 | 1.7 | 0.45 | Both surfaces | 17 | 2.6 | 471 | 186 |
| Inv. ex. | 328 | 1.7 | 0.45 | Both surfaces | 17 | 2.6 | 471 | 186 |
| Inv. ex. | 329 | 1.7 | 0.45 | Both surfaces | 17 | 2.6 | 471 | 186 |
| Inv. ex. | 330 | 1.7 | 0.45 | Both surfaces | 17 | 2.6 | 471 | 186 |
| Inv. ex. | 331 | 1.7 | 0.45 | Both surfaces | 17 | 2.6 | 471 | 186 |
| Inv. ex. | 332 | 1.7 | 0.45 | Both surfaces | 17 | 2.6 | 471 | 186 |
| Inv. ex. | 333 | 1.7 | 0.45 | Both surfaces | 17 | 2.6 | 471 | 186 |
| Inv. ex. | 334 | 1.9 | 0.3 | Both surfaces | 12 | 2.5 | 337 | 187 |
| Inv. ex. | 335 | 1.9 | 0.3 | Both surfaces | 12 | 2.5 | 337 | 187 |
| Inv. ex. | 336 | 1.9 | 0.3 | Both surfaces | 12 | 2.5 | 337 | 187 |
| Inv. ex. | 337 | 2.8 | 0.45 | Both surfaces | 12 | 3.7 | 456 | 133 |
| Inv. ex. | 338 | 2.8 | 0.45 | Both surfaces | 12 | 3.7 | 456 | 198 |
| Inv. ex. | 339 | 1.9 | 0.45 | Both surfaces | 16 | 2.8 | 333 | 198 |
| Inv. ex. | 340 | 1.9 | 0.45 | Both surfaces | 16 | 2.8 | 333 | 198 |
| Inv. ex. | 341 | 1.9 | 0.45 | Both surfaces | 16 | 2.8 | 333 | 198 |
| Comp. ex. | 342 | 1.7 | 0.3 | Both surfaces | 13 | 2.3 | 252 | 136 |
| Inv. ex. | 343 | 2.9 | 0.45 | Both surfaces | 12 | 3.8 | 319 | 170 |
| Comp. ex. | 344 | 1.6 | 0.5 | Both surfaces | 19 | 2.6 | 199 | 183 |

TABLE 8-continued

| Class | No. | | | | | | | |
|---|---|---|---|---|---|---|---|---|
| Comp. ex. | 345 | 1.6 | 0.45 | Both surfaces | 18 | 2.5 | 319 | 170 |
| Comp. ex. | 346 | 1.6 | 1.3 | One surface | 31 | 4.2 | 295 | 169 |
| Comp. ex. | 347 | | | Cannot be evaluated | | | | |
| Comp. ex. | 348 | | | | | | | |
| Comp. ex. | 349 | | | | | | | |
| Comp. ex. | 350 | | | | | | | |
| Comp. ex. | 351 | 1.6 | 0.2 | Both surfaces | 10 | 2.0 | 187 | 175 |
| Inv. ex. | 352 | 1.6 | 0.2 | Both surfaces | 10 | 2.0 | 315 | 153 |
| Inv. ex. | 353 | 1.6 | 0.2 | Both surfaces | 10 | 2.0 | 315 | 153 |
| Inv. ex. | 354 | 1.6 | 0.2 | Both surfaces | 10 | 2.0 | 315 | 153 |
| Inv. ex. | 355 | 1.6 | 0.2 | Both surfaces | 10 | 2.0 | 315 | 153 |
| Inv. ex. | 356 | 1.6 | 0.2 | Both surfaces | 10 | 2.0 | 315 | 153 |
| Comp. ex. | 357 | 1.6 | 0.2 | Both surfaces | 10 | 2.0 | 189 | 172 |
| Comp. ex. | 358 | 1.6 | 0.2 | Both surfaces | 10 | 2.0 | 382 | 155 |
| Comp. ex. | 359 | 1.6 | 0.2 | Both surfaces | 10 | 2.0 | 386 | 154 |
| Comp. ex. | 360 | 1.6 | 0.2 | Both surfaces | 10 | 2.0 | 384 | 153 |
| Comp. ex. | 361 | 1.6 | 0.2 | Both surfaces | 10 | 2.0 | 385 | 155 |
| Comp. ex. | 362 | 1.6 | 0.2 | Both surfaces | 10 | 2.0 | 384 | 152 |

| Class | No. | B/A | Soft surface layer nano-hardness standard deviation | Average hardness change of hardness transition zone ($\Delta Hv$/mm) | $S_\gamma$ (%) | Tensile strength (MPa) | Elongation (%) | Limit bending radius R (mm) | Notch tensile test $\sigma$ high speed/ $\sigma$ low speed |
|---|---|---|---|---|---|---|---|---|---|
| Inv. ex. | 301 | 0.53 | 0.3 | 1979 | 10 | 868 | 15 | 1 | 1.3 |
| Inv. ex. | 302 | 0.56 | 0.7 | 2071 | 10 | 929 | 16 | 1 | 1.2 |
| Inv. ex. | 303 | 0.59 | 0.6 | 1963 | 12 | 991 | 19 | 1 | 1.4 |
| Inv. ex. | 304 | 0.57 | 0.4 | 2318 | 15 | 1064 | 25 | 1 | 1.3 |
| Inv. ex. | 305 | 0.44 | 0.1 | 2720 | 13 | 1203 | 23 | 1 | 1.3 |
| Inv. ex. | 306 | 0.39 | 0.2 | 2344 | 13 | 1333 | 25 | 1 | 1.5 |
| Inv. ex. | 307 | 0.37 | 0.3 | 2137 | 14 | 1542 | 17 | 1 | 1.5 |
| Inv. ex. | 308 | 0.28 | 0.3 | 1949 | 13 | 1632 | 17 | 1 | 1.4 |
| Inv. ex. | 309 | 0.46 | 0.1 | 1964 | 14 | 1102 | 30 | 1 | 1.5 |
| Inv. ex. | 310 | 0.54 | 0.4 | 2046 | 17 | 1033 | 31 | 1 | 1.3 |
| Inv. ex. | 311 | 0.44 | 0.7 | 2092 | 13 | 972 | 19 | 1 | 1.2 |
| Inv. ex. | 312 | 0.45 | 0.3 | 2309 | 15 | 1153 | 20 | 1 | 1.5 |
| Inv. ex. | 313 | 0.40 | 0.6 | 2538 | 16 | 1018 | 21 | 1 | 1.3 |
| Inv. ex. | 314 | 0.57 | 0.1 | 1829 | 13 | 1001 | 19 | 1 | 1.2 |
| Inv. ex. | 315 | 0.58 | 0.4 | 2351 | 13 | 997 | 24 | 1 | 1.2 |
| Inv. ex. | 316 | 0.45 | 0.4 | 2187 | 14 | 963 | 25 | 1 | 1.4 |
| Inv. ex. | 317 | 0.50 | 0.2 | 2278 | 14 | 975 | 25 | 1 | 1.5 |
| Inv. ex. | 318 | 0.47 | 0.3 | 1890 | 18 | 975 | 36 | 1 | 1.4 |
| Inv. ex. | 319 | 0.32 | 0.2 | 1917 | 13 | 1333 | 24 | 1 | 1.3 |
| Inv. ex. | 320 | 0.50 | 0.3 | 2731 | 18 | 1216 | 36 | 1 | 1.2 |
| Inv. ex. | 321 | 0.41 | 0.3 | 2779 | 15 | 1016 | 29 | 1 | 1.2 |
| Inv. ex. | 322 | 0.44 | 0.6 | 1876 | 13 | 1102 | 25 | 1 | 1.5 |
| Inv. ex. | 323 | 0.34 | 0.5 | 1776 | 13 | 1212 | 22 | 1 | 1.1 |
| Inv. ex. | 324 | 0.29 | 0.1 | 1760 | 13 | 1362 | 20 | 1 | 1.5 |
| Inv. ex. | 325 | 0.39 | 0.3 | 2019 | 13 | 1317 | 23 | 1 | 1.4 |
| Inv. ex. | 326 | 0.39 | 0.7 | 2521 | 13 | 1317 | 23 | 1 | 1.5 |
| Inv. ex. | 327 | 0.39 | 0.4 | 2668 | 18 | 1317 | 35 | 1 | 1.3 |
| Inv. ex. | 328 | 0.39 | 0.2 | 2432 | 14 | 1317 | 18 | 1 | 1.2 |
| Inv. ex. | 329 | 0.39 | 0.4 | 2674 | 15 | 1317 | 21 | 1 | 1.4 |
| Inv. ex. | 330 | 0.39 | 0.1 | 2311 | 13 | 1317 | 19 | 1 | 1.2 |
| Inv. ex. | 331 | 0.39 | 0.3 | 2218 | 15 | 1317 | 26 | 1 | 1.4 |
| Inv. ex. | 332 | 0.39 | 0.7 | 2250 | 17 | 1317 | 30 | 1 | 1.4 |
| Inv. ex. | 333 | 0.39 | 0.6 | 2530 | 14 | 1317 | 24 | 1 | 1.3 |
| Inv. ex. | 334 | 0.55 | 0.1 | 1891 | 17 | 1013 | 36 | 1 | 1.5 |
| Inv. ex. | 335 | 0.55 | 0.5 | 2337 | 13 | 1013 | 25 | 1 | 1.5 |
| Inv. ex. | 336 | 0.55 | 0.3 | 2543 | 13 | 1013 | 28 | 1 | 1.2 |
| Inv. ex. | 337 | 0.29 | 0.5 | 2367 | 16 | 1315 | 23 | 1 | 1.3 |
| Inv. ex. | 338 | 0.43 | 0.7 | 2698 | 13 | 1344 | 17 | 1 | 1.2 |
| Inv. ex. | 339 | 0.60 | 0.4 | 1827 | 13 | 982 | 21 | 1 | 1.5 |
| Inv. ex. | 340 | 0.60 | 0.2 | 1906 | 13 | 982 | 24 | 1 | 1.2 |
| Inv. ex. | 341 | 0.60 | 0.2 | 2343 | 13 | 982 | 20 | 1 | 1.2 |
| Comp. ex. | 342 | 0.54 | 0.6 | 5200 | 7 | 750 | 17 | 2.5 | 1.3 |
| Inv. ex. | 343 | 0.53 | 0.3 | 2205 | 8 | 957 | 9 | 1 | 1.1 |
| Comp. ex. | 344 | 0.92 | 0.5 | 5400 | 13 | 693 | 20 | 2.5 | 1.0 |
| Comp. ex. | 345 | 0.53 | 0.9 | 6300 | 13 | 916 | 20 | 3 | 1.2 |
| Comp. ex. | 346 | 0.57 | 0.5 | 1200 | 13 | 420 | 22 | 1 | 1.1 |
| Comp. ex. | 347 | | | Cannot be evaluated | | | | | |
| Comp. ex. | 348 | | | | | | | | |
| Comp. ex. | 349 | | | | | | | | |
| Comp. ex. | 350 | | | | | | | | |
| Comp. ex. | 351 | 0.94 | 0.7 | 2300 | 0 | 430 | 13 | 1 | 1.0 |
| Inv. ex. | 352 | 0.49 | 0.2 | 2200 | 4 | 830 | 14 | 1 | 1.5 |
| Inv. ex. | 353 | 0.49 | 0.7 | 5500 | 13 | 870 | 27 | 1.5 | 1.1 |
| Inv. ex. | 354 | 0.49 | 0.2 | 1900 | 0 | 1020 | 11 | 1 | 1.3 |

TABLE 8-continued

| | | | | | | | | | |
|---|---|---|---|---|---|---|---|---|---|
| Inv. ex. | 355 | 0.49 | 0.2 | 1800 | <u>3</u> | 949 | <u>14</u> | 1 | 1.4 |
| Inv. ex. | 356 | 0.49 | 0.5 | <u>5200</u> | <u>4</u> | 1040 | <u>13</u> | 1.5 | 1.1 |
| Comp. ex. | 357 | <u>0.91</u> | 0.6 | 2100 | 18 | <u>450</u> | 37 | 3 | <u>1.0</u> |
| Comp. ex. | 358 | 0.41 | <u>0.9</u> | <u>5300</u> | 14 | 1160 | 21 | 3 | 1.5 |
| Comp. ex. | 359 | 0.40 | <u>0.9</u> | <u>5200</u> | 14 | 1150 | 22 | 3 | 1.4 |
| Comp. ex. | 360 | 0.40 | <u>0.9</u> | <u>5100</u> | 14 | 1140 | 23 | 3 | 1.5 |
| Comp. ex. | 361 | 0.40 | <u>0.9</u> | <u>5300</u> | 14 | 1130 | 21 | 3 | 1.5 |
| Comp. ex. | 362 | 0.40 | <u>0.9</u> | <u>5200</u> | 14 | 1150 | 22 | 3 | 1.5 |

A sheet having a tensile strength of 800 MPa or more and a limit curvature radius R of less than 2 mm was evaluated as high strength steel sheet excellent in bendability (invention examples in Table 8). In particular, in Invention Examples 353 and 356, the requirement of the average Vickers hardness of the soft surface layer being 0.60 time or less the average Vickers hardness of the ½ position in sheet thickness is satisfied and further the requirement of the nano-hardness standard deviation of the soft surface layer being 0.8 or less is satisfied, but it is learned that the average hardness change in the sheet thickness direction of the hardness transition zone exceeds 5000 (ΔHv/mm). As a result, in the steel sheet of Invention Examples 353 and 356, the limit curvature radius R was 1.5 mm. In contrast to this, in the steel sheets of the examples where the two requirements of "the average Vickers hardness of the soft surface layer being 0.60 time or less the average Vickers hardness of the ½ position in sheet thickness" and "the nano-hardness standard deviation of the soft surface layer being 0.8 or less" were satisfied and "the average hardness change in the sheet thickness direction of the hardness transition zone was 5000 (ΔHv/mm) or less", the limit curvature radius R was 1 mm. Furthermore, if the middle part in sheet thickness includes retained austenite by an area percent of 10% or more, the elongation becomes 15% or more and it was possible to obtain high strength steel sheet excellent in ductility in addition to bendability (Invention Examples 301 to 341 in Table 8). On the other hand, if even one of the performances of a "tensile strength of 800 MPa or more" and a "limit curvature radius R of less than 2 mm" is not satisfied, the sheet was designated a comparative example.

Further, in steel sheet manufactured by hot rolling without rough rolling being performed two times or more under conditions of a rough rolling temperature of 1100° C. or more, a sheet thickness reduction rate per pass of 5% to less than 50%, and a time between passes of 3 seconds or more, the limit curvature radius R was high and a sufficient bendability could not be achieved. Further, in all of the steel sheets according to the invention examples of the present invention, the value of a high speed/α low speed was more than 1.0, therefore it was possible to suppress the notch effect.

The invention claimed is:

1. A high strength steel sheet having a tensile strength of 800 MPa or more, comprising: a middle part in sheet thickness, and one or more soft surface layers, arranged at one side or both sides of the middle part in sheet thickness, wherein:
   each of the one or more soft surface layers has a thickness of more than 10 μm and 30% or less of the sheet thickness,
   each of the one or more soft surface layers has an average Vickers hardness that is equal to or less than 0.60 times an average Vickers hardness at a ½ position in the sheet thickness direction, and
   each of the one or more soft surface layers has a nano-hardness standard deviation of 0.8 or less.

2. The high strength steel sheet according to claim 1, wherein the high strength steel sheet further comprises a hardness transition zone formed between the middle part in sheet thickness and each of the one or more soft surface layers while adjoining them, wherein the hardness transition zone has an average hardness change in the sheet thickness direction of 5000 (ΔHv/mm) or less.

3. The high strength steel sheet according to claim 2, wherein the middle part in sheet thickness comprises, by area percent, 10% or more of retained austenite.

4. The high strength steel sheet according to claim 3, wherein the middle part in sheet thickness comprises, by mass %,
   C: 0.05 to 0.8%,
   Si: 0.01 to 2.50%,
   Mn: 0.010 to 8.0%,
   P: 0.1% or less,
   S: 0.05% or less,
   Al: 0 to 3%, and
   N: 0.01% or less, and
   a balance of Fe and unavoidable impurities.

5. The high strength steel sheet according to claim 4, wherein the middle part in sheet thickness further comprises, by mass %, at least one element selected from the group consisting of:
   Cr: 0.01 to 3%,
   Mo: 0.01 to 1%,
   B: 0.0001% to 0.01%,
   Ti: 0.01 to 0.2%,
   Nb: 0.01 to 0.2%,
   V: 0.01 to 0.2%,
   Cu: 0.01 to 1%,
   Ni: 0.01 to 1%, and
   REM: 0.001 to 0.05%.

6. The high strength steel sheet according to claim 3, further comprising a hot dip galvanized layer, hot dip galvannealed layer, or electrogalvanized layer at a surface of at least one of the one or more soft surface layers.

7. The high strength steel sheet according to claim 2, wherein the middle part in sheet thickness comprises, by mass %,
   C: 0.05 to 0.8%,
   Si: 0.01 to 2.50%,
   Mn: 0.010 to 8.0%,
   P: 0.1% or less,
   S: 0.05% or less,
   Al: 0 to 3%, and
   N: 0.01% or less, and
   a balance of Fe and unavoidable impurities.

8. The high strength steel sheet according to claim 7, wherein the middle part in sheet thickness further comprises, by mass %, at least one element selected from the group consisting of:

Cr: 0.01 to 3%,
Mo: 0.01 to 1%,
B: 0.0001% to 0.01%,
Ti: 0.01 to 0.2%,
Nb: 0.01 to 0.2%,
V: 0.01 to 0.2%,
Cu: 0.01 to 1%,
Ni: 0.01 to 1%, and
REM: 0.001 to 0.05%.

9. The high strength steel sheet according to claim 2, further comprising a hot dip galvanized layer, hot dip galvannealed layer, or electrogalvanized layer at a surface of at least one of the one or more soft surface layers.

10. The high strength steel sheet according to claim 1, wherein the middle part in sheet thickness comprises, by area percent, 10% or more of retained austenite.

11. The high strength steel sheet according to claim 10, wherein the middle part in sheet thickness comprises, by mass %,
C: 0.05 to 0.8%,
Si: 0.01 to 2.50%,
Mn: 0.010 to 8.0%,
P: 0.1% or less,
S: 0.05% or less,
Al: 0 to 3%, and
N: 0.01% or less, and
a balance of Fe and unavoidable impurities.

12. The high strength steel sheet according to claim 11, wherein the middle part in sheet thickness further comprises, by mass %, at least one element selected from the group consisting of:
Cr: 0.01 to 3%,
Mo: 0.01 to 1%,
B: 0.0001% to 0.01%,
Ti: 0.01 to 0.2%,
Nb: 0.01 to 0.2%,
V: 0.01 to 0.2%,
Cu: 0.01 to 1%,
Ni: 0.01 to 1%, and
REM: 0.001 to 0.05%.

13. The high strength steel sheet according to claim 10, further comprising a hot dip galvanized layer, hot dip galvannealed layer, or electrogalvanized layer at a surface of at least one of the one or more soft surface layers.

14. The high strength steel sheet according to claim 1, wherein the middle part in sheet thickness comprises, by mass %,
C: 0.05 to 0.8%,
Si: 0.01 to 2.50%,
Mn: 0.010 to 8.0%,
P: 0.1% or less,
S: 0.05% or less,
Al: 0 to 3%, and
N: 0.01% or less, and
a balance of Fe and unavoidable impurities.

15. The high strength steel sheet according to claim 14, wherein the middle part in sheet thickness further comprises, by mass %, at least one element selected from the group consisting of:
Cr: 0.01 to 3%,
Mo: 0.01 to 1%,
B: 0.0001% to 0.01%,
Ti: 0.01 to 0.2%,
Nb: 0.01 to 0.2%,
V: 0.01 to 0.2%,
Cu: 0.01 to 1%,
Ni: 0.01 to 1%, and
REM: 0.001 to 0.05%.

16. The high strength steel sheet according to claim 15, wherein a total Mn content, Cr content, and Mo content of each of the one or more soft surface layers is equal to or less than 0.9 times a total of the Mn content, Cr content, and Mo content of the middle part in sheet thickness.

17. The high strength steel sheet according to claim 15, wherein a B content of each of the one or more soft surface layers is equal to or less than 0.9 times a B content of the middle part in sheet thickness.

18. The high strength steel sheet according to claim 15, wherein a total Cu content and Ni content of each of the one or more soft surface layers is equal to or less than 0.9 times a total of the Cu content and Ni content of the middle part in sheet thickness.

19. The high strength steel sheet according to claim 14, wherein a C content of each of the one or more soft surface layers is equal to or less than 0.9 times a C content of the middle part in sheet thickness.

20. The high strength steel sheet according to claim 1, further comprising a hot dip galvanized layer, hot dip galvannealed layer, or electrogalvanized layer at a surface of at least one of the one or more soft surface layers.

* * * * *